US012300091B2

(12) United States Patent
Schubert et al.

(10) Patent No.: US 12,300,091 B2
(45) Date of Patent: May 13, 2025

(54) BUILDING SECURITY SYSTEMS WITH FALSE ALARM REDUCTION FEATURES

(71) Applicant: Tyco Fire & Security GmbH, Neuhausen am Rheinfall (CH)

(72) Inventors: Shawn D. Schubert, Oak Creek, WI (US); Conor J. Donovan, Cork (IE)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 71 days.

(21) Appl. No.: 18/097,866

(22) Filed: Jan. 17, 2023

(65) Prior Publication Data

US 2023/0230469 A1 Jul. 20, 2023

Related U.S. Application Data

(60) Provisional application No. 63/300,510, filed on Jan. 18, 2022.

(51) Int. Cl.
*G08B 29/18* (2006.01)
*G08B 19/00* (2006.01)
*G08B 31/00* (2006.01)

(52) U.S. Cl.
CPC ........... *G08B 29/185* (2013.01); *G08B 31/00* (2013.01); *G08B 19/00* (2013.01)

(58) Field of Classification Search
CPC ....... G08B 29/185; G08B 31/00; G08B 19/00
See application file for complete search history.

(56) References Cited

U.S. PATENT DOCUMENTS

| | | | | |
|---|---|---|---|---|
| 10,726,711 | B2 | 7/2020 | Subramanian et al. | |
| 10,832,563 | B2 | 11/2020 | Subramanian et al. | |
| 10,832,564 | B2 | 11/2020 | Subramanian et al. | |
| 11,282,374 | B2 * | 3/2022 | Beale | G08B 25/14 |
| 11,449,019 | B2 * | 9/2022 | Vitaterna | H04L 9/3239 |
| 11,626,008 | B2 * | 4/2023 | Nalukurthy | G08B 25/009 706/52 |
| 11,823,556 | B2 * | 11/2023 | Davies | G08B 13/19697 |
| 2016/0049071 | A1 * | 2/2016 | Beaver | G08B 29/185 340/514 |
| 2017/0316680 | A1 * | 11/2017 | Lamb | G08B 29/185 |
| 2021/0134143 | A1 | 5/2021 | Subramanian et al. | |
| 2022/0051548 | A1 * | 2/2022 | Pellegrini | H04M 3/436 |

FOREIGN PATENT DOCUMENTS

WO WO-2007120140 A1 * 10/2007 ............. G08B 25/08

* cited by examiner

*Primary Examiner* — Curtis A Kuntz
*Assistant Examiner* — James E Munion
(74) *Attorney, Agent, or Firm* — Foley & Lardner LLP

(57) ABSTRACT

A security system of a building includes a processing circuit. The processing circuit is configured to detect, based on data of security equipment of the building, that a security alarm of the building is a false alarm and search, responsive to the detection of the false alarm, a database to identify a past corrective action accepted for implementation and at least one false alarm occurring after the past corrective action was accepted and before detection of the false alarm. The processing circuits is configured to generate a corrective action to reduce an occurrence of the false alarm based on a result of the search and implement the corrective action to update operation of the security equipment to reduce the occurrence of the false alarm.

20 Claims, 34 Drawing Sheets

BUILDING SECURITY SYSTEMS WITH FALSE ALARM REDUCTION FEATURES

CROSS-REFERENCE TO RELATED PATENT APPLICATION

This application claims the benefit of, and priority to, U.S. Provisional Patent Application No. 63/300,510 filed Jan. 18, 2022, the entirety of which is incorporated by reference herein.

BACKGROUND

The present disclosure relates generally to building security systems. Particularly, the present disclosure relates to building security systems with false alarm reduction features.

A building security system may receive building data from sensors associated with building equipment. The sensors may trigger an alarm when the building data falls beyond a valid range or indicates an abnormal condition. For an example, an alarm is triggered when one or more outliers are detected in the building data or when building data deviates from normal operating state. However, in some cases, false alarms are triggered due to several factors such as faulty equipment, for example, the equipment may be reaching an end of life state and equipment parts may be wearing out or breaking, misconfigured systems, or behavior of building users such as using an emergency exit as a general exit. Managing such false alarms can be challenging.

SUMMARY

One aspect of the present disclosure is a security system of a building. The security system includes a processing circuit configured to detect, based on data of security equipment of the building, that a security alarm of the building is a false alarm. The processing circuit is configured to search, responsive to the detection of the false alarm, a database to identify a past corrective action accepted for implementation and at least one false alarm occurring after the past corrective action was accepted and before detection of the false alarm. The processing circuit is configured to generate a corrective action to reduce an occurrence of the false alarm based on a result of the search. The processing circuit is configured to implement the corrective action to update operation of the security equipment to reduce the occurrence of the false alarm.

In some embodiments, the processing circuit to determine, based on the result of the search, a number of false alarms occurring after the past corrective action was accepted and before detection of the false alarm and compare the number of false alarms to a threshold. In some embodiments, the processing circuit is configured to generate the corrective action to reduce the occurrence of the false alarm to be a type the same as the past corrective action responsive to a determination that the number of false alarms is less than the threshold.

In some embodiments, the processing circuit to determine, based on the result of the search, a number of false alarms occurring after the past corrective action was accepted and before detection of the false alarm and compare the number of false alarms to a threshold. In some embodiments, the processing circuit is configured to generate the corrective action to reduce the occurrence of the false alarm to be a type different than the past corrective action responsive to a determination that the number of false alarms is greater than the threshold.

In some embodiments, the processing circuit is configured to generate data to cause a graphical user interface to be displayed on a user device, the graphical user interface comprising an indication of the corrective action to reduce the occurrence of the false alarm. In some embodiments, the processing circuit is configured to receive a user interaction to approve or reject the corrective action and update the database to store an indication of the corrective action and the user interaction to approve or reject the corrective action.

In some embodiments, the processing circuit is configured to determine, based on the result of the search, a number of false alarms occurring after the past corrective action was accepted and before detection of the false alarm and compare the number of false alarms to a threshold. In some embodiments, the processing circuit is configured to analyze data to determine that the past corrective action was accepted but not implemented and generate the corrective action to reduce the occurrence of the false alarm to be a same type as the past corrective action responsive to a determination that the number of false alarms is greater than the threshold and a determination that the corrective action was not implemented.

In some embodiments, the processing circuit is configured to identify, in the database, a confirmation provided by a user verifying that the past corrective action was implemented. In some embodiments, the processing circuit is configured to compare a number of false alarms occurring after the past corrective action was accepted and before detection of the false alarm to a threshold responsive to an identification of the confirmation. In some embodiments, the processing circuit is configured to generate the corrective action to reduce the occurrence of the false alarm to be a same type as the past corrective action responsive to the number of false alarms being less than the threshold.

In some embodiments, the processing circuit is configured to transmit data to an alarm panel located within the building to cause the alarm panel to display an indication of the corrective action. In some embodiments, the processing circuit is configured to receive, from the alarm panel, data indicating whether a user accepted or rejected the corrective action via the alarm panel and update the database with an indication that the corrective action was accepted or rejected by the user.

In some embodiments, the processing circuit is configured to search the database to identify an update to a value of an operating parameter of the security equipment implemented by the corrective action. In some embodiments, the processing circuit is configured to retrieve the value of the operating parameter from the security equipment, determine, based on the value of the operating parameter, whether the update to the value of the operating parameter was implemented, and generate the corrective action based on whether the update to the value of the operating parameter was implemented.

In some embodiments, the processing circuit is configured to implement the corrective action by generating scheduling data to cause a technical to implement the corrective action, generating data to cause a graphical user interface to display instructions to a user to implement the corrective action, or transmitting data to the security equipment updating at least one parameter value of the security equipment causing the security equipment to implement the corrective action.

Another aspect of the present disclosure is a method. The method includes detecting, by one or more processing circuits, based on data of security equipment of a building, that a security alarm of the building is a false alarm. The method includes searching, by the one or more processing circuits, responsive to the detection of the false alarm, a database to identify a past corrective action accepted for implementation and at least one false alarm occurring after the past corrective action was accepted and before detection of the false alarm. The method includes generating, by the one or more processing circuits, a corrective action to reduce an occurrence of the false alarm based on a result of the search. The method includes implementing, by the one or more processing circuits, the corrective action to update operation of the security equipment to reduce the occurrence of the false alarm.

In some embodiments, the method includes determining, by the one or more processing circuits, based on the result of the search, a number of false alarms occurring after the past corrective action was accepted and before detection of the false alarm. In some embodiments, the method includes comparing, by the one or more processing circuits, the number of false alarms to a threshold and generating, by the one or more processing circuits, the corrective action to reduce the occurrence of the false alarm to be a type the same as the past corrective action responsive to a determination that the number of false alarms is less than the threshold.

In some embodiments, the method includes determining, by the one or more processing circuits, based on the result of the search, a number of false alarms occurring after the past corrective action was accepted and before detection of the false alarm. In some embodiments, the method includes comparing, by the one or more processing circuits, the number of false alarms to a threshold and generating, by the one or more processing circuits, the corrective action to reduce the occurrence of the false alarm to be a type different than the past corrective action responsive to a determination that the number of false alarms is greater than the threshold.

In some embodiments, the method includes generating, by the one or more processing circuits, data to cause a graphical user interface to be displayed on a user device, the graphical user interface comprising an indication of the corrective action to reduce the occurrence of the false alarm. In some embodiments, the method include receiving, by the one or more processing circuits, a user interaction to approve or reject the corrective action. In some embodiments, the method includes updating, by the one or more processing circuits, the database to store an indication of the corrective action and the user interaction to approve or reject the corrective action.

In some embodiments, the method includes determining, by the one or more processing circuits, based on the result of the search, a number of false alarms occurring after the past corrective action was accepted and before detection of the false alarm and comparing, by the one or more processing circuits, the number of false alarms to a threshold. In some embodiments, the method includes analyzing, by the one or more processing circuits, data to determine that the past corrective action was accepted but not implemented. In some embodiments, the method includes generating, by the one or more processing circuits, the corrective action to reduce the occurrence of the false alarm to be a same type as the past corrective action responsive to a determination that the number of false alarms is greater than the threshold and a determination that the corrective action was not implemented.

In some embodiments, the method includes identifying, by the one or more processing circuits, in the database, a confirmation provided by a user verifying that the past corrective action was implemented. In some embodiments, the method includes comparing, by the one or more processing circuits, a number of false alarms occurring after the past corrective action was accepted and before detection of the false alarm to a threshold responsive to an identification of the confirmation. In some embodiments, the method includes generating, by the one or more processing circuits, the corrective action to reduce the occurrence of the false alarm to be a same type as the past corrective action responsive to the number of false alarms being less than the threshold.

In some embodiments, the method includes transmitting, by the one or more processing circuits, data to an alarm panel located within the building to cause the alarm panel to display an indication of the corrective action. In some embodiments, the method includes receiving, by the one or more processing circuits, from the alarm panel, data indicating whether a user accepted or rejected the corrective action via the alarm panel. In some embodiments, the method includes updating, by the one or more processing circuits, the database with an indication that the corrective action was accepted or rejected by the user.

In some embodiments, the method includes searching, by the one or more processing circuits, the database to identify an update to a value of an operating parameter of the security equipment implemented by the corrective action. In some embodiments, the method includes retrieving, by the one or more processing circuits, the value of the operating parameter from the security equipment. In some embodiments, the method includes determining, by the one or more processing circuits, based on the value of the operating parameter, whether the update to the value of the operating parameter was implemented and generating, by the one or more processing circuits, the corrective action based on whether the update to the value of the operating parameter was implemented.

In some embodiments, the method includes implementing, by the one or more processing circuits, the corrective action by generating scheduling data to cause a technical to implement the corrective action, generating data to cause a graphical user interface to display instructions to a user to implement the corrective action, or transmitting data to the security equipment updating at least one parameter value of the security equipment causing the security equipment to implement the corrective action.

Another aspect of the present disclosure is one or more storage media storing instructions thereon, that, when executed by one or more processors, cause the one or more processors to detect, based on data of security equipment of a building, that a security alarm of the building is a false alarm. The instructions cause the one or more processors to search, responsive to the detection of the false alarm, a database to identify a past corrective action accepted for implementation, at least one false alarm occurring after the past corrective action was accepted and before detection of the false alarm, and an indication of whether the past corrective action was implemented. The instructions cause the one or more processors to generate a corrective action to reduce an occurrence of the false alarm based on a result of the search and implement the corrective action to update operation of the security equipment to reduce the occurrence of the false alarm.

In some embodiments, the instructions, when executed by the one or more processors, cause the one or more processors to determine, based on the result of the search, a number of false alarms occurring after the past corrective action was accepted and before detection of the false alarm and compare the number of false alarms to a threshold. In some embodiments, the instructions cause the one or more processors to analyze data to determine that the past corrective action was accepted but not implemented and generate the corrective action to reduce the occurrence of the false alarm to be a same type as the past corrective action responsive to a determination that the number of false alarms is greater than the threshold and a determination that the corrective action was not implemented.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
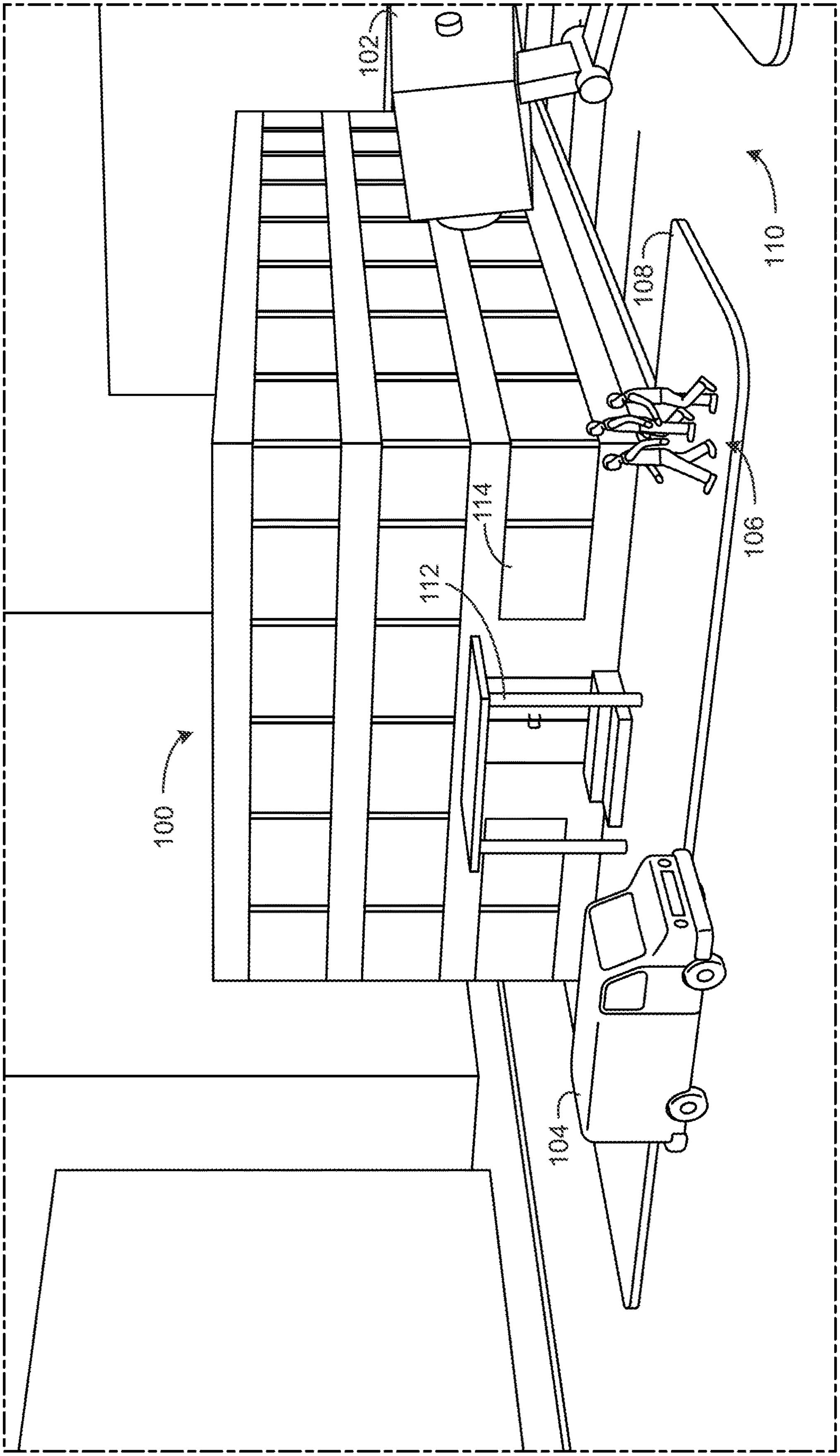
FIG. 1 is a perspective view schematic drawing of a building with a security system, according to some embodiments.

Before turning to the Figures, it should be understood that the disclosure is not limited to the details or methodology set forth in the description or illustrated in the figures. It should also be understood that the terminology is for the purpose of description only and should not be regarded as limiting.

Referring generally to the figures, a building security system for false alarm reduction is shown and described, according to various exemplary embodiments. The building security system can be utilized in conjunction with a plurality of building automation or management systems, subsystems, or as a part high level building automation system. The building system can identify patterns of events or data measurements of a security system, and identify whether an alarm in a building is a true alarm or a false alarm based on the patterns. For example, the false alarm detection and diagnostic techniques can be performed similar or the same as the techniques described in U.S. patent application Ser. No. 15/947,725 filed Apr. 6, 2018 (now U.S. Pat. No. 10,832,564), U.S. patent application Ser. No. 15/947,722 filed Apr. 6, 2018 (now U.S. Pat. No. 10,832,563), U.S. patent application Ser. No. 15/947,727 filed Apr. 6, 2018 (now U.S. Pat. No. 10,726,711), and U.S. patent application Ser. No. 17/091,731 filed Nov. 6, 2020, the entirety of each of which is incorporated by reference herein.

If the building system detects a false alarm, the building system may identify one or multiple solutions or corrective actions to resolve or reduce the occurrence of the false alarm in the future. The corrective actions can include updating (e.g., increasing) a length of time required for a user to enter an access code into a security panel after opening a door of a building or space. The corrective actions can include relocating a security panel to be closer to an entry door. The corrective actions can include giving a particular user or users training to properly and promptly enter an access code after entering a building. The corrective actions can be to change the door which employees or tenants enter through. However, the building system may not be able to precisely identify which corrective action to surface to a user as a recommendation. Furthermore, even if the building system does surface the recommendation to the user, the user may or may not actually implement the corrective action or may not properly implement the corrective action.

To solve these and other technical challenges, the building system can present one or multiple false alarm reduction recommendations for one or multiple different corrective actions to prevent false alarms from occurring. The building system can detect which recommendation the user selects. Responsive to detecting a selection by the user of a recommendation, the building system can generate, create, construct, or update a database or data repository to identify the false alarm, a type of the false alarm, the corrective actions recommended to the user, and the corrective action that the user selected for implementation. The building system can monitor new security system data to identify and detect new false alarms after the corrective action is recommended or implemented. The building system can use the database of false alarm data to detect whether a previous corrective action implemented by a user was successful or not in reducing false alarms. For example, the building system can identify the number of false alarms of a particular false alarm type between the implemented corrective action and a present time. The building system can compare the number of false alarms to a threshold or predefined value to determine whether the corrective action was successful in reducing the false alarms or unsuccessful in reducing the false alarms.

Responsive to identifying that the solution recommended by the building system was successful in resolving false alarms in the past, the building system can determine to generate a recommendation to implement the same false alarm reduction action as performed in the past. However, responsive to identifying that the solution recommended by the building system in the past was not successful in resolving false alarms, the building system can generate a recommendation to implement a different corrective action or corrective actions.

Furthermore, if the building system determines that a corrective action was not successful in reducing a false alarm, the building system can determine whether the corrective action was actually implemented or not or whether the corrective action was properly implemented. If the building system generates adds data to the database indicating that the false alarm reduction action was not successful in reducing false alarms, but the corrective action was actually not ever implemented or not implemented properly, the database may store false data. This can reduce the performance of various consuming systems that may run on the database, for example, other false alarm reduction systems, machine learning models, artificial intelligence systems, etc. For example, a machine learning model trained on a database including false data may have a reduced performance.

Accordingly, the building system can perform an analysis before recording an indication that a false alarm reduction corrective action was unsuccessful in reducing a false alarm. The building system can read various registers or memory locations of various devices to detect whether the false alarm reduction corrective action was implemented at all or implemented properly. For example, if the false alarm reduction action was to implement an update to a required length of time between a door being opened and entry of a code into a security panel, the building system can query security devices of the building, e.g., the security panel for the stored length of time. The building system can compare the store length of time against the length of time for the corrective action to determine whether the security system was operating on the length of time identified to reduce false alarms. Furthermore, if the corrective action was user implemented, e.g., performing training, relocating a security panel, etc. the building system can query a user and ask the user to confirm whether the false alarm solution was implemented. In some cases, the building system can query a supervisor of the user that was assigned to implement the corrective action to verify whether the corrective action was implemented or not.

Responsive to the building system identifying that the corrective action was properly implemented but was still unsuccessful in reducing false alarms, the building system can recommend a different type of corrective action to the user and record an indication of the corrective action being unsuccessful in reducing the particular type of false alarm. Responsive to the building system identifying that the corrective action was not properly implemented, the building system can recommend the same corrective action or same type of corrective action to the user and monitor whether the corrective action is implemented properly and successful in reducing the false alarm.

Referring now to FIG. 1, a building 100 with a security camera 102 and a parking lot 110 is shown, according to an exemplary embodiment. The building 100 is a multi-story building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
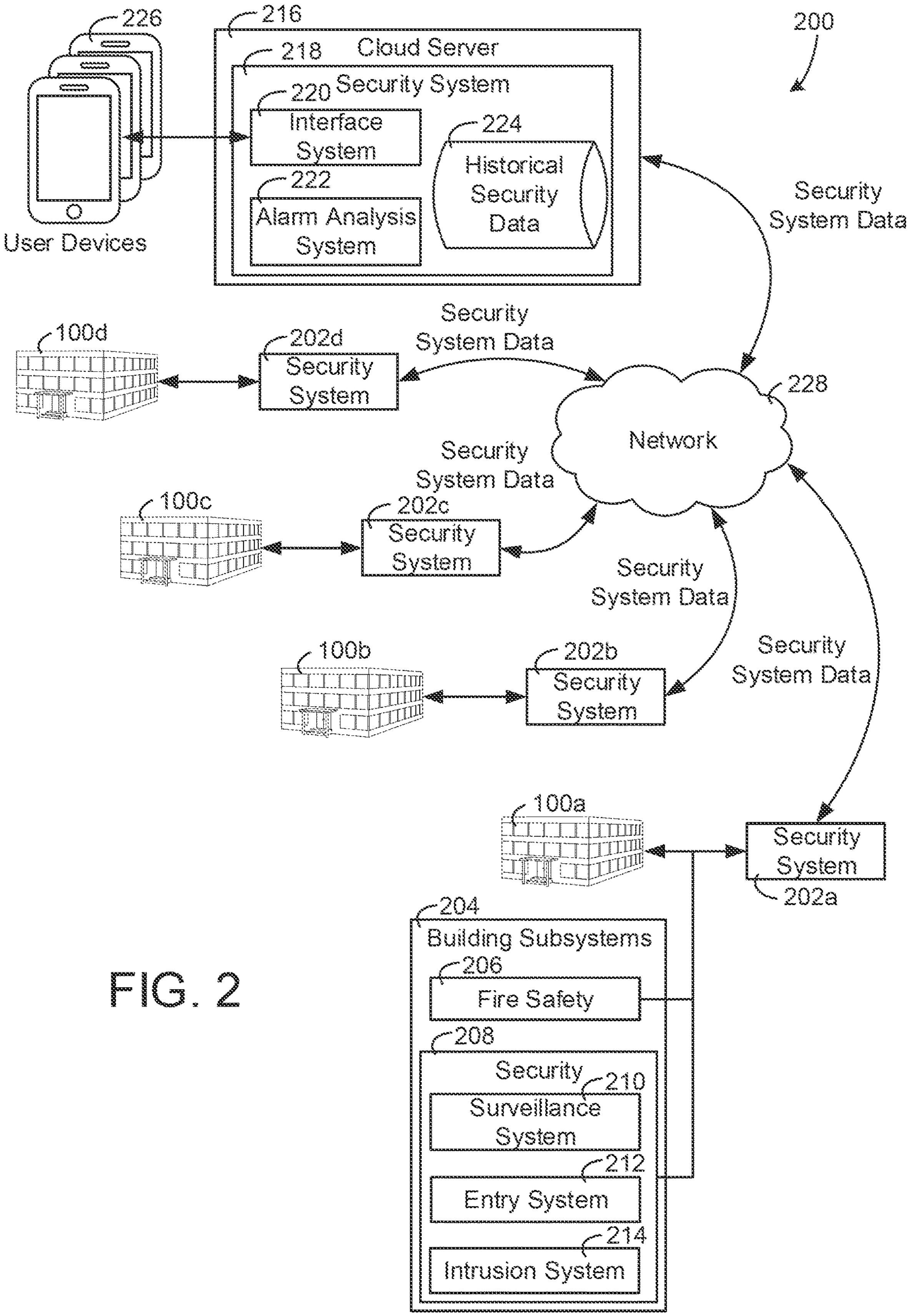
FIG. 2 is a block diagram of building security systems for multiple buildings communicating with a cloud based security system, according to some embodiments.

Referring now to FIG. 2, a security system 200 is shown for multiple buildings, according to an exemplary embodiment. The security system 200 is shown to include buildings 100*a*-100*d*. Each of buildings 100*a*-100*d* is shown to be associated with a security system 202*a*-202*d*. The buildings 100*a*-100*d* may be the same as and/or similar to building 100 as described with reference to FIG. 1. The security systems 202*a*-202*d* may be one or more controllers, servers, and/or computers located in a security panel or part of a central computing system for a building.

The security systems 202*a*-202*d* may communicate with, or include, various security sensors and/or actuators, building subsystems 204. For example, fire safety subsystems 206 may include various smoke sensors and alarm devices, carbon monoxide sensors, alarm devices, etc. Security subsystems 208 are shown to include a surveillance system 210, an entry system 212, and an intrusion system 214. The surveillance system 210 may include various video cameras, still image cameras, and image and/or video processing systems for monitoring various rooms, hallways, parking lots, the exterior of a building, the roof of the building, etc. The entry system 212 can include one or more systems configured to allow users to enter and exit the building (e.g., door sensors, turnstiles, gated entries, badge systems, etc.) The intrusion system 214 may include one or more sensors configured to identify whether a window or door has been forced open. The intrusion system 214 can include a keypad module for arming and/or disarming a security system and various motion sensors (e.g., IR, PIR, etc.) configured to detect motion in various zones of the building 100*a*.

Each of buildings 100*a*-100*d* may be located in various cities, states, and/or countries across the world. There may be any number of buildings 100*a*-100*d*. The buildings 100*a*-100*d* may be owned and operated by one or more entities. For example, a grocery store entity may own and operate buildings 100*a*-100*d* in a particular geographic state. The security systems 202*a*-202*d* may record data from the building subsystems 204 and communicate collected security system data to the cloud server 216 via a network.

In some embodiments, the network 228 communicatively couples the devices, systems, and servers of the system 200. In some embodiments, the network 228 is at least one of and/or a combination of a Wi-Fi network, a wired Ethernet network, a ZigBee network, a Bluetooth network, and/or any other wireless network. The network 228 may be a local area network and/or a wide area network (e.g., the Internet, a building WAN, etc.) and may use a variety of communications protocols (e.g., BACnet, IP, LON, etc.). The network 228 may include routers, modems, and/or network switches. The network 228 may be a combination of wired and wireless networks.

The cloud server 216 is shown to include a security analysis system 218 that receives the security system data from the security systems 202*a*-202*d* of the buildings 100*a*-100*d*. The cloud server 216 may include one or more processing circuits (e.g., memory devices, processors, databases) configured to perform the various functionalities described herein. The cloud server 216 may be a private server. In some embodiments, the cloud server 216 is implemented by a cloud system, examples of which include AMAZON WEB SERVICES® (AWS) and MICROSOFT AZURE®.

A processing circuit of the cloud server 216 can include one or more processors and memory devices. The processor can be a general purpose or specific purpose processor, an application specific integrated circuit (ASIC), one or more field programmable gate arrays (FPGAs), a group of processing components, or other suitable processing components. The processor may be configured to execute computer code and/or instructions stored in a memory or received from other computer readable media (e.g., CDROM, network storage, a remote server, etc.).

The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuit and can include computer code for executing (e.g., by the processor) one or more processes described herein.

In some embodiments, the cloud server 216 can be located on premises within one of the buildings 100*a*-100*d*. For example, a user may wish that their security, fire, or HVAC data remain confidential and have a lower risk of being compromised. In such an instance, the cloud server 216 may be located on-premises instead of within an off-premises cloud platform.

The security analysis system 218 may implement an interface system 220, an alarm analysis system 222, and a database storing historical security data 224, security system data collected from the security systems 202*a*-202*d*. The interface system 220 may provide various interfaces of user devices 226 for monitoring and/or controlling the security systems 202*a*-202*d* of the buildings 100*a*-100*d*. The interfaces may include various maps, alarm information, maintenance ordering systems, etc. The historical security data 224 can be aggregated security alarm and/or event data collected via the network 228 from the buildings 100*a*-100*d*. The alarm analysis system 222 can be configured to analyze the aggregated data to identify insights, detect alarms, reduce false alarms, etc. The analysis results of the alarm analysis system 222 can be provided to a user via the interface system 220. In some embodiments, the results of the analysis performed by the alarm analysis system 222 are provided as control actions to the security systems 202*a*-202*d* via the network 228.

Figure 3:
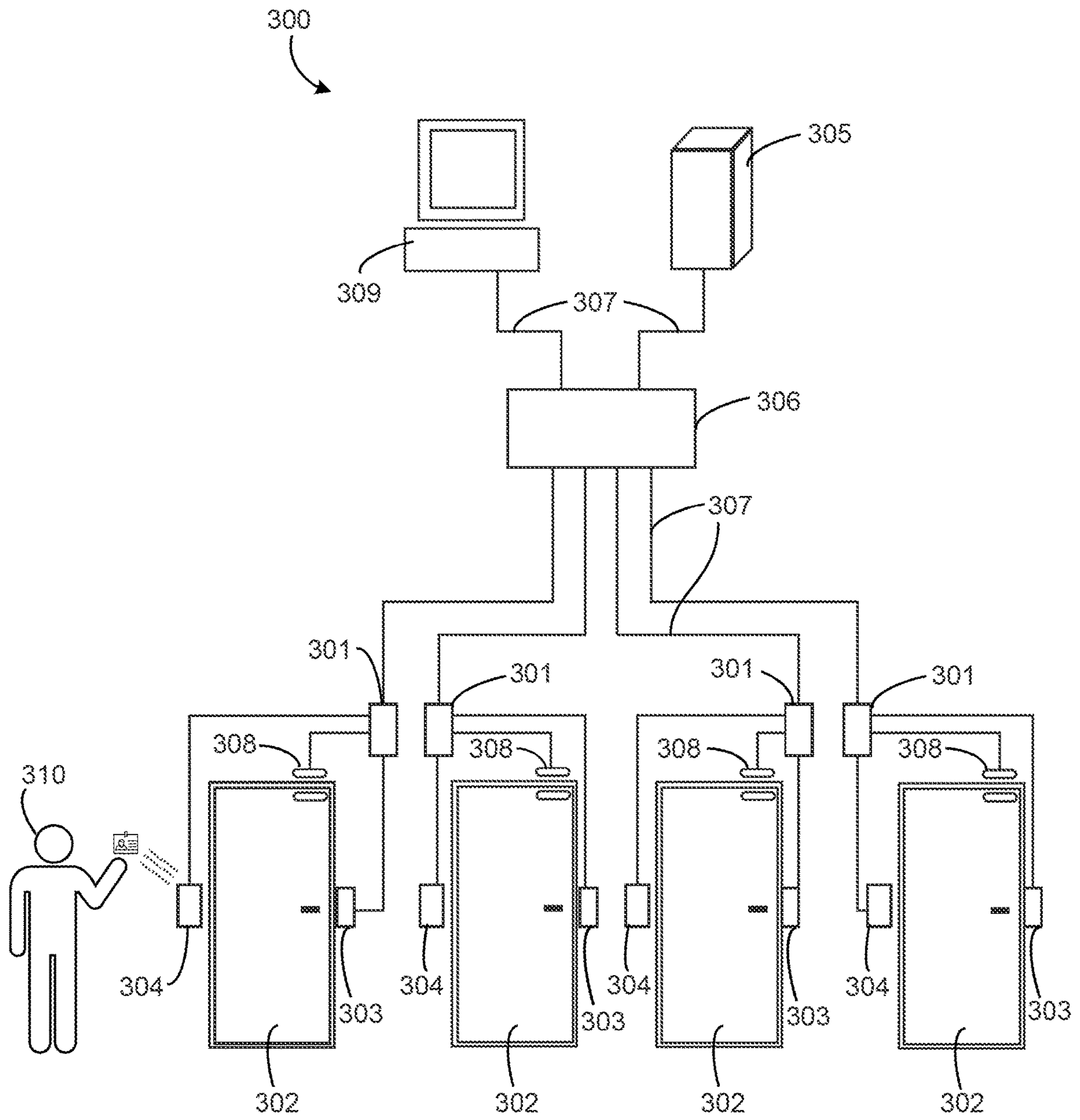
FIG. 3 is a block diagram illustrating several components of an access control system (ACS) that can be implemented in the building security systems of FIG. 2, according to some embodiments.

Referring now to FIG. 3, a block diagram of an ACS 300 is shown, according to an exemplary embodiment. The ACS 300 can be implemented in any of the buildings 100*a*-100*d* as described with reference to FIG. 2. The ACS 300 is shown to include a plurality of doors 302. Each of the doors 302 is associated with a door lock 303, an access reader module 304, and one or more door sensors 308. The door locks 303, the access reader modules 304, and the door sensors 308 may be connected to access controllers 301. The access controllers 301 may be connected to a network switch 306 that directs signals, according to the configuration of the ACS 300, through network connections 307 (e.g., physical wires or wireless communications links) interconnecting the access controllers 301 to an ACS server 305 (e.g., the cloud server 216). The ACS server 305 may be connected to an end-user terminal or interface 309 through network switch 306 and the network connections 307.

The ACS 300 can be configured to grant or deny access to a controlled or secured area. For example, a person 310 may approach the access reader module 304 and present credentials, such as an access card. The access reader module 304 may read the access card to identify a card ID or user ID associated with the access card. The card ID or user ID may be sent from the access reader module 304 to the access controller 301, which determines whether to unlock the door lock 303 or open the door 302 based on whether the person 310 associated with the card ID or user ID has permission to access the controlled or secured area.

Figure 4:
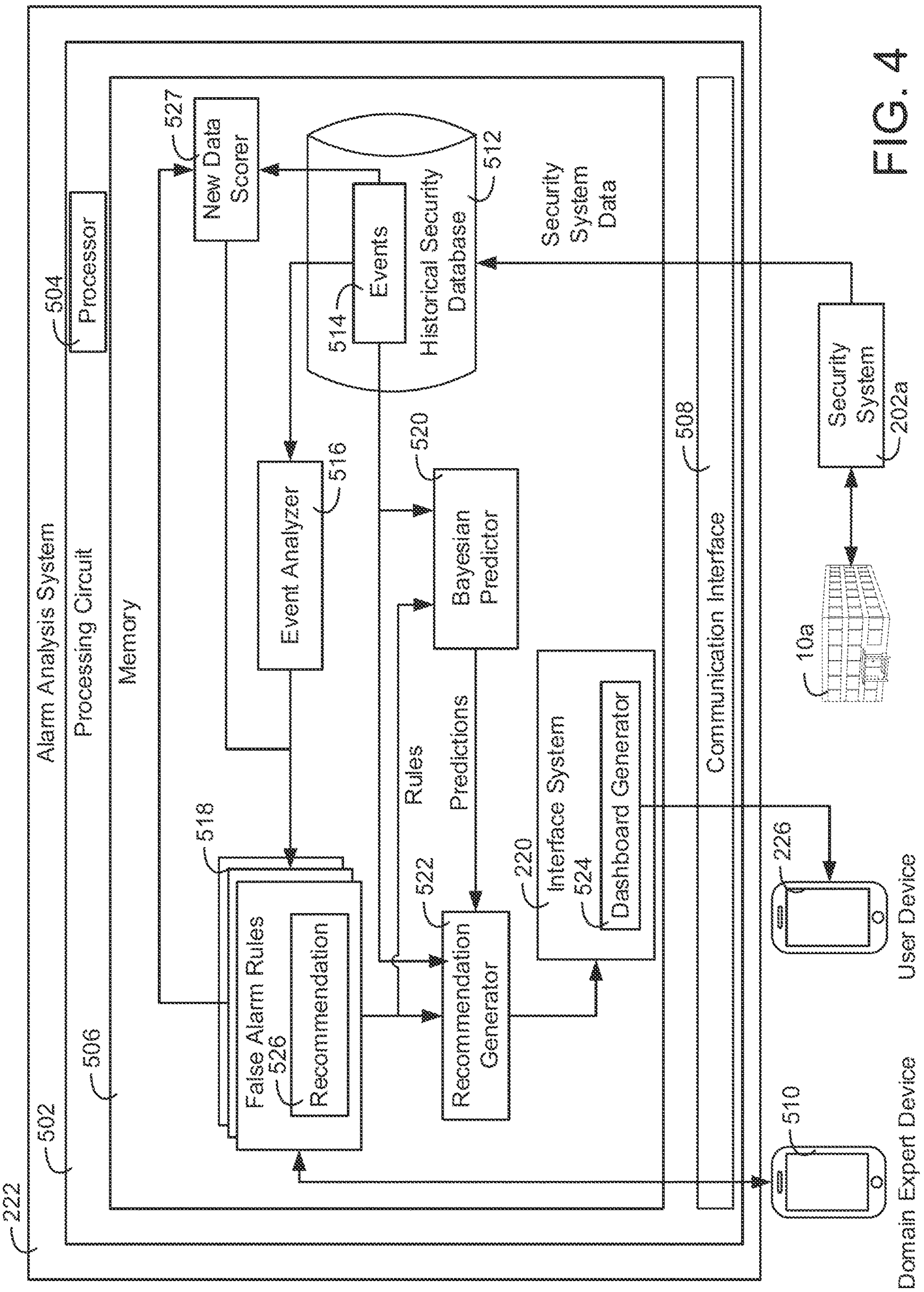
FIG. 4 is a block diagram of a cloud implemented alarm analysis system for analyzing event data to determine false alarm rules, according to an exemplary embodiment.

Referring now to FIG. 4, a block diagram of the alarm analysis system 222 as described with reference to FIG. 3 is shown, according to an exemplary embodiment. The alarm analysis system 222 can be configured to identify patterns leading to false alarms based on event data reported by the security system 202*a*. The alarm analysis system 222 is shown to include a processing circuit 502 that includes a processor 504 and a memory 506. The memory 506 can include instructions which, when executed by the processor 504, cause the processor 504 to perform the one or more functions described herein. The processor 504 can be implemented as a general purpose processor, an application specific integrated circuit (ASIC), one or more field programmable gate arrays (FPGAs), a group of processing components, or other suitable electronic processing components.

In addition to a traditional processor and memory, the processing circuit 502 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). The processing circuit 502 can include and/or be connected to and/or be configured for accessing (e.g., writing to and/or reading from) the memory 506, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

The memory 506 can be configured to store code executable by control circuitry and/or other data, e.g., data pertaining to communication, e.g., configuration and/or address data of nodes, etc. The processing circuit 502 can be configured to implement any of the methods described herein and/or to cause such methods to be performed, e.g., by the processor 504. Corresponding instructions may be stored in the memory 506, which may be readable and/or readably connected to the processing circuit 502. It may be considered that the processing circuit 502 includes or may be connected or connectable to the memory 506, which may be configured to be accessible for reading and/or writing by the controller and/or the processing circuit 502.

The security system 202*a* is shown to include a communication interface 508. The communication interface 508 can be configured to facilitate communicate with a domain expert device 510 and/or the security system 202*a*. Furthermore, the communication interface 508 can be configured to communicate with all of the devices and systems described with reference to FIG. 3.

Via the communication interface 508, the historical security database 512 can be configured to receive (collect) and store security system data from the security system 202*a*. The security system data may be events such as an occurrence detected by a sensor of the security system 202*a*. For example, an intrusion sensor may identify that an individual is trying to force a window open. Another event may be a door being opened or closed. The detection of an occupant walking through the door may also be an event. The events 514 can further include signals. For example, a signal may be a continuously signal of a door being open and door being closed.

The memory 506 is shown to include an event analyzer 516. The event analyzer 516 can be configured to generate false alarm rules 518 that are shown to be stored by the memory 506. The event analyzer 516 can be configured to generate particular sequences of events 514 and generate rules based on the sequences of events 514. Certain sequences of events 514 can be identified as important by the event analyzer 516, these sequences can be used by the event analyzer 516 to generate the false alarm rules 518. The false alarm rules 518 can be rules identifying that particular sequences of events are and/or lead to false alarms. The false alarm rules 518 may include a recommendation 526 which may instruct an end user to perform an action which reduces false alarms (e.g., adjusting a building equipment parameter, training building personal, replacing a piece of building equipment, reducing false alarms related to churn, etc.). For example, an alarm rule 518 may indicate that a particular sequence of events indicates a poorly positioned door sensor. For this sequence of events, the recommendation 526 may be to have a technician reposition the door sensor.

The event analyzer 516 can be configured to perform Markov Chain analysis to determine important sequences of events 514. The event analyzer 516 can be configured to generate a Markov Chain transition matrix which identifies the relationships between events and probabilities of each transition between events. For example, a first order transition matrix may be defined by A, where $a_{i,j}$ is a probability for a particular transition from a state i to a state j.

$$A = a_{ij} \qquad \text{(Equation 6)}$$

$$A = \begin{bmatrix} a_{0,0} & \cdots & a_{0,j} \\ \vdots & \ddots & \vdots \\ a_{i,0} & \cdots & a_{i,j} \end{bmatrix} \qquad \text{(Equation 7)}$$

Furthermore, the event analyzer 516 can be configured to use a first order Markov Chain to determine important transitions between events. A first order Markov Chain may be a Markov Chain where the probability of a second event occurring after a single first event. The first order Markov Chain may identify important transitions between events 514, important sequences.

Furthermore, the event analyzer 516 can be configured to implement a second order Markov Chain to analyze the events 514. A second order transition may be a transition where the probability of a third event occurring after two prior events. The event analyzer 516 can be configured to analyze the events 514 with a second order transition to check for accuracy of the first order Markov Chain, e.g., verify that the identified events are important, and further identify additional sequences of events. The event analyzer 516 can be configured to implement any order of Markov Chain analysis and can be configured to determine an optimal order for the Markov Chain analysis. For example, a user may identify a predefined number of false alarm rules 518 and the event analyzer 516 can perform Markov Chain analysis to determine a particular Markov Chain order that results in the predefined number of false alarm rules 518.

The transitions between events 514 may be time based. The transition matrices can be built by the event analyzer 516 for different time intervals between events. Every event sequence or transition of events determined by the event analyzer 516 can be considered an issue and can be assigned as a false alarm rule 518. An appropriate fix or response can be assigned to the false alarm rule 518 by the domain expert, e.g., the recommendation 526.

The memory 506 can be configured to store events 514 and/or sequences of events in a historical security database 512. The processing circuit 502 can be configured to analyze a sequence of events 514 with Generalized Sequential Pattern (GSP) analysis to generate pattern information for alarm rules 518. More specifically, the event analyzer 516 can be configured to analyze the events 514 with GSP analysis. This is further described with reference to FIG. 8. The recommendation generator 522 can be configured to classify events 514 as triggering a false alarm rule 518 based on the pattern information of the false alarm rules 518. In some embodiments, the Bayesian predictor 520 can be configured to perform a Bayesian analysis to predict alarms occurring in the future, according to the process described with reference to FIGS. 9A-10C.

The event analyzer 516 can be configured to perform GSP mining to determine sequences from the events 514. By using GSP, the event analyzer 516 can be configured to empirically determine inherent causality relationships between events. The alarm rules 518 can be determined from the various sequences of events 514 determined by the event analyzer 516. The false alarm rules 518 may indicate that a particular sequences of events is indicative of a situation for issue that causes false alarms. For example, a rule may be “Communication Issue” and may be associated with a maintenance activity “Wiring replacement needed.” A particular sequence for this false alarm rule 518 may be:

CF_COMM_Trouble→BA_Overhead_Door(s)

This false alarm rule 518 can indicate that a burglar alarm sensor for a door triggers after a communication issue is sensed for the burglar alarm sensor. A recommendation to prevent false alarms occurring for the burglar alarm sensor may be to perform maintenance on the burglar alarm and/or replace the communication wiring for the burglar alarm sensor.

The event analyzer 516 can be configured to perform a parameter search. The parameter search may be on a time dimension parameter search. A particular time interval may be used for the parameter search such that transitions between events occur within the time interval. The parameter search can group events by time such that a sequential pattern analysis of events looks at a particular group of events that occur within a predefined amount of time or a within predefined amount of time from each other. Another dimension for the parameter search may be a spatial parameter that groups events that occur in a predefined area and/or within a predefined distance from each other. The GSP mining can be applied by the event analyzer 516 to identify particular event sequences and use these event sequences against or in generating the alarm rules 518.

The domain expert device 510 may be a device that a domain expert uses to access the false alarm rules 518. The domain expert device 510 may be the same and/or similar to the user devices 314. A domain expert associated with the domain expert device 510 can provide the recommendations 526 for each of the false alarm rules 518. For example, the domain expert, via the domain expert device 510, can review the false alarm rules 518 and provide the recommendation 526 for each false alarm rule 518. The domain expert device 510 can provide recommendation 526 that indicates a particular cause of a false alarm. For example, for a communication issue, the recommendation 526 may indicate that communication wires should be replaced or inspected by a technician.

The recommendation generator 522 can be configured to identify whether an event 514 and/or sequence of events 514 are indicative of a situation causing a false alarm or indicating that a false alarm could occur. The recommendation generator 522 can determine whether an event or sequence of events meet a false alarm rule 518. Based on the recommendation 526, the recommendation generator 522 can provide suggestions or insights to a user device 226. The suggestion may be to perform maintenance, e.g., inspecting or replacing communication wires. Furthermore, the recommendation may be to change a parameter of a sensor device. For example, a door delay parameter might be increased to prevent a false alarm pertaining to a door.

Table 2 below indicates recommendations that can be provided to an end user to reduce situations or events that cause false alarms. The recommendations may be the same as and/or similar to the recommendations 526. In Table 2, each recommendation indicates a title and a recommendation description. In some embodiments, the recommendation names and/or recommendation descriptions are provided by the domain expert of the domain expert device 510 for particular events and/or event sequences, i.e., for a false alarm rule 518. In various embodiments, the alarm analysis system 222 can classify various events and/or event sequences into one of the recommendations shown in Table 2 below, i.e., the domain expert of the domain expert device 510 can define the recommendations of Table 2 and then the alarm analysis system 222 can train a classifier to assign particular event sequences a recommendation name and/or recommendation description from Table 2.

TABLE 2

| Recommendations | |
|---|---|
| Recommendation Name | Recommendation Description |
| Instant Burglar Alarm (BA) Door Alarm | Fire exit door or a perimeter door that has been programmed for instant alarm. |
| Entry/Exit Delay | The amount of time has exceeded the entry/exit parameter programed |
| Employee Access | Employee is incorrectly entering or exiting building. Customer education. |
| Bypass Violation | Arming event that causes security vulnerability. |
| Interior Burglar Alarm | It appears a motion sensor is causing alarms through a window, before customer enters perimeter door and cancels. Consider moving sensor or trying to adjust sensitivity. |
| Aborted Burglar Alarm | An alarm with police dispatch was cancelled due to an authorized employee cancelling the alarm. |
| No Close | Multiple alarms are caused by the site closing off-schedule. Check or adjust schedule. |
| Irregular Early Open | Multiple alarms are caused by the site opening off-schedule or wrong authority level. Check or adjust schedule or authority level. |
| Low Battery | Battery needs to be replaced since building device has been operating for a long time after an AC power failure. Low battery is leading to multiple problems. Check or replace battery. |
| Video Verification Fail | We see a connection issue with the camera. |
| User Error | We have identified that employees needs training on working with the intrusion system. |
| Expansion Module | Hardware failure issue with accessory expansion module that causes a false alarm. |
| Non Aborted Burglar Alarm | We have not been able to reach one of the authorized people from the call tree. |
| Ground Fault | A hardware electrical issue. |
| Glass Break or Vibration Sensor | A sensor that is causing an alarm from the glass break via internal and/or external conditions. |
| No Contact-Voice Mail Full | Key holder not contactable - voicemail full. |
| No Contact-No Voice Mail | Key holder not contactable - voicemail not set-up |
| No Contact-Invalid number | Key holder not contactable - number not valid. |
| No Contact-Other | Key holder not contactable - number not contactable. |

The Bayesian predictor 520 can be configured to predict whether a false alarm rule 518 will trigger in the future. The Bayesian predictor 520 can be configured to implement a Bayesian model and/or a hierarchical Bayesian model. Based on a framework for the Bayesian model and the events 514, the Bayesian predictor 520 can be configured to generate a prediction of what rules will fire in the future (what issues will occur in the future). For example, the Bayesian predictor 520 can be configured to implement a Bayesian model to determine how many door delay alarms will occur one week into the future. The predictions can be provided to the interface system 220.

The interface system 220 can be configured provide a dashboard to the user device 226. The interface system 220 is shown to include a dashboard generator 524. The dashboard generator 524 can be configured to receive the indications of actions to take to reduce or suppress false alarms from the recommendation generator 522 and predictions from the Bayesian predictor. Examples of the interfaces that can be generated by the dashboard generator 524 are the interfaces shown in FIGS. 37-51.

The new data scorer 527 can be the same as and/or similar to the event analyzer 516. The new data scorer 527 can be configured to implement GSP mining or Markov transition analysis. The new data scorer 527 can be configured to update the false alarm rules 518 based on new events 514 received form the security system 202*a*. This second round of analytics may identify new alarm rules 518 or improve or remove past alarm rules 518.

Figure 5:
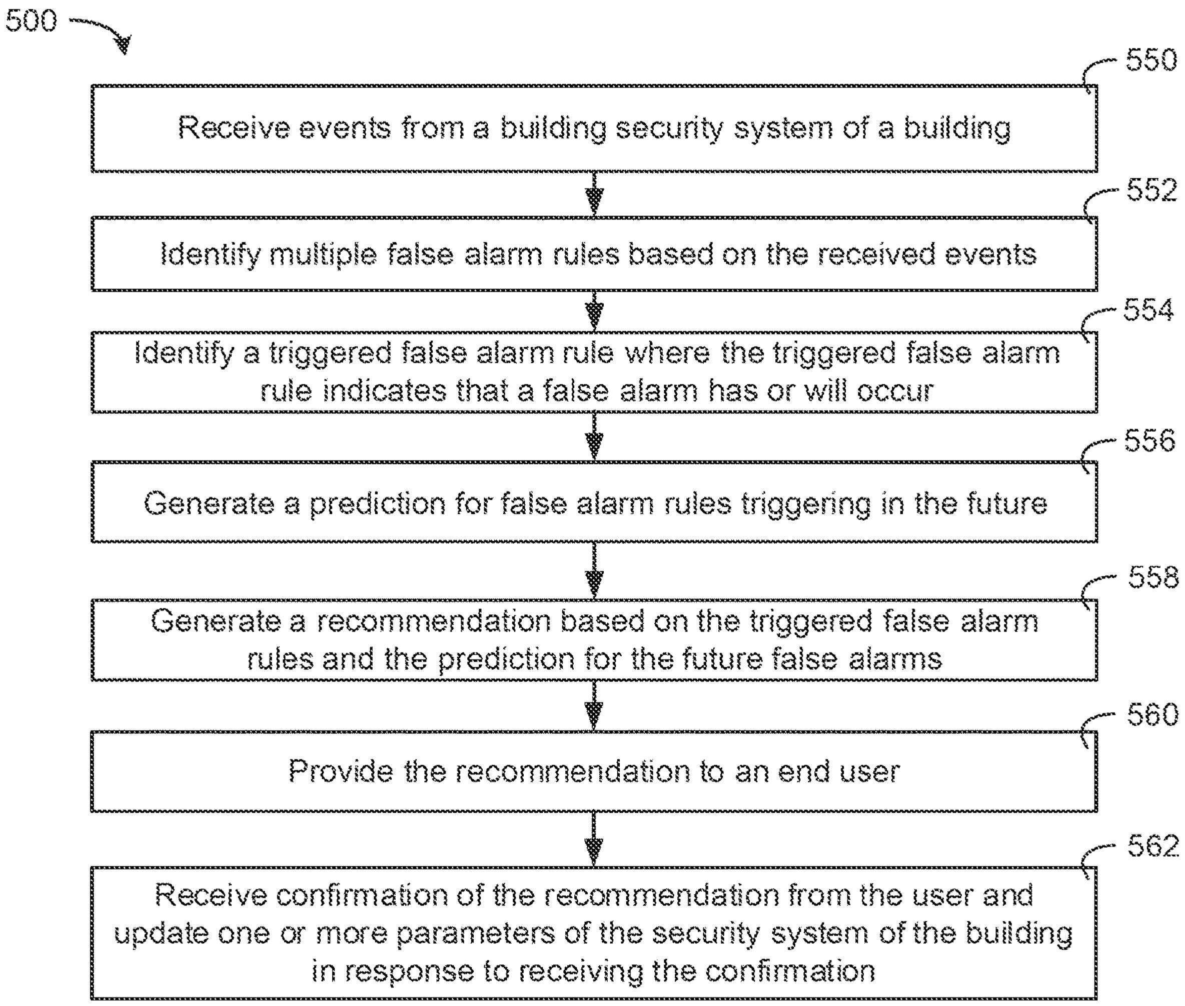
FIG. 5 is a flow diagram of a process for determining false alarm rules based on event data and generating a recommendations by the alarm analysis system of FIG. 4, according to an exemplary embodiment.

Referring now to FIG. 5, a flow diagram of a process 500 that can be performed by the alarm analysis system 222 for generating alarm rules 518 is shown, according to an exemplary embodiment. The alarm analysis system 222 can be configured to perform the process 500. Furthermore, any one or combination of the computing devices described herein can be configured to perform the process 500.

In step 550, the alarm analysis system 222 can receive events 514 from the security system 202*a*. The events may be doors opening or closing, a window being forced open, movement detected in a particular zone, etc. In step 552, the event analyzer 516 can be configured to analyze the events 514 to identify various alarm rules 518. In some embodiments, analyzing the events 514 may include performing a first order Markov transition analysis, a second order Markov transition analysis, and/or any order Markov transition analysis. Furthermore, the analysis may include performing a GSP analysis of the events 514 in addition to various other pattern mining algorithms e.g., Sequential PAttern Discovery Using Equivalence Classes (SPADE), FreeSpan, PrefixSpan, MAPres, etc. Identifying the false alarm rules 518 is described with further reference to FIGS. 6A and 6B.

In step 554, the recommendation generator 522 can determine whether a false alarm rule has triggered (e.g., determining whether a false alarm has occurred or will occur) based on the events 514 and the alarm rules 518. An indication that a false alarm has or will occur may be indicative of a situation in the building 10*a* that is causing false alarms. Examples of such a situation may be an improperly installed or operated piece of building equipment of the building 10*a*. In some embodiments, certain events 514 may occur within the building 10*a* when a false alarm occurs. In some embodiments, the certain events 514 may occur within the building 10*a* although no alarm has yet occurred. Based on the alarm rules 518, the recommendation generator 522 may determine, that based on particular patterns of the events 514, that a false alarm has occurred or may occur in the future.

In step 556, the Bayesian predictor 520 can determine a prediction for alarm rules 518 occurring in the future. The Bayesian predictor 520 can implement Bayesian modeling to identify whether a false alarm will occur in the future based on the events 514 and the alarm rules 518. More specifically, based on historical data of past alarm rules 518 triggering, the Bayesian predictor 520 can predict how many alarm rules will trigger in the future. In step 558, based on the identified false alarms and the predictions of future alarms as determined in steps 554 and 558, a recommendation can be generated by the interface system 220. The recommendation may be to adjust the installation of sensors, adjust the parameters of the sensors, or order technician service. The maintenance recommendation can help prevent false alarms from occurring in the future. This insight may be based on the recommendation 526 associated with a triggered alarm rule 518.

In step 560, the interface system 220 can provide the recommendation to a user via user device 226. In this regard, various dashboards and interfaces can be generated by the dashboard generator 524 to display the recommendations to the user. The user can review the recommendations via the user device 226 and take appropriate action. In some embodiments, the user may approve a particular setting change which the alarm analysis system 222 can implement. In step 562, in response to receiving a confirmation to update various sensor or system parameters to avoid false alarms, the alarm analysis system 222 can implement the various changes.

Figure 6A:
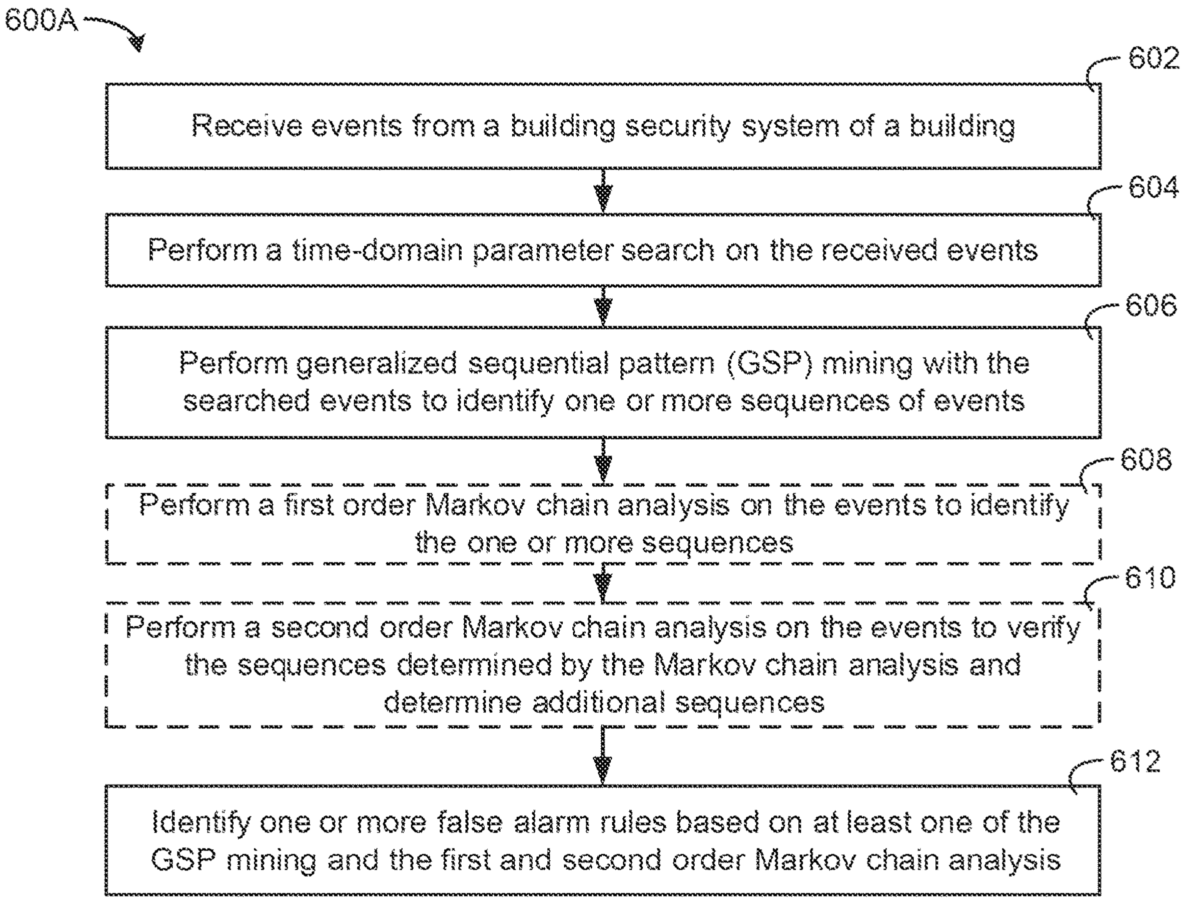
FIG. 6A is a flow diagram of a process that can be performed by the alarm analysis system of FIG. 4 for performing a generalized sequential pattern (GSP) method and/or a Markov chain analysis to identify false alarm rules, according to an exemplary embodiment.
Figure 6B:
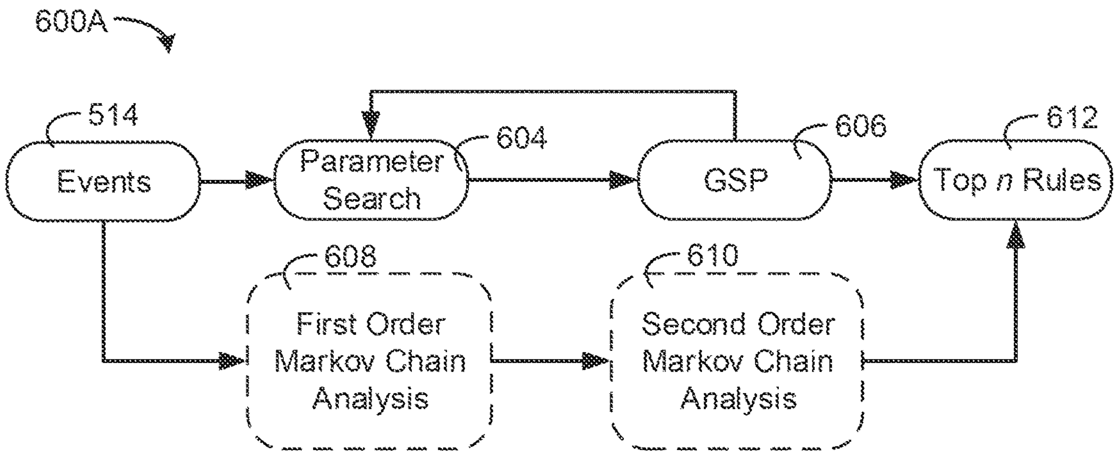
FIG. 6B is another flow diagram illustrating the process of FIG. 6A in detail, according to an exemplary embodiment.

Referring now to FIGS. 6A and 6B, a process 600A is shown to generating alarm rules 518 with a GSP method and/or Markov Chain analysis with the alarm analysis system 222, according to an exemplary embodiment. The alarm analysis system 222 can be configured to perform the process 600A. Furthermore, any one or combination of computing devices described herein can be configured to perform the process 600A. By formulating the problem as a GSP mining problem, patterns emanating from signal interactions can be analyzed.

FIG. 6B is a flow diagram of the process 600A. FIG. 6B illustrates the events 514 and the parameters search of step 604 and the GSP analysis of step 606 being performed on the events 514 to generate the alarm rules 518 (the top n rules). Furthermore, optional steps 608 and 610 are shown for performing first order Markov chain analysis step 608 and second order Markov chain analysis step 610.

Referring more particularly to FIG. 6A, in step 602, the alarm analysis system 222 can receive events from the security system 202*a* of the building 10*a*. Step 602 may be the same as and/or similar to step 550 of FIG. 5B. The alarm analysis system 222 can receive historical event data from a system, a single building site, or multiple building sites. In step 604, the event analyzer 516 can perform a time-domain parameter search on the received events 514.

In step 606, the event analyzer 516 can perform a generalized sequential patterning mining (GSP) method to identify one or more sequences, i.e., causality relationships between events. The GSP method can identify important sequences of events, i.e., sequences which occur frequently.

Steps 608 and 610 can be optional steps performed by the event analyzer 516 to generate the alarm rules 518. This can be performed in addition to, or in place of, the GSP analysis. In step 608, the event analyzer 516 can determine sequences, e.g., transitions between events and can determine the importance of the transitions e.g., how often the transition occurs with a first order Markov chain analysis. A first order Markov chain analysis may identify the probability of a future event based on a single previous event.

In step 610, the event analyzer 516 can confirm whether the sequences identified as significant in step 608 are still significant and can further identify additional sequences with a second order Markov chain analysis. The second order Markov chain analysis may identify sequences of events that occur frequency. The second order Markov chain analysis may identify the probability of a future event based on two past events. The sequences determined by the first order Markov chain analysis can be compared to the sequences determined by the second order Markov chain analysis to verify that the sequences of the first order analysis are determined to be significant under the second order analysis. If the second order analysis determines that the first order sequences are not important, these sequences can be removed. Furthermore, additional sequences can be identified by the event analyzer 516 via the second order Markov chain analysis.

In step 612, the event analyzer 516 can determine one or more false alarm rules 518 from the sequences determined by the GSP mining of step 606 or the Markov chain analysis of steps 608 and 610. In some embodiments, the event analyzer 516 can determine a top n rules that are significant from both the GSP mining and/or the Markov chain analysis. The top n rules may be the most significant rules for a particular system, a particular building site, and/or for multiple building sites. In some embodiments, the frequency at which the sequences occur is used to select the sequences. For example, the top n most frequently occurring sequences may be selected. The top n sequences can be used to form alarm rules 518. In some embodiments, the alarm rules and/or sequences are categorized and adjusted by the domain expert associated with the domain expert device 510. For example, the domain expert device 510 may provide recommendation 526 for each of the false alarm rules 518.

Figure 7:
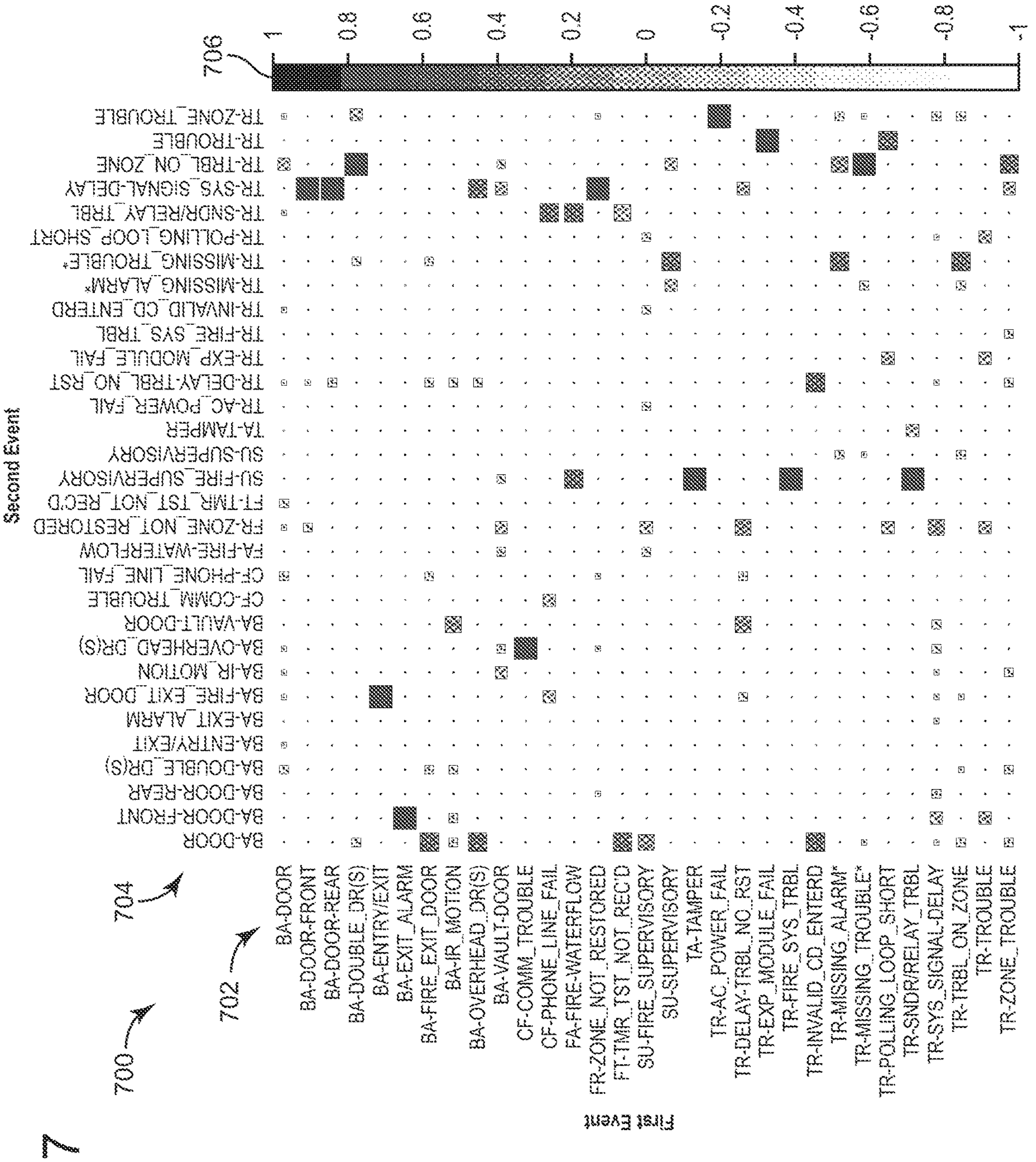
FIG. 7 is a diagram of first order Markov transitions between events, according to an exemplary embodiment.

Referring to FIG. 7, an exemplary first order Markov transition diagram 700 is shown for events 514, according to an exemplary embodiment. As can be seen, the first event rows 702 illustrates a first event while the second event columns 704 illustrate a subsequent second event. The transition diagram 700 illustrates the significance of each transition based on the scale 706 which ranges from −1 to 1. The significance may indicate the probability or rate at which one of the second events of the second event column 704 occurs after a first event of the first event rows 702 occurs. As an example, the alarm analysis system 222 may select any transition with a metric above a predefined amount to be a false alarm rule 518. For example, only the red transitions may be selected as false alarm rule 518, e.g., all transitions above 0.45.

As described elsewhere herein, the event analyzer 516 can utilize Markov properties to analyze a sequence of events 514 received from the security system 202*a*. By only considering the previous signal, i.e., a first order Markov chain (as shown in FIG. 7), the transitions between events 514 can be analyzed. Before this step, embodiments involve pre-processing the signal data using domain knowledge to remove redundancy in signal definition.

Some embodiments include observation of second order transitions to check for accuracy or new patterns. The transitions may be time based. These observations can be made for different time intervals at definite data granularity, built at a system number level. As an example, patterns that may emanate from first and second order transitions are Equations 8 and 9.

CF_COMM_Trouble→BA_Overhead_Door(s):A false alarm due to a communication issue (Equation 8)

TR_INVALID_CD_ENTRD→BA-DOOR:A true alarm (Equation 9)

For the false alarm of Equation 8, an associated recommendation can be linked for reducing false alarms. In some embodiments, the recommendation includes one or multiple actions. For example, the actions may be "replace battery" or "wiring replacement needed."

Every transition as determined from a first and/or second order Markov analysis can be viewed as a potential issue and an appropriate fix may be assigned to these issues. As described elsewhere herein, a domain expert associated with the domain expert device 510 can help classify the transition as false alarms (e.g., the transition of Equation 8) or true alarms (e.g., the transition of Equation 9).

The transitions of FIG. 7 can be a proxy of how equipment (e.g., security panels) are operated at the building 10*a*. Faulty use of the building equipment and/or improper maintenance can lead to false alarms and these situations of faulty user and/or improper maintenance can be identified via the transitions. Specific recommendations for responding to each of the transitions and/or the most significant transitions can be implemented by the systems and methods discussed herein to perform preventative maintenance to reduce the number of false alarms that occur for the building.

Figure 8:
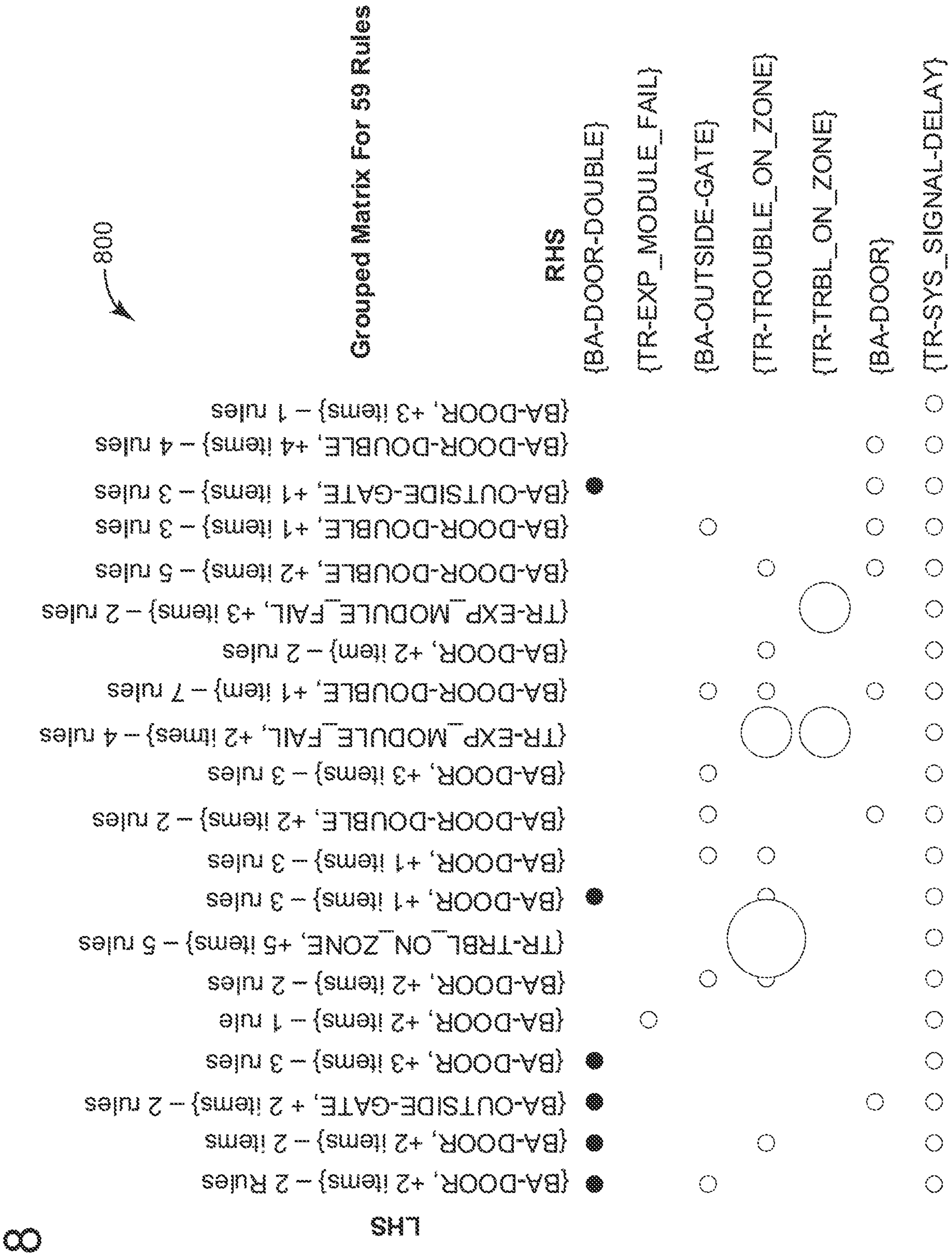
FIG. 8 is a diagram of rules that can be determined by the GSP method, according to an exemplary embodiment.

Referring to FIG. 8, a chart 800 illustrating alarm rules 518 determined by the event analyzer 516 with a GSP algorithm is shown, according to an exemplary embodiment. The chart 800 indicates sequences of events that are the most "important" or occur the most frequently based on the size of the circle indicators of the chart 800. Larger circles may indicate a sequence that occurs more frequently than a smaller circle. By using the GSP method, the event analyzer 516 can arrive at the sequences illustrated by the chart 800. With sequence modeling, inherent causality relationships may be uncovered empirically and rules (e.g., the rules shown in FIG. 8) may be developed for rectifying issues. For example, when communication trouble is followed by a burglar alarm indicating entry via overhead doors, the GSP algorithm may conclude that the alarm is a result of a communication issue and that a wiring replacement is needed.

Referring to FIGS. 7 and 8, both Markov chains and GSP mining can be employed to determine false alarm rules 618. GSP may help provide a general framework for generating patterns. For GSP mining, events 514 may be modeled as sequences and the data may be prepared in a manner suitable for sequential pattern mining algorithms, e.g., GSP. The parameter search can be a time dimension and/or may be a spatial dimension. The Markov chain method and the GSP can be combined into one pipeline where the Markov chain model and the GSP algorithm are placed into a single framework for generating rules. Every rule may be a potential signature for an issue. The signals associated the rules have a very distinct pattern. Signatures can be correlated signals. Signatures with time series events applied can develop repeatable false alarm patterns. Specific signatures and patterns can be filtered with the help of a domain expert (human being) and can be equated to a user action leading to a critical false alarm at the premise. The input of the domain expert can help form action insights, actions a user should take in response to a rule triggering.

More specifically, the Markov chain model and/or the GSP algorithm can be used to determine a cause (which may be user action, or for example, incorrect installation of equipment) of a sequence of events that leads to an alarm. These can form action insights. For example, suppose the following rule is termed as very significant by the GSP algorithm.

OPEN/CLOSE→BA,BA-IR (Equation 10)

A database can be consulted by looking at all the events that the rule of Equation 10 satisfies and identifying patterns of the signal giving rise to the alarm. As a result, suppose the following patterns of Table 4 are found, the first pattern and the second pattern, where OPEN is an open window or door event, BA is a burglary alarm event, BA-IR is a burglar alarm event based on infrared detection, BA-DOOR is a burglary alarm event based on an open door, and is a closed door event.

TABLE 3

| Motion Sensor Sensitivity Rule | |
|---|---|
| Rule - Motion Sensor Sensitivity<br>OPEN/CLOSE → BA, BA - IR | |
| Recommended Actions | Reduce motion sensor sensitivity<br>Reposition sensors |

TABLE 4

| Patterns And Signatures | |
|---|---|
| Time Stamp | Event |
| First Pattern | |
| 1 | Open |
| 2 | BA-BURG |
| 3 | BA-IR |
| 4 | BA-IR |

TABLE 4-continued

| Patterns And Signatures | |
|---|---|
| Time Stamp | Event |
| Second Pattern | |
| 1 | BA-IR |
| 2 | BA-IR |
| 3 | BA-DOOR |
| 4 | CLOSE |

With the help of a domain expert, a rule of Table 3 may be classified and all the patterns under this rule (e.g., the First Pattern and the Second Pattern of Table 4) can be labeled as Motion Sensor Sensitivity. These patterns may be the result of motion sensors being activated before or after the door of interest is either closed or opened. This may lead to numerous of false alarms. A recommended fix may be to reduce the sensitivity of the motion sensors or to move the motion sensors to a different place.

Figure 9A:
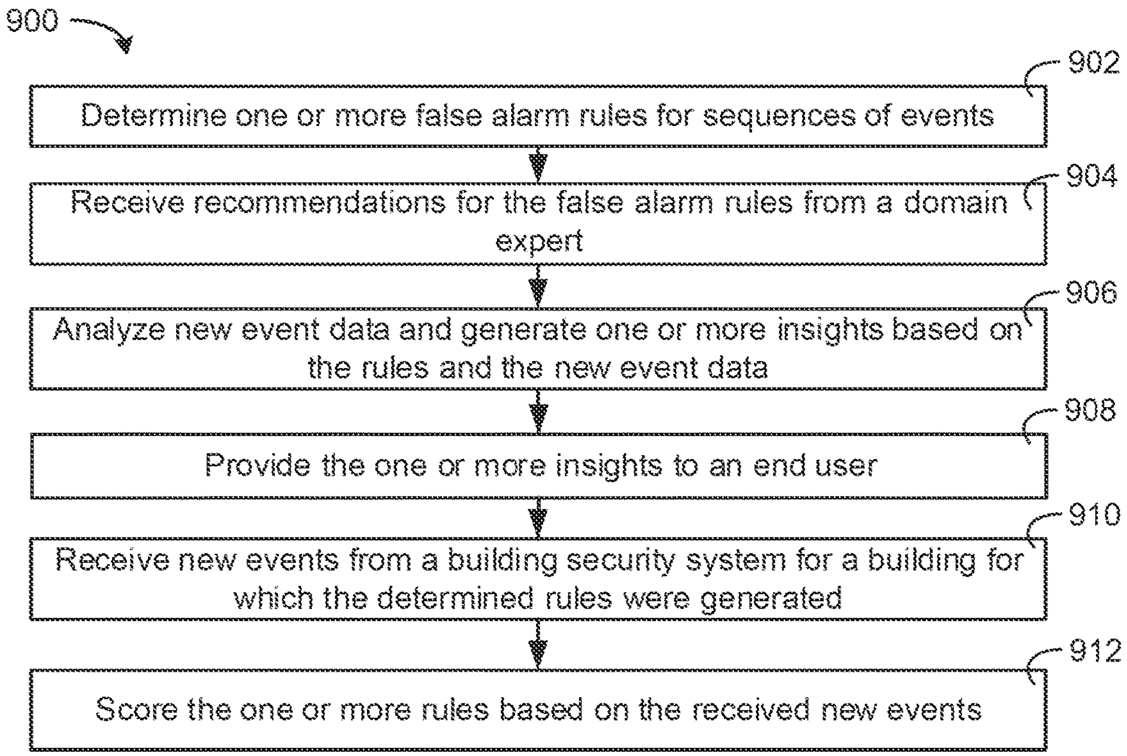
FIG. 9A is a flow diagram of a process that can be performed by the alarm analysis system of FIG. 4 for determining recommendations for false alarm rules and providing insights to an end user based on the false alarm rules and the recommendations for the false alarm rules, according to an exemplary embodiment.
Figure 9B:
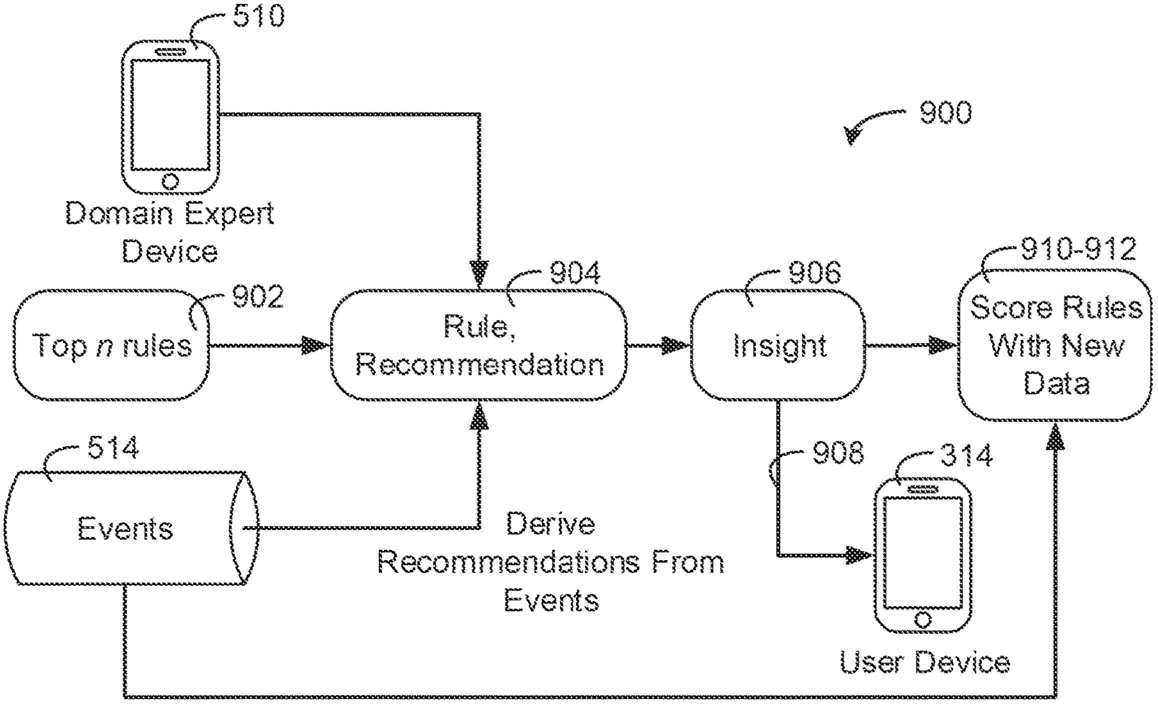
FIG. 9B is another flow diagram illustrating the process of FIG. 9A in detail, according to an exemplary embodiment.

Referring now to FIGS. 9A and 9B, process 900 is shown for generating a recommendation based on the false alarm rules 518 and the events 514, according to an exemplary embodiment. The alarm analysis system 222 can be configured to perform the process 900. Furthermore, any one or combination of computing devices described herein can be configured to perform the process 900. FIG. 9B illustrates a flow diagram of the process 900 and identifies the steps of the process 900 and the domain expert devices 510 and the user device 226.

Referring more particularly to FIG. 9A, in step 902, the event analyzer 516 can determine the alarm rules 518. The event analyzer 516 can use Markov chain analysis or GSP mining. These methods are described with further reference to FIGS. 6A-8.

In step 904, the alarm analysis system 222 can receive recommendations 526 for the determined false alarm rules 518. The recommendation 526 may be a recommended activity that should be performed, e.g., adjusting a parameter value, performing maintenance, adjusting or reinstalling a sensor, etc. The domain expert can also provide a title for the alarm rule 518. In some embodiments, the alarm analysis system 222 provides the recommendations 526 to the domain expert device 510. The domain expert, via the domain expert device 510, may remove rules, update rules, filter rules, combine rules, etc. The domain expert may classify some rules as indicative of a false alarm and other rules as indicative of a true alarm.

The recommendation 526 may be "send a remote tech to the site" and can be provided by the domain expert device 510. Furthermore, the recommendation 526 can be derived from the event data of the alarm rule 518. An example of a derived title may be "usage of wrong door."

In step 906, the rules can be applied to new event data received from the security system 202*a*. The new event data may satisfy one of the alarm rules 518 that is a rule for a false alarm, the recommendation generator 522 may determine that a false alarm has occurred or may occur in the future based on the event pattern. The recommendation 526 (e.g., resolution for those causes) associated with the rule that has triggered can be used to generate insights which can be passed to an end user associated with the user device 226 or to the domain expert associated with the domain expert device 510 (step 908). Some of these recommendations are to remotely program the remote programming the security system 202*a*. In this regard, the alarm analysis system 222 may automatically adjust one or more operating parameters of the security system 202*a*. In some embodiments, the insight provided to the user prompts the user to approve an automatic adjustment.

In step 910, the historical security database 512 may be updated with new events. The new data scorer 527 can be configured to perform a second round of analytics to score the alarm rules 518 (step 912). The new data scorer 527 can determine whether the alarm rules 518 are accurate and if any changes or updates need to be made to the alarm rules 518. Furthermore, the new data may occur in response to parameter changes remotely made for the security system 202*a*. Therefore, new data scorer 527 can be configured to add new alarm rules 518 or remove old alarm rules 518 that are no longer relevant after the remote parameter changes have been made.

The process 900 can be performed continuously and can allow the complete system to be in a steady state with reduced false alarms. By self-healing, remotely and automatically adjusting parameters for the security system 202*a*, the process 900 can keep the security system 202*a* working in the right condition.

Figure 10A:
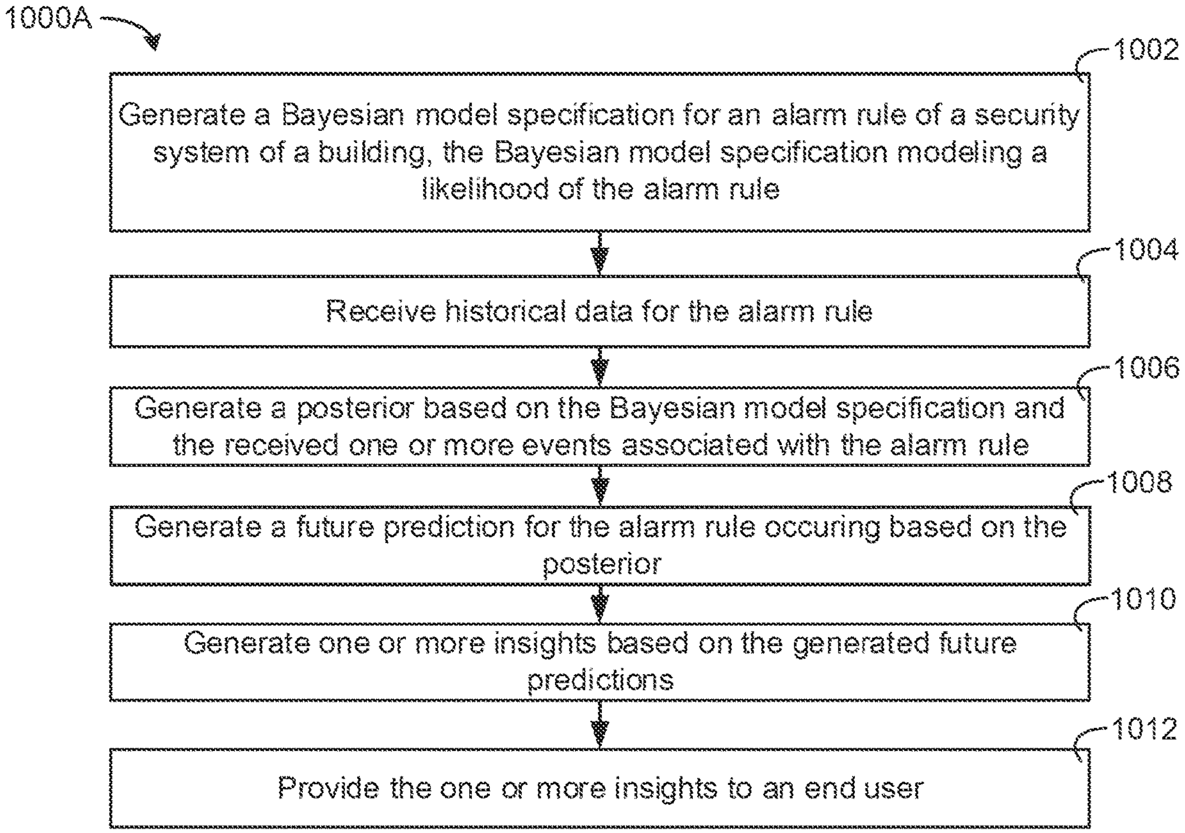
FIG. 10A is a flow diagram of a process that can be performed by the alarm analysis system of FIG. 4 for performing Bayesian analysis of historical alarm data to generate a prediction of future alarms triggering, according to an exemplary embodiment.
Figure 10B:
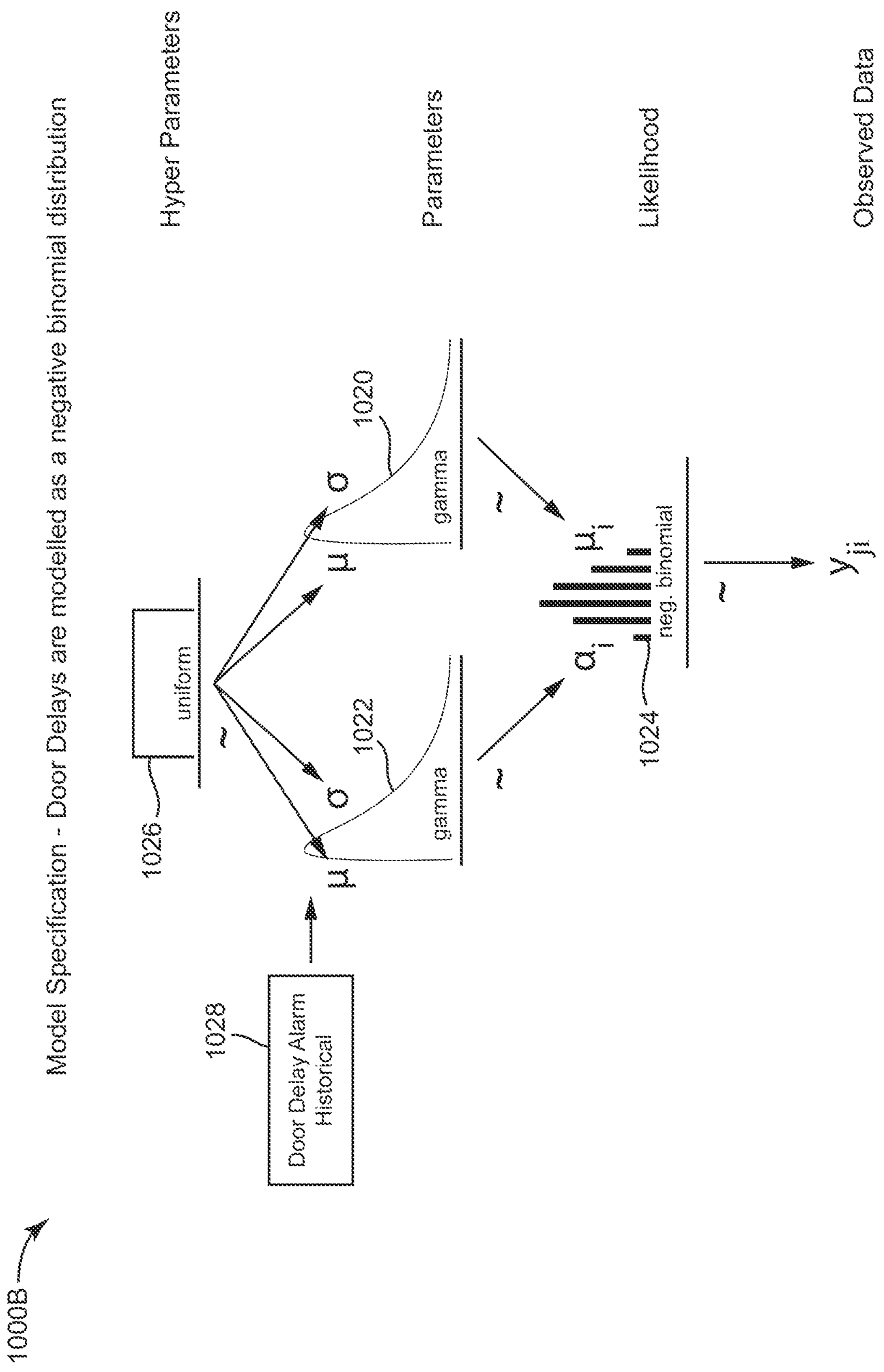
FIG. 10B is a diagram of a Bayesian model specification that can be used in the process of FIG. 10A to generate the prediction of future alarms triggering, according to an exemplary embodiment.
Figure 10C:
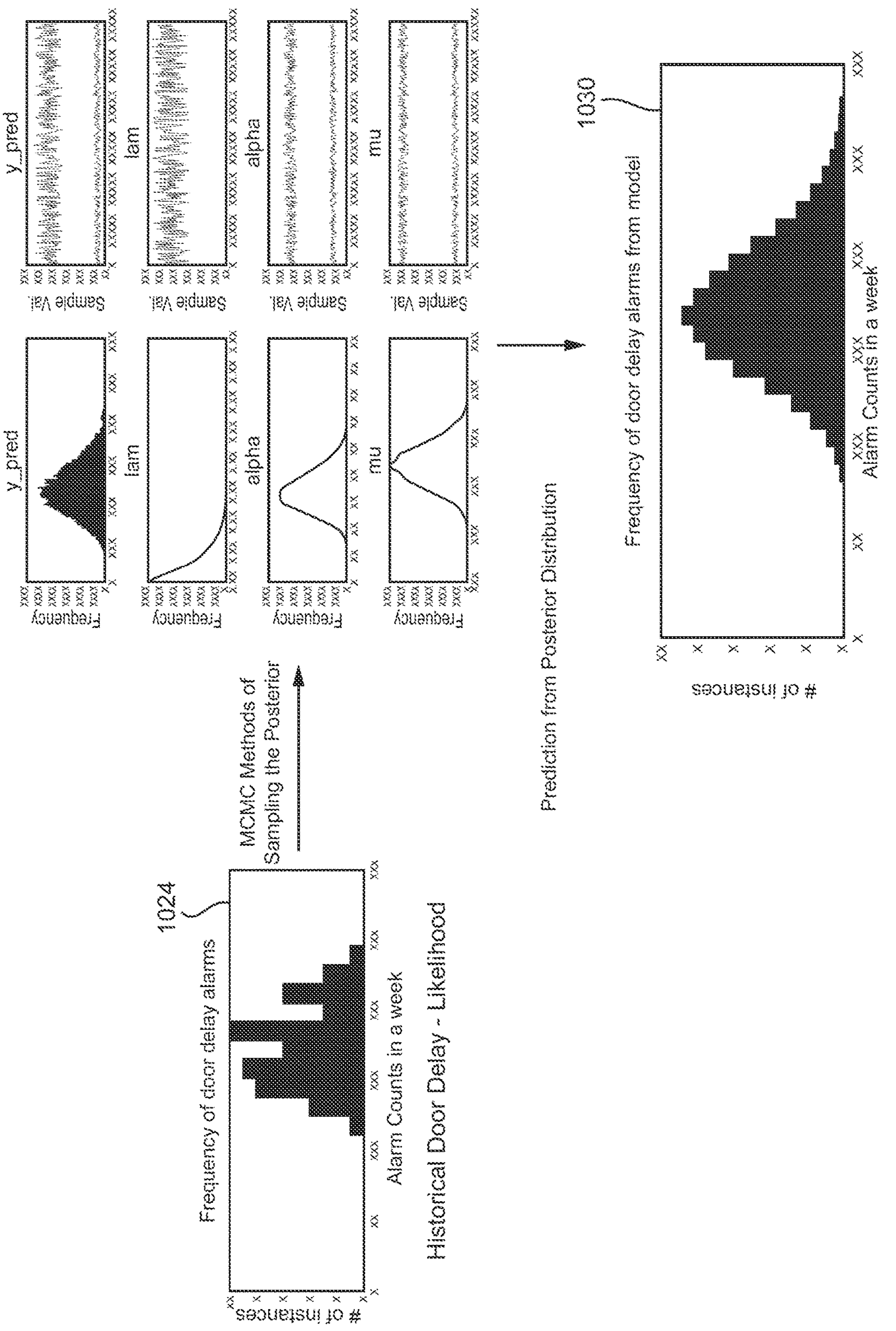
FIG. 10C is a diagram graphically illustrating the steps of the process of FIG. 10A for generating the prediction of the future alarms triggering, according to an exemplary embodiment.

Process 900 relates to what happens at the system, how much did the system drift from the normal operations and what actions we need to take to make it return to normal operating mode with reduced false alarms. FIGS. 10A-10C relate to performing predictions (e.g., with Markov Chain Monte Carlo (MCMC) methods) to predict what rules are going to trigger in the future (e.g., next week). By determining what rules are going to trigger in the future, recommendations can preemptively be made in terms of programming changes and/or on sight maintenance (e.g., truck roles) in order to suppress false alarms.

FIGS. 7 and 8 disclose a method for determining what causes an event sequence and relates different event sequences that arise from similar causes. With these actionable insights in place e.g., the false alarm rules 518, prediction of frequency of detected event sequences may be made for a particular building. Making the assumption that conditions remain the same, the prediction model predicts the number of such actionable insights expected. Each set of actionable insights may be modeled separately.

Referring now to FIG. 10A, a process 1000A for predicting alarm rules 518 that will occur in the future by the alarm analysis system 222 is shown, according to an exemplary embodiment. The process 1000A can predict which rules will occur in the future. Based on the historical pattern of the rules, the alarm analysis system 222 can perform a Bayesian inference to predict how many of the rules are going to fire the following week and subsequently how much the system is going to drift from the normal operations. The alarm analysis system 222 can be configured to perform the process 1000A. Furthermore, any one or combination of computing devices can be configured to perform the process 1000A. The process 1000A may be performed for a single rule. Therefore, the process 1000A can be performed for each of the alarm rules 518.

In step 1002, the Bayesian predictor 520 can be configured to generate a Bayesian model specification for a false alarm rule 518. The Bayesian model specification may model a likelihood function of the false alarm rule based on one or more priors (e.g., informative priors and/or non-informative priors), hyper-priors (e.g., informative hyper-priors and/or non-informative hyper-priors), parameters, and/or hyper-parameters. An example of a Bayesian model specification and probabilistic programming is shown in FIG. 10B that can be used to predict insights for individual building sites or for multiple building sites. Action insights can be predicted for a subsequent week at a site level (single building site) or at a customer level (all building sites of a customer).

In step 1004, the Bayesian predictor 520 can receive historical data for the false alarm rule 518. In some embodiments, the Bayesian predictor 520 receives data indicating when the alarm rule has been triggered and how many times the alarm rule has been triggered in a particular period of time in the past. In step 1006, based on the model specification and the historical data of the alarm rule, the Bayesian predictor 520 can generate a posterior for the alarm rule. The posterior may be a probability distribution for a parameter of the Bayesian model specification based on both prior assumptions for parameter of the Bayesian model specification and the historical data for the parameter.

In step 1008, based on the posterior distribution, predictions for the alarm rule can be made for a future period of time. For example, based on the posterior distribution, a frequency of times that the alarm will fire in the future is determined. For example, for a week into the future, the future prediction may indicate a probability distribution may indicate may many times the alarm may occur in the future week.

In step 1010, based on the future prediction, the recommendation generator 522 can generate a recommendation to perform parameter changes, order maintenance, etc. In some embodiments, recommendation generator 522 may generate an insight based on the recommendation 526 for the predicted alarm if the alarm is predicted to occur a predefined amount of times in the future. In step 1012, the interface system 220 can provide the insight to the user device 226. In some embodiments, the insight may be to adjust parameters or perform maintenance on the security system 202*a*. In some embodiments, if the recommendation for the rule is to update or adjust a parameter, the alarm analysis system 222 can automatically perform the parameter adjustment.

Referring to FIGS. 10B-10C, Bayesian inference and probabilistic programming for the prediction is shown for predicting outcomes, the outcomes being detected event sequences or, in the alternative, the causes determined from the processes of any of FIGS. 1-3 as giving rise to detected event sequences.

FIG. 10B shows a model 1000B for door delay rules that can be used to model door delay insights. In some embodiment, every false alarm rule 518 is modeled as a probability distribution. In the example of FIG. 10B, the door delay rule is modeled as a negative binomial distribution 1024. Gamma distributions of prior events (e.g., a gamma priors 1020 and 1022) may be employed for the negative binomial distribution. Uniform distributions 1026 may be employed as a hyper-priors for parameters of the gamma distributions (hyper-parameters). In one example, when the panels emit signals only during abnormal conditions and there is no insight into what is occurring during normal working hours, based on the data collected, the count of these insights can be modeled as a probability distribution. Using the door delay data 1028, arrival at the posterior distribution using Markov Chain Monte Carlo (MCMC) methods is achieved (FIG. 10C). In other words, using the door delay data 1028 generated according to the methods described herein to obtain information about what cause gives rise to a particular event sequence, one may obtain, from the process depicted in FIGS. 10B-10C, a frequency of such causes to occur in the future 1030.

In some embodiments, a Bayesian analysis, e.g., the Bayesian analysis detailed with reference to FIGS. 10A-10C, can be used to perform real-time or post event scoring of alarms. The analysis can identify, based on the false alarm rules 518, how many alarms may occur in the future if a recommendation to prevent false alarms is taken by a user and also if the recommendation to prevent false alarms is not taken by the user. In some embodiments, a recommendation can be provided with a confidence score which identifies how likely implementing the recommendation will reduce false alarms.

Figure 11:
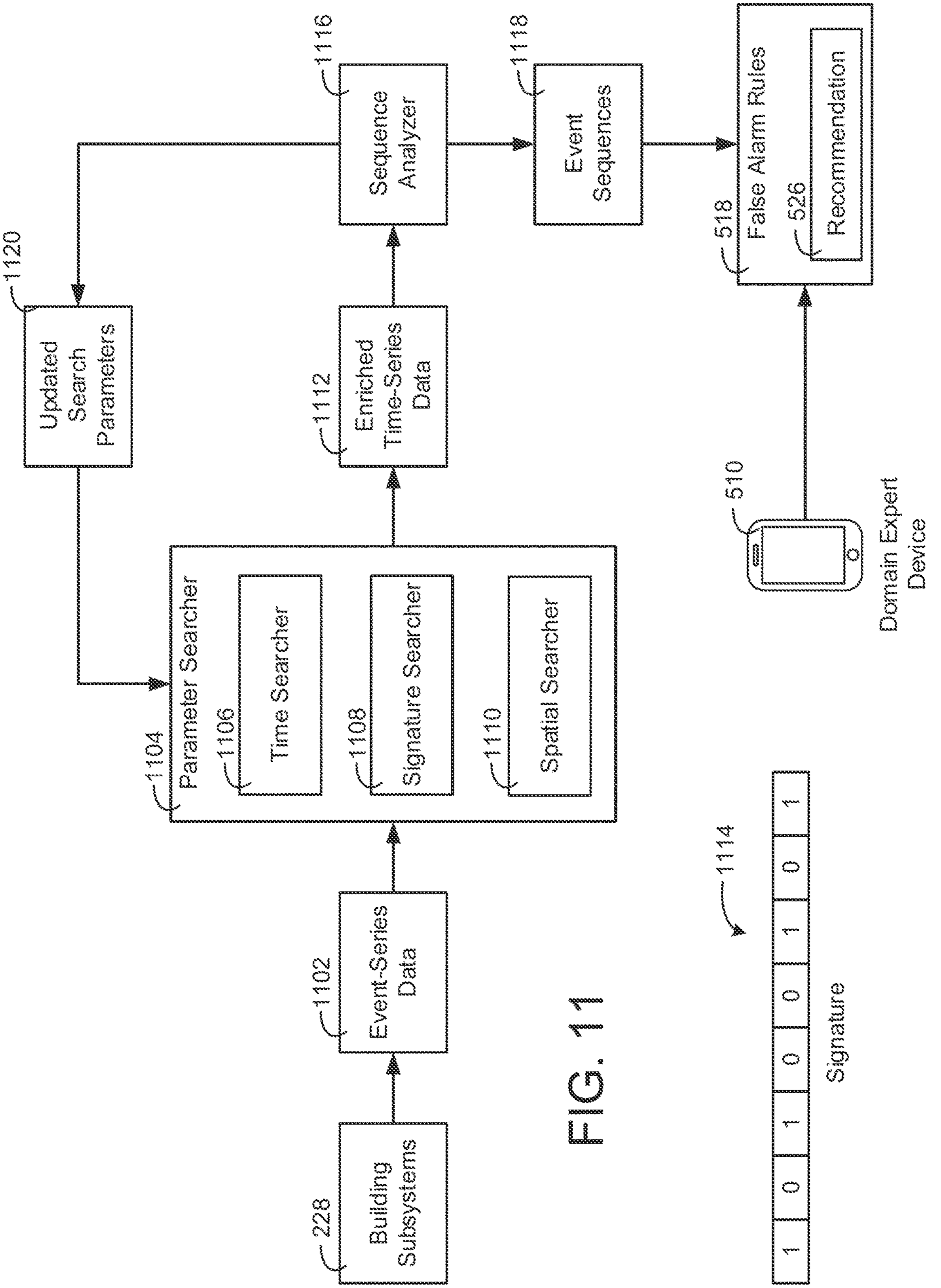
FIG. 11 is a block diagram of components of the alarm analysis system of FIG. 4 for determining false alarm rules by converting event-series data into enriched time-series data, according to an exemplary embodiment.

Referring now to FIG. 11, a block diagram of components of the alarm analysis system 222 of FIG. 4 are shown configured to determine the false alarm rules 518 by converting event-series data to enriched time-series data, according to an exemplary embodiment. In FIG. 11, event-series data 1102 is received from the building subsystems 204. The event-series data 1102 may be events that are generated within the building 10 by a device of the building subsystems, e.g., an alarm triggering, detecting occupancy in a particular zone, an abnormal temperature fluctuation, a user entering a user ID into a security keypad, a communications error message, and/or any other security, fire, or HVAC related event including those discussed elsewhere herein.

The event-series data 1102 can be analyzed by the parameter searcher 1104. The parameter searcher 1104 can be configured to generate the enriched time-series data 1112. The enriched time-series data 1112 can be generated from the event-series data 1102 based on the time searcher 1106, the signature searcher 1108, and the spatial searcher 1110 of the parameter searcher 1104. The parameter searcher 1104, via the time searcher 1106, the signature searcher 1108, and the spatial searcher 1110, can group and analyze the event-series data 1102 to generate related and grouped event data, i.e., the enriched time-series data 1112. In some embodiments, the parameter searcher 1104 can be configured to group data based on data granularity, e.g., site level, system level, based on verticals, etc.

In some embodiments, time searcher 1106 can be configured to generate the enriched time-series data 1112 based on a time parameter. The time parameter may act as a time window that filters the event-series data 1102 to generate the enriched time-series data 1112. The time searcher 1106 can generate the enriched time-series data 1112 by grouping the event-series data 1102 by determining events that occur within the time window (e.g., a fifteen minute time window). In some embodiments, the time window is arrived at by performing multiple iterations that testing various value for the time window (e.g., incrementing the time window for each iteration). An example of grouping the event-series data 1102 based on a time window may be the following. A time window is set to 10 minutes and a first event A that is associated with a time stamp 10:30 A.M. is grouped with a second event B that is associated with a time stamp of 10:35 A.M. However, a third event C associated with a time stamp of 10:57 A.M. is not grouped with the first event A.

The spatial searcher 1110 can be configured to group the events based on associations between spatial location filter. For example, occupancy detection in a Zone A may be grouped with occupancy detection in a Zone B since the spatial location filter may be configured to group events associated with Zone A and events associated with Zone B. This may be because Zone A and Zone B are located next to each other in the building 10. In some embodiments, the spatial searcher 1110 can include a spatial distance. Events that occur within the spatial distance, i.e., a predefined distance from each other or within a predefined area, can be grouped. However, the value for the spatial window can be iteratively updated until a predefined number of event sequences 1118 are determined. For example, the spatial distance could start at a low value and be iteratively increased until a predefined number of event sequences 1118 are determined. Similarly, the time searcher 1106 could start at a small time window and iteratively increase the time window by a predefined amount until a predefined amount of event sequences 1118 are determined.

The signature searcher 1108 can be configured to search the event-series data 1102 with a signature parameter. The signature parameter can identify events of the event-series data 1102 that are associated with specific binary patterns. For example, a particular binary pattern may be the signature 1114. For example, the signature 1114 may be used to group particular events together if they fit the pattern of the signature 1114.

The enriched time-series data 1112 can be fed into the sequence analyzer 1116. The sequence analyzer 1116 can be configured to analyze the enriched time-series data 1112 to generate the event sequences 1118. For example, the sequence analyzer 1116 can be configured to perform a GSP algorithm and/or a Markov Chain Analysis as discussed with further reference to FIGS. 6A and 6B. Furthermore, the sequence analyzer 1116 can be configured to generate the event sequences 1118 based on the enriched time-series data 1112 with various sequence mining algorithms such as Sequential PAttern Discovery Using Equivalence Classes (SPADE), FreeSpan, PrefixSpan, MAPres, etc.

The sequence analyzer 1116 can be configured to adjust the parameters used by the parameter searcher 1104 to perform the grouping of the event-series data 1102 to generate the enriched time-series data 1112. The sequence analyzer 1116 can generate updated search parameters 1120 and utilize the updated search parameters 1120 to recursively update the enriched time-series data 1112. In this regard, the sequence analyzer 1116 can iteratively determine the event sequences 1118 by generating and/or adjusting the updated search parameters 1120. The sequence analyzer 1116 can adjust the update search parameters 1120 until desired (e.g., optimal) updated search parameters 1120 are identified by the sequence analyzer 1116. For example, the identified search parameters may be search parameters that cause a predefined number of event sequences 1118 to be identified.

The event sequences 1118 can be used to generate the false alarm rules 518. The alarm analysis system 222 can present the event sequences 1118 to the domain expert via the domain expert device 510 so that the domain expert can accept or reject the event sequences 1118 as the false alarm rules and provide the recommendation 526 to each of the false alarm rules 518.

Figure 12:
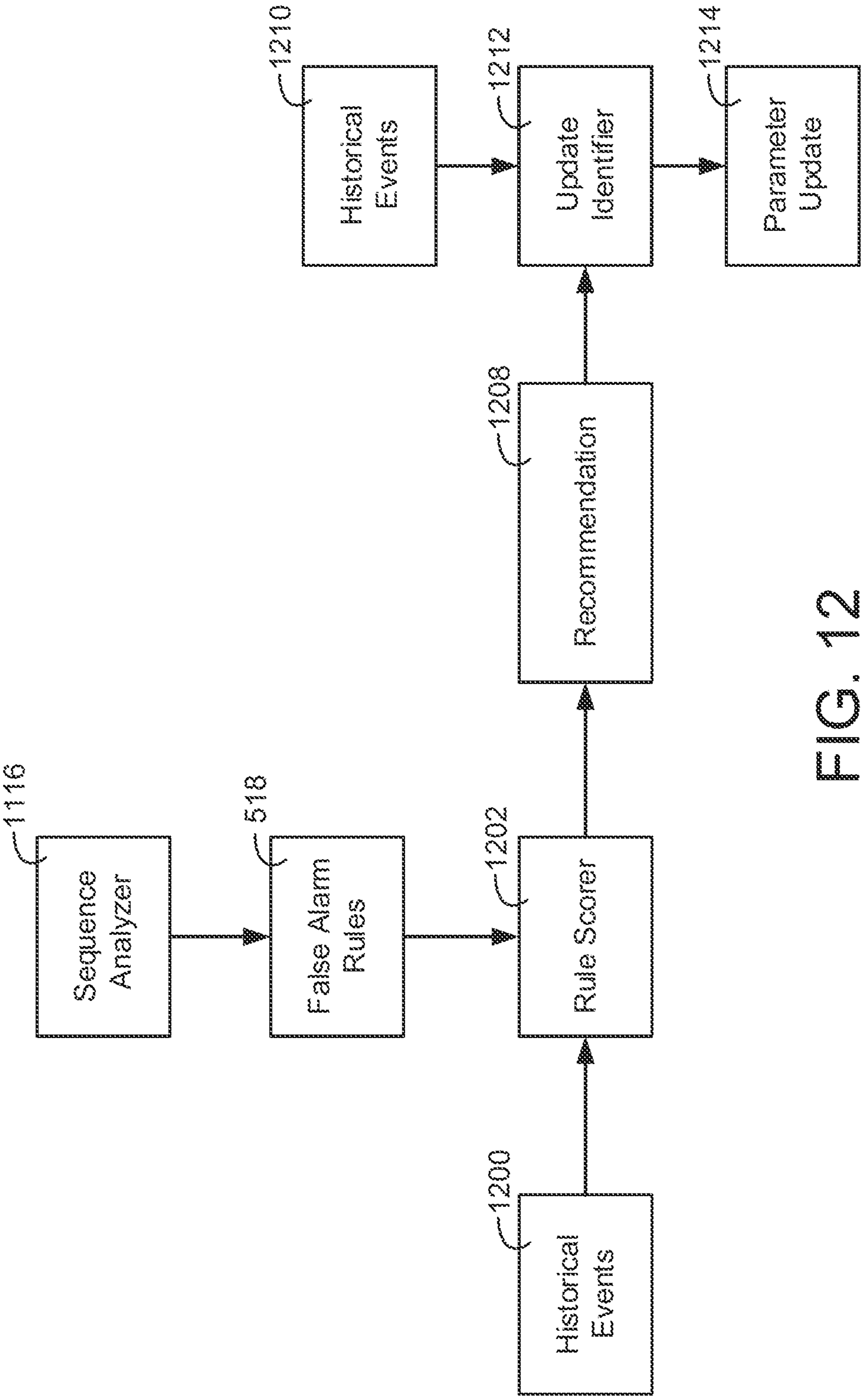
FIG. 12 is a block diagram of components of the alarm analysis system of FIG. 4 for determining a recommendation and identifying a parameter update for the recommendation, according to an exemplary embodiment.

Referring now to FIG. 12, a block diagram of components of the alarm analysis system 222 of FIG. 4 configured to generate parameter updates for building equipment to reduce false alarms is shown, according to an exemplary embodiment. In FIG. 12, historical events 1200 are shown as inputs to a rule scorer 1202. The historical events 1200 can be events of the building 10*a*, for example, the events may be events of the historical security database 512 as described with reference to FIG. 4. The historical events 1200 can be events collected over a day, a month, a year, and/or any other length of time. The rule scorer 1202 can determine, based on the historical events 1200 and the false alarm rules 518, a recommendation 1208. The rule scorer 1202 can be configured to classify the historical events 1200 and determine whether a particular false alarm rule of the false alarm rules 518 applies to the historical events 1200. The rule scorer 1202 can generate the recommendation 1208 based on the classification.

The recommendation 1208 may be a recommendation to replace a battery, reposition a sensor, adjust a door delay time, etc. The recommendation 1208 may be paired with the particular false alarm rule that applies to the historical event 1200. An update identifier 1212, based on the recommendation 1208 and the historical events 1200, can generate a parameter update 1214 for the building subsystems of the building 10*a*. The parameter update 1214 can be an update to a door delay time for an intrusion system, can be an update to a sensitivity level for a vibration sensor which detects intrusions, and/or any other parameter of the building subsystems. The parameter update 1214 can be pushed to the building equipment for automatic self-healing. In some embodiments, the update identifier 1212 presents the parameter update 1214 to an end user for review and approval. In some embodiments, the update identifier 1212 automatically (e.g., with user pre-approval) pushes the parameter update 1214 to the building subsystems.

The update identifier 1212 can be configured to determine an optimal parameter update 1214 based on the historical events 1210 and the recommendation 1208. The update identifier 1212 can be configured to perform various statistical and/or machine learning techniques to determine the optimal parameter update 1214 value. Examples of such learning mechanisms may be the metropolitan hasting algorithm, a neural network, a deep neural network, a decision tree, or a Bayesian analysis (e.g., for example the Bayesian analysis described in FIGS. 10A-10C). The recommendation 1208 may be a recommendation to reprogram a door delay for a particular door. In this regard, the update identifier 1212 can be configured to generate an updated door delay (the parameter update 1214) based on historical events 1210 associated with the particular door. An example of determining the parameter update 1214 is shown in further detail with regard to FIGS. 13-14.

Figure 13:
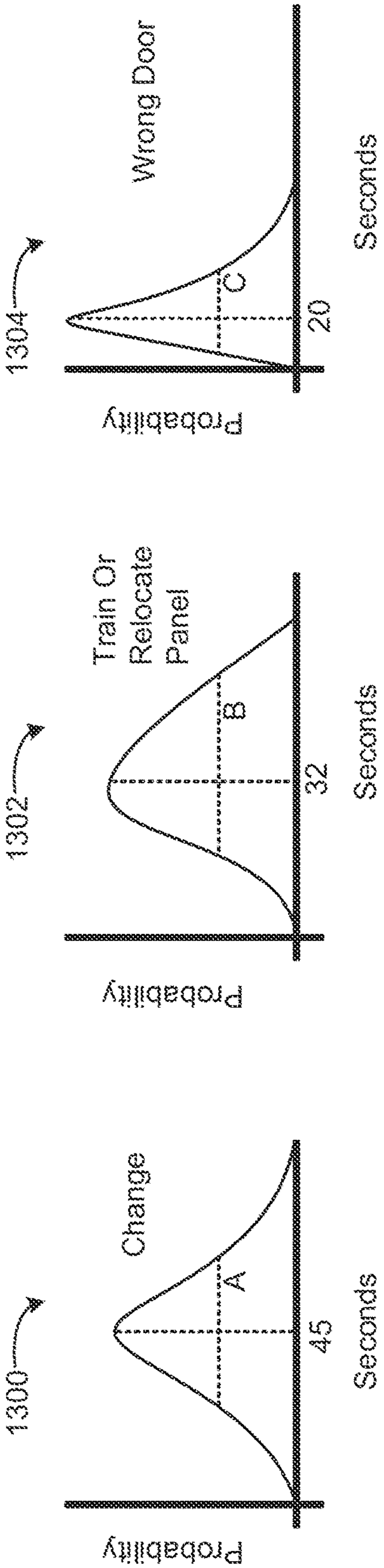
FIG. 13 is a set of drawings illustrating door delay alarm probability distributions determined from historical door delay data for use by the alarm analysis system of FIG. 4 in determining a recommendation to reduce false alarms, according to an exemplary embodiment.

Referring now to FIG. 13, three exemplary probability distributions for door delay amounts for a particular door are shown, according to an exemplary embodiment. The probability distributions can be determined by the update identifier 1212 based on the historical events 1200. For example, the probability distributions 1300, 1302, and 1304 can be determined as the probability of a user taking a particular amount of time from opening a door to entering in a user identifier (e.g., a personal identifier code (PIC) to cancel an alarm) into a security keypad. As shown in FIG. 13, three different distribution spreads are shown, A, B, and C and medians for each probability distribution 1300-1304 are shown to be 45 seconds, 32 seconds, and 20 seconds. The update identifier 1212 can analyze the distribution spread and the median values to identify what value to set the parameter update 1214 to.

If the distribution spread is less than a predefined amount, the median value of the distribution can be used as the door delay. In distribution 1300, the spread A is less than the predefined amount. Therefore, if the update identifier 1212 determines a distribution such as the distribution 1300, the parameter update 1214 would be the median of the distribution, e.g., 45 seconds as shown the distribution 1300.

If the distribution spread is greater than the predefined amount, rather than generating the parameter update 1214, the update identifier 1212 may determine that a parameter update is unnecessary and that user error is responsible for false alarms that may be occurring. For example, users may not be attentive to promptly entering their user ID at the security keypad. Furthermore, this may be indicative of the security access system being poorly located, i.e., it may be too far away from the door or positioned in a location where some users are having a difficult time finding the security keypad when entering the building.

If the distribution is skewed as in the distribution 1304, rather than generating the parameter update 1214, the update identifier 1212 may determine that a parameter update is unnecessary and that users are using the wrong door of the building 10*a*. In this regard, the update identifier 1212 can be configured to generate a recommendation to improve user training. For example, users may not understand which doors they should be entering through.

Figure 14:
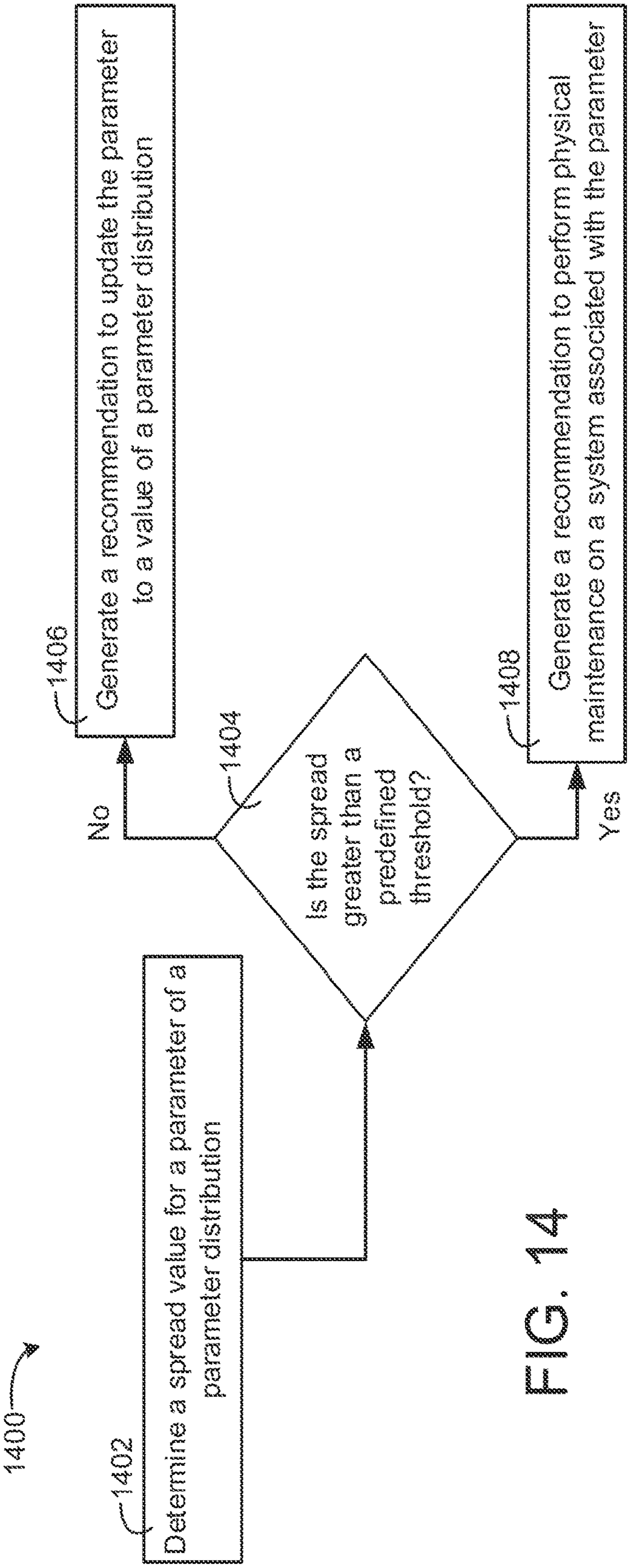
FIG. 14 is a flow diagram of a process for analyzing the door delay alarm probability distributions for FIG. 13 by the alarm analysis system of FIG. 4 to determine a recommendation to reduce false alarms related to door delay, according to an exemplary embodiment.

Referring now to FIG. 14, a process 1400 for determining the parameter update 1214 for a door delay is shown, according to an exemplary embodiment. The process 1400 can be performed by the alarm analysis system 222 and/or the systems described in FIG. 12 (e.g., the update identifier 1212). The process 1400 can be performed after a door delay event sequence has triggered, e.g., a specific false alarm rule 518 for door delays. Performing the process 1400 after detecting the false alarm rule 518 may provide a specific recommendation for reducing false alarms associated with door delays. For example, a sequence of events for a door delay may be a user opening a door at a particular time in the morning motion being detected in a particular zone, an alarm being generated due to a door delay, and a user entering a PIC in a security keypad could be a door delay event sequence.

In step 1402, the update identifier 1212 can be configured to generate a probability distribution for a door delay based on historical event data. Based on the probability distribution, the update identifier 1212 can generate a spread for the probability distribution. The spread value used to analyze the probability distribution may be a variance or standard deviation.

In step 1404, the update identifier 1212 can compare the spread to a predefined threshold. If the spread is not greater than the predefined threshold, the update identifier 1212 can perform the step 1406. If the spread is greater than the predefined amount, then the update identifier 1212 can perform the step 1408. In step 1406, the update identifier 1212 can generate the parameter update 1214 to be the median value for the door delay distribution generated at the step 1402.

If the spread is greater than the predefined threshold, the process 1400 can move to step 1408. In the step 1408, the update identifier 1212 can generate a recommendation to change a door delay system associated with the door delay distribution. The recommendation may be to relocate the key in pad to be closer to the door or in a more visible location. Furthermore, the recommendation may be to improve the training of users who are punching into the key in pad.

Figure 15A:
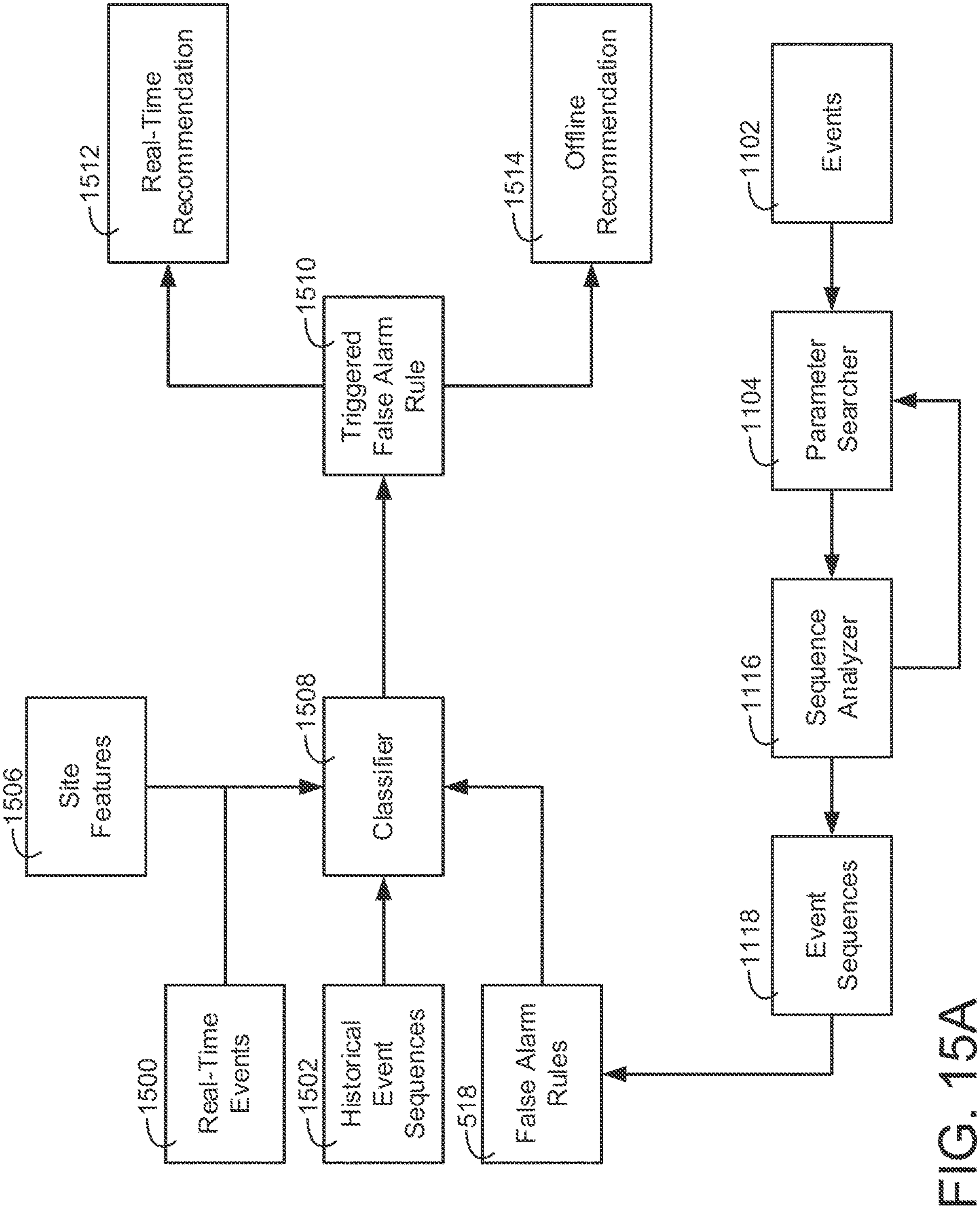
FIG. 15A is a block diagram of components of the alarm analysis system of FIG. 4 for using a classifier to determine a recommendation, according to an exemplary embodiment.

Referring now to FIG. 15A, a block diagram of components of the alarm analysis system 222 of FIG. 4 configured to generate recommendations for false alarm reduction based on a classifier 1508, according to an exemplary embodiment. With the false alarm rules 518, a model can be used to determine which alarm rules 518 have been triggered. The model can be implemented with a classifier 1508 which can be a neural network, a deep neural network, a decision tree, etc. The model can be formalized as the following equation, $$Y=F(x) \qquad \text{(Equation 11)}$$

where Y is an identified false alarm rule of the false alarm rules 518, x represents historical events or other data (e.g., the site features 1506), and F(•) is an n classifier configured to identify the false alarm rule Y.

In FIG. 15A, the classifier 1508 is shown to take site features 1506, real-time events 1500, historical events 1502, and false alarm rules 518 as inputs and generate the triggered false alarm rule 1510 as an output. The triggered false alarm rule 1510 can be a particular false alarm rule of the false alarm rules 518 selected by the classifier 1508 based on the inputs. The triggered false alarm rule 1510 that can be identified by the classifier 1508 may be dependent on the false alarm rules 518.

The classifier 1508 can be a trained model configured to take multiple inputs to generate the triggered false alarm rule 1510. In some embodiments, the classifier 1508 is a neural network classifier (e.g., a deep neural network), a Naïve Bayes model, a Logistic Regression, a Decision Tree, a Support Vector Machine (SVM), a Random Forest, and/or any other model or machine learning technique that can be used in classification. The triggered false alarm rule 1510 can be an identification of one of the false alarm rules 518. Based on the identified false alarm rule 518, the alarm analysis system 222 can generate a real-time recommendation 1512 and/or an offline recommendation 1514.

The real-time recommendation may be a recommendation generated based on real-time event data, i.e., the real-time events 1500. In this regard, as data is collected for the building 10*a*, the classifier 1508 can be operated to identify whether false alarm rules 518 are triggered. This can allow an end user to quickly respond to perform actions that will prevent false alarms before they ever occur. In some embodiments, the classifier 1508 can determine that three sequential events are indicative of a false alarm occurring. In this regard, if the first event and then the second event occur, or the first event, then the second event, and then the third event occur, the classifier can identify the triggered false alarm rule 1510 to generate the real-time recommendation 1512. Furthermore, instead of analyzing the real-time events 1500 (or in addition to analyzing the real-time events 1500) the classifier 1508 can analyze historical event sequences 1502. The historical event sequences 1510 can be a database of events that has occurred in a previous predefined amount of time. Based on these historical event sequences 1502, one or multiple triggered false alarm rules 1510 can be determined by the classifier 1508 for determining the offline recommendation 1514.

Figure 15B:
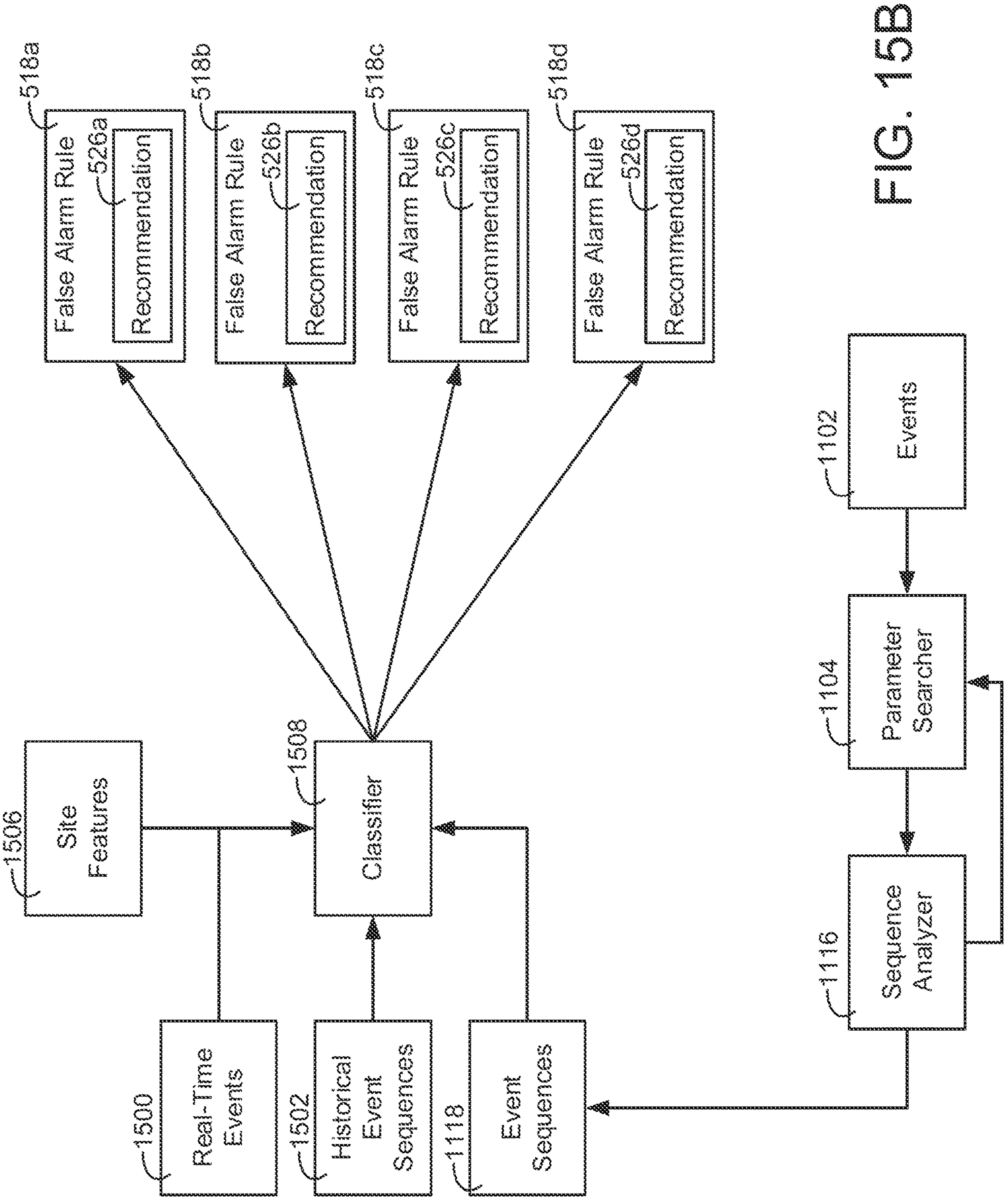
FIG. 15B is a block diagram of components of the alarm analysis system of FIG. 4 for using a classifier to classify an event sequence as a false alarm rule, according to an exemplary embodiment.

Referring now to FIG. 15B, a block diagram of components of the alarm analysis system 222 of FIG. 4 configured to classify event sequences 1118 as false alarms is shown, according to an exemplary embodiment. In FIG. 11, FIG. 9A, and FIG. 9B, rules are surfaced for a domain expert to classify and provide insight for the particular rule. However, rather than relying on a domain expert to provide contextual information (e.g., a false alarm reduction recommendation) for an identified event sequence 1118, the alarm analysis system 222 can utilize the classifier 1508 to classify the event sequences 1118 into particular predefined false alarm rule categories associated with predefined false alarm reduction recommendations.

As shown in FIG. 15B, rather than the classifier 1508 receiving the false alarm rules 518 to classify for generating a recommendation, the classifier 1508 of FIG. 15B receives the event sequences 1118 generated by the sequence analyzer 1116. The classifier 1508 can be a categorical classifier configured to classify the event sequence 1118 as a particular type of false alarm rule, e.g., one of the false alarm rule 518*a*, 518*b*, 518*c*, and/or 518*d*. Each of the false alarm rules 518*a*-518*d* may be a particular false alarm rule that a domain expert may generate and add contextual information for (e.g., the recommendations 526a-526d). The false alarm rules 518a-518d can be false alarm rules generated by the process 900 of FIGS. 9A-9B where the domain expert device 510 provides contextual information. However, once these categorical false alarm rules are established, subsequent event sequences 1118 can be classified under one of the already generated false alarm rules.

In some embodiments, the classifier 1508 analyzes the particular sequence of events of the event sequences 1118 to identify which false alarm rule 518a-518d the event sequence 1118 should be classified as. However, in some embodiments, additional information can be used to perform the classification such as site features 1506, real-time events 1500, and/or historical event sequences 1502.

Figure 16:
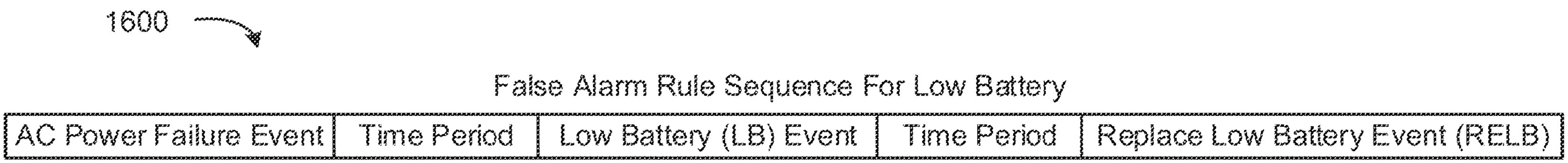
FIG. 16 is a diagram of a false alarm rule sequence for a low battery, according to an exemplary embodiment.

Referring now to FIG. 16, a false alarm rule sequence for low battery detection rule 1600 is shown, according to an exemplary embodiment. The false alarm rule 1600 may be one of the false alarm rules 518. The false alarm rule 1600 can be a sequence of events that describes a false alarm that results from a low battery. The false alarm rule 1600 includes three specific events for a particular piece of building equipment, an Alternating Current (AC) power failure event, a Low Battery (LB) event, and a Replace Low Battery Event (RELB). The building equipment can include a main AC power source with a supplemental battery backup. The building equipment can be powered via the AC power source when the AC power source is available and via the supplemental battery backup when the AC power source is unavailable.

The first event of the false alarm rule sequence 1600 is the AC power failure event for the piece of building equipment. After the AC power failure event, the building equipment begins to operate based on the supplemental battery backup. Then, a first predefined amount of time after the AC power failure event, a second event, the LB event occurs. This event may be the building equipment generating a low battery notification. After a second period of time, the RELB event may occur indicating that a low battery needs to be replaced.

After the AC power failure event, the building equipment may be at an increased risk of creating a false alarm event. The battery may be discharged before a user can replace the battery or before a user is aware that the battery needs to be replaced. However, the systems and methods discussed herein can generate a recommendation that notifies an end user that a battery needs to be replaced within a particular time window. Every type of building device and battery may be unique, therefore, there may not be one single time window. Therefore, the systems and methods discussed herein can identify an optimal window for replacing the battery of the building equipment and generate and push a work order to a technician to replace the battery within the optimal window.

Figure 17:
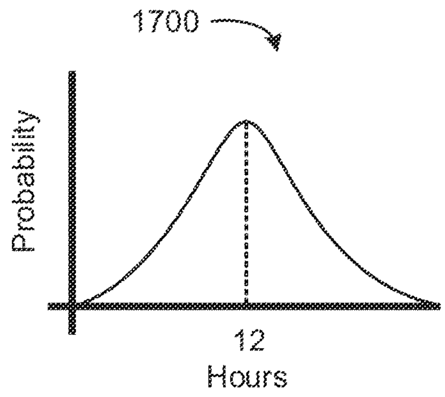
FIG. 17 is a probability distribution indicating an optimal time period to replace the battery after a power failure event, according to an exemplary embodiment.

Referring now to FIG. 17, a battery replacement window probability distribution 1700 is shown, according to an exemplary embodiment. The distribution 1700 can be a distribution which identifies the optimal time from when an AC power failure event occurs that the battery should be replaced. In some embodiments, the probability distribution is generated based on historical data that indicates a time period between the AC power failure event and the LB event. It may be optimal practice to change the battery of the building equipment before the LB event occurs. In some embodiments, the distribution 1700 is further based on a particular type or characteristics of the battery that needs replacing and/or the install date of the battery.

In some embodiments, the median of the distribution may be the optimal time window to use in replacing the battery. However, since every battery has its own charge amount, discharge rate, and the equipment which the battery powers can cause the battery to discharge at varying amounts, the distribution 1700, since generated from historical data specific to the building equipment.

Figure 18:
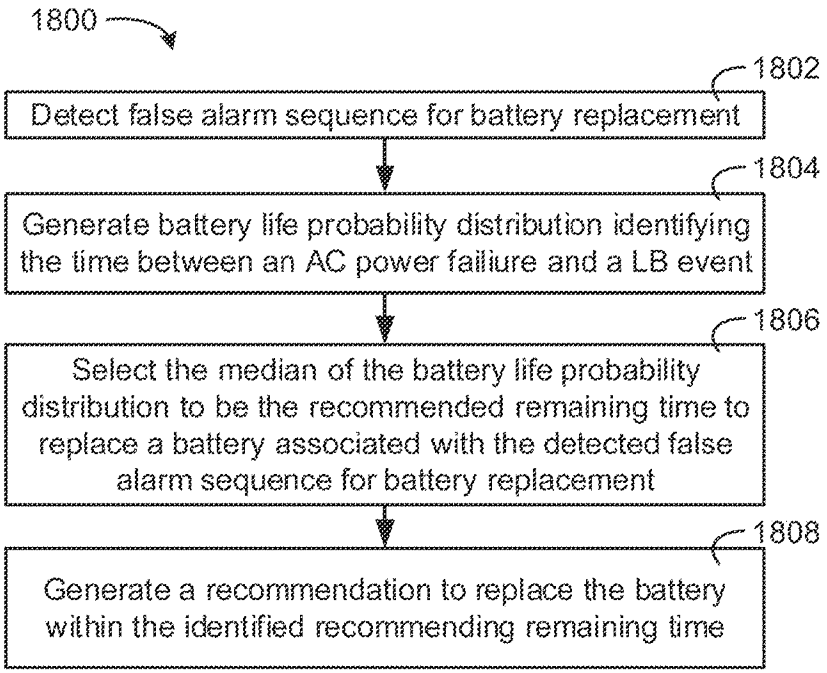
FIG. 18 is a flow diagram of a process for detecting the false alarm rule sequence for the low battery of FIG. 16 and generating a recommendation based on the optimal time period of FIG. 17, according to an exemplary embodiment.

Referring now to FIG. 18, a process 1800 for detecting a false alarm rule sequence and generating a recommendation to replace the battery is shown, according to an exemplary embodiment. The process 1800 can be performed by the alarm analysis system 222 of FIG. 5A. Furthermore, any computing device described herein can be configured to perform the process 1800.

In step 1802, the alarm analysis system 222 can detect a false alarm sequence for battery replacement, e.g., the false alarm rule 1600 of FIG. 16 based on historical and/or real-time data. In some embodiments, detecting the false alarm rule 1600 triggering includes identifying that the AC power failure event has occurred for a piece of building equipment.

In step 1804, the alarm analysis system 222 can generate a battery life probability distribution identifying the probability of times between the AC power failure event and the LB event. It may be desirable that the battery be replaced before the LB event following the AC power failure event. In some embodiments, the distribution is a prediction performed with a machine learning technique e.g., Bayesian modeling, Metropolis Hastings Algorithm, etc. In some embodiments, step 1804 is performed in response to the step 1802 being performed. In some embodiments, the step 1804 is performed prior to the step 1802 occurring such that machine learning can be performed prior to the AC power failure event occurring since the machine learning used to generate the distribution 1700 may require a predefined amount of time to occur.

In step 1806, the alarm analysis system 222 can select an optimal time window for replacing the battery. In some embodiments, the time window is determined from the distribution 1700. For example, the median value of the distribution 1700 may be used as the time window for replacing the battery. In some embodiments, the time window, A is modified via an offset. For example, the time window A can be offset by a value B, e.g., A±B. In some embodiments, B is a predefined offset. In other embodiments, B is a standard deviation or variance of the distribution 1700. In some embodiments, the offset may be applied as A−B to provide an overhead amount of time to account for error and reduce the likelihood that the LB event occurs before the time A expires. In step 1808, the alarm analysis system 222 can generate a recommendation to replace the battery within the identified time window as determined in the step 1806.

In some embodiments, the time window is based on parameters of the battery. For example, the alarm analysis system 222 may consider battery life. Based on an installation date and/or time (or battery replacement date and/or time) and a current date and/or time, the alarm analysis system 222 can determine the time window. Furthermore, the alarm analysis system 222 can be configured to utilize characteristics of the equipment to identify the time window. For example, based on a model number, the alarm analysis system 222 can identify characteristics of the equipment that relate to how quickly the battery of the equipment discharges. For example, power requirements of the equipment can be used to identify the time window that the alarm analysis system 222 can identify based on the model number of the equipment. In this regard, the time window determined based on historical data can be adjusted based on the age of the battery and/or characteristics of the equipment.

Furthermore, the time window can be based on historical data of similar equipment and/or similar battery age. For example, the alarm analysis system 222 can select relevant historical equipment battery life data (e.g., data that pertains to batteries of similar capacities as the battery in question, similar equipment characteristics of the equipment in question, etc.) and then identify the time window based on the relevant historical data. The alarm analysis system can be configured to generate a probability distribution for relevant historical data and analyze the probability distribution to generate the time window.

Figure 19:
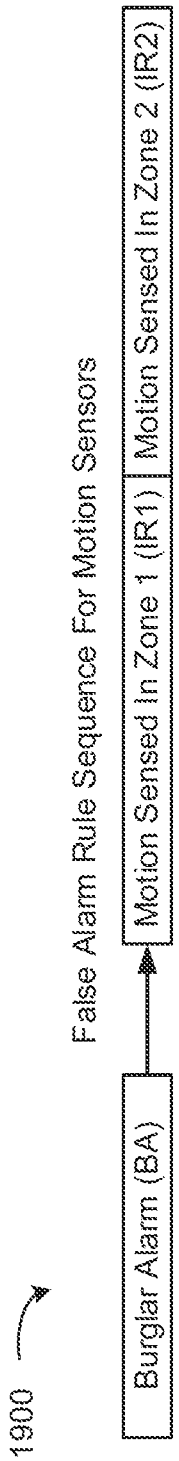
FIG. 19 is a false alarm rule sequence for motion sensors, according to an exemplary embodiment.

Referring now to FIG. 19, a false alarm rule sequence 1900 for motion sensors is shown, according to an exemplary embodiment. The false alarm rule 1900 may be one of the false alarm rules 518. The false alarm rule 1900 can be a sequence of events that describe a false alarm that occurs during the opening and/or closing of a building. The false alarm rule 1900 includes three specific events, a burglar alarm (BA), followed by motion detected in a first zone (IR1) and motion detected in a second zone (IR2). Such a false alarm rule 1900 may be indicative of a burglar alarm, e.g., a door being opened, followed by motion being sensed in neighboring zones, i.e., Zone 1 may lead into, or be connected to, Zone 2. This may be an example third order sequence that can be determined by a GSP analysis and/or a third order Markov Chain analysis. If the false alarm rule 1900 triggers at a particular time of day, e.g., at an opening time of the building, the BA may be a false alarm event since a user may simply be opening up the building and walking through the building to an alarm panel or clock in station. In this regard, the alarm analysis system 222 can detect the alarm rule sequence 1900 and generate an appropriate recommendation to reduce false alarms from occurring at an opening or closing time.

Figure 20:
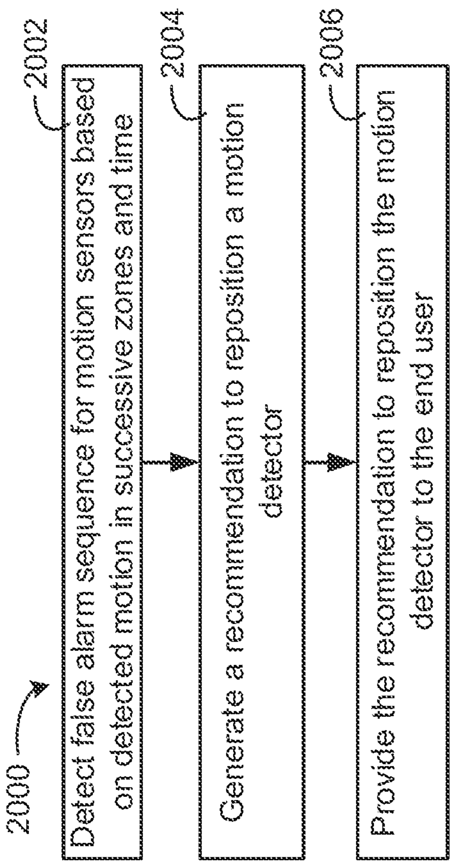
FIG. 20 is a flow diagram of a process for detecting the false alarm rule sequence for motion sensors of FIG. 19 and generating a recommendation to reduce false alarms associated with the motion sensors, according to an exemplary embodiment.

Referring now to FIG. 20, a process 2000 for detecting the false alarm rule sequence 1900 and generating a recommendation to reposition a BA sensor is shown, according to an exemplary embodiment. The process 2000 can be performed by the alarm analysis system 222 of FIG. 5A. Furthermore, any computing device described herein can be configured to perform the process 2000. In step 2002, the alarm analysis system 222 can determine whether the false alarm rule 1900 has triggered in the past or has occurred in real-time. The alarm analysis system 222 can analyze historical events to determine whether the events trigger the false alarm rule sequence 1900. In some embodiments, the alarm analysis system 222 stores the opening and/or closing times of the building 10*a*. Therefore, the alarm analysis system 222 may look for the false alarm sequence 1900 to occur at the opening and/or closing time. For the opening time, the sequence may be BA Event, IR 1, followed by IR2. However, for the closing time, the sequence may be IR2, IR1, followed by the BA Event.

In step 2004, alarm analysis system 222 can generate a recommendation to reposition the building sensor associated with the BA event. The BA event may be an event that occurs when an occupant opens a building in the morning and, thus, should not have triggered. This may be indicative of the building sensor being improperly installed. Therefore, the recommendation may be to send a technician to reposition the sensor to prevent the false alarm from occurring in the future. In step 2006, the generate recommendation of the step 2002 can be provided to an end user for review. In some embodiments, the alarm analysis system 222 can automatically generate a work order to cause a technician to reposition the improperly installed sensor.

Figure 21:
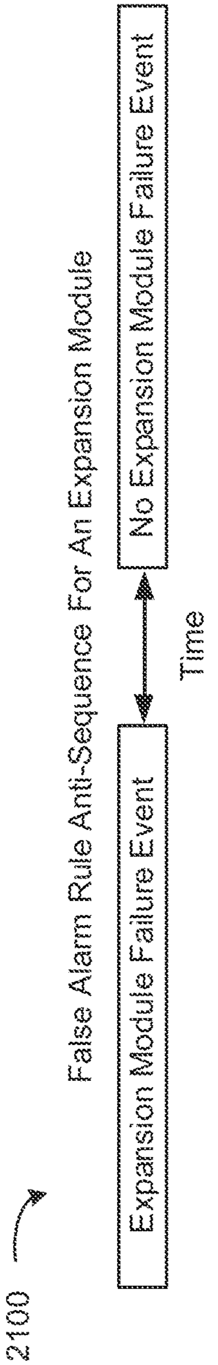
FIG. 21 is a false alarm event anti-sequence for an expansion module, according to an exemplary embodiment.

Referring now to FIG. 21, a false alarm rule anti-sequence for an expansion module 2202 is shown, according to an exemplary embodiments. The false alarm rule 2100 illustrates a sequence of two events that indicates an expansion module failing followed by the expansion module recovering within a time window. Therefore, the rule sequence 2100 is a sequence of events that indicates a time window, that, if the expansion module recovers within, no technician dispatch is required. However, if the expansion module does not recover within the time window, a technician dispatch may be required since the error which the expansion module is experiencing may not be temporary but rather may be that the expansion module is broken. The false alarm rule 2100 can be considered an "anti-sequence," i.e., if the expansion module fails and the expansion module does not restore itself within the time window (e.g., 12 hours), a technician needs to perform maintenance on the expansion module. The alarm analysis system 222 can be configured to determine the time window based on historical data for one or multiple expansion modules. The historical data may be data that forms the pattern of events shown in FIG. 21.

In FIG. 21, a first event, an expansion module failure event, occurs. This event is followed by a no expansion module failure event, i.e., the expansion module 2202 coming back online automatically. Based on historical data, if the false alarm rule 2100 is detected, a threshold time window can be determined. If the expansion module does not come back online within the threshold time window, the alarm analysis system 222 can generate a recommendation to replace or perform maintenance on the expansion module 2202.

Figure 22:
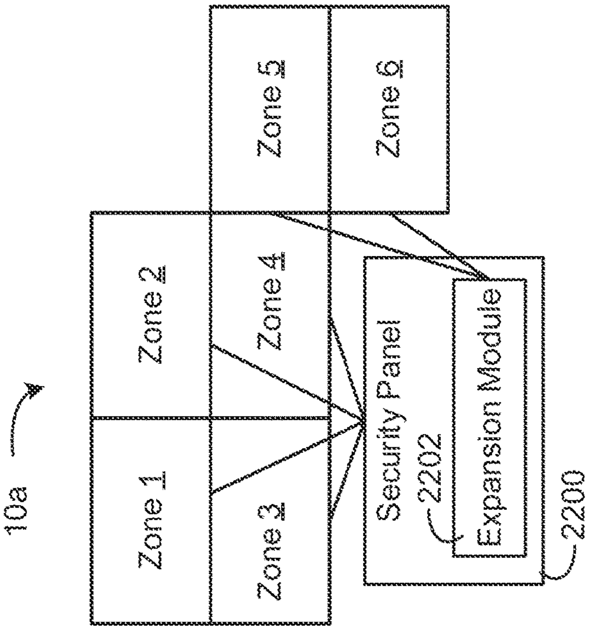
FIG. 22 is a block diagram of zones of the building of FIG. 1 and the expansion module for servicing additional zones, according to an exemplary embodiment.

Referring now to FIG. 22, zones of the building 10*a* and an expansion module 2202 for servicing zones of the building 10*a* that a security panel 2200 cannot service, according to an exemplary embodiment. In FIG. 22, the zones 1-6 are shown for the building 10*a*. Each of the zones 1-6 can have various security devices, e.g., motion sensors, alarms, etc. The devices for the zones 1-4 can communicate to the security panel 2200. The security panel 2200 may analyze data received from the devices of the zones 1-4 and further send the data to the alarm analysis system 222. The security panel 2200 may only be able to service a particular number of zones. Therefore, the expansion module 2202 can be used with the security panel 2200 to service the systems of additional zones, e.g., zone 5 and zone 6.

Figure 23:
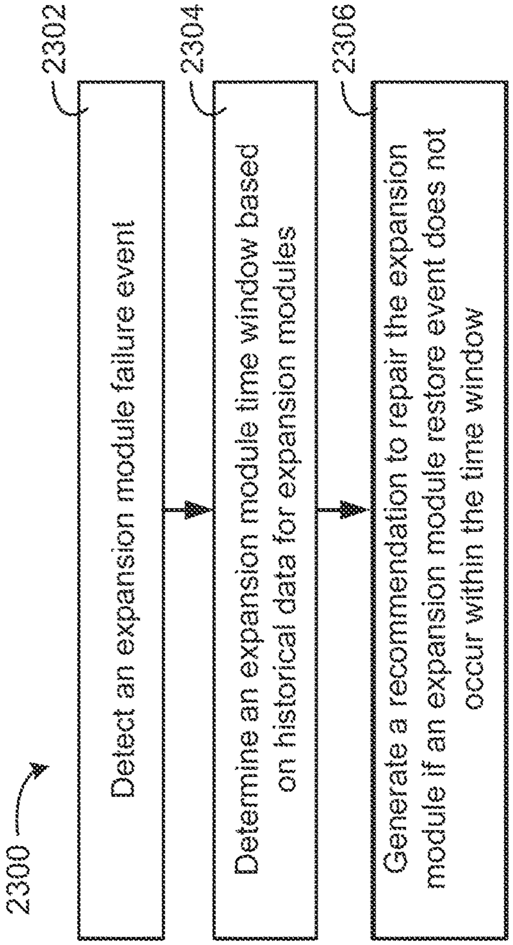
FIG. 23 is a flow diagram of a process for generating a recommendation to repair an expansion module if the expansion module does not automatically restore itself within a time window, according to an exemplary embodiment.

Referring now to FIG. 23, a process 2300 is shown for generating a recommendation to perform maintenance on an expansion module if the expansion module fails to automatically restore itself within a time window is shown, according to an exemplary embodiment. The process 2300 can be performed by the alarm analysis system 222 of FIG. 5A. Furthermore, any computing device described herein can be configured to perform the process 2300. In step 2302, the alarm analysis system 222 can detect an expansion module failure event for an expansion module, e.g., the expansion module 2202.

In step 2304, the alarm analysis system 222 can determine a time window based on historical data which indicates a period of time that, if the expansion module 2202 does not automatically restore itself within, requires a technician to perform maintenance on the expansion module 2202. In some embodiments, the time window can be provided to the CSAM so that the CSAM can adjusted or override the time window. The historical event data can be used by the alarm analysis system 222 to identify the time window. The historical data may indicate how long it takes in various instances for the expansion module 2202 for the expansion module 2202 to automatically come back online. The historical data may meet the pattern of the false alarm rule anti-sequence 2100. In some embodiments, the alarm analysis system 222 determines a probability distribution of times between which the no expansion module failure event occurs and the expansion module 2202 automatically recovers. In this regard, the alarm analysis system 222 can select a median value of the distribution and use the median value (e.g., the median value plus or minus an offset), as the time window within which the expansion module 2202 must automatically recover or otherwise a recommendation should be generated for a technician to replace or repair the expansion module 2202.

In the step 2306, the alarm analysis system 222 can generate a recommendation to repair the expansion module 2202 (or replace the expansion module 2202) if the expansion module 2202 does not automatically recover within the time window determined in the step 2304. In some embodiments, a work order is automatically generated with the recommendation and provided to a service technician who can respond to the recommendation.

Figure 24:
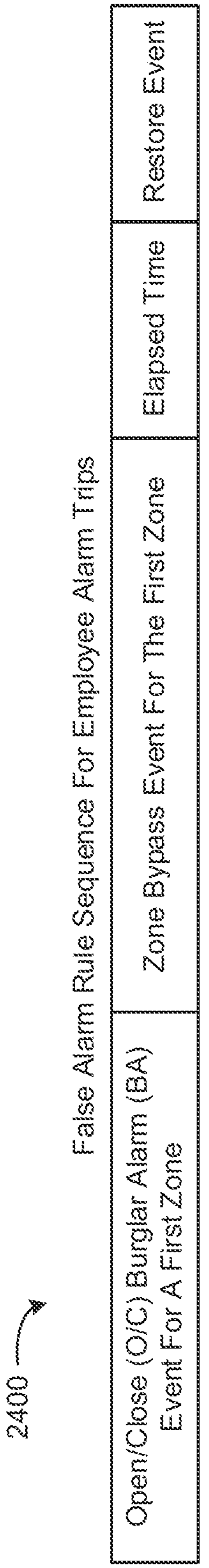
FIG. 24 is a false alarm rule sequence for an employee alarm trip, according to an exemplary embodiment.

Referring now to FIG. 24, a false alarm rule sequence for employee alarm trips 2400 is shown, according to an exemplary embodiment. The false alarm rule sequence 2400 may indicate that an Open/Close (O/C) Burglar Alarm (BA) event occurs for a first zone of the building 10*a*. This event may be followed by a zone bypass event for the same first zone. After a predefined amount of time elapses, e.g., 120 seconds, a restore event occurs.

Figure 25:
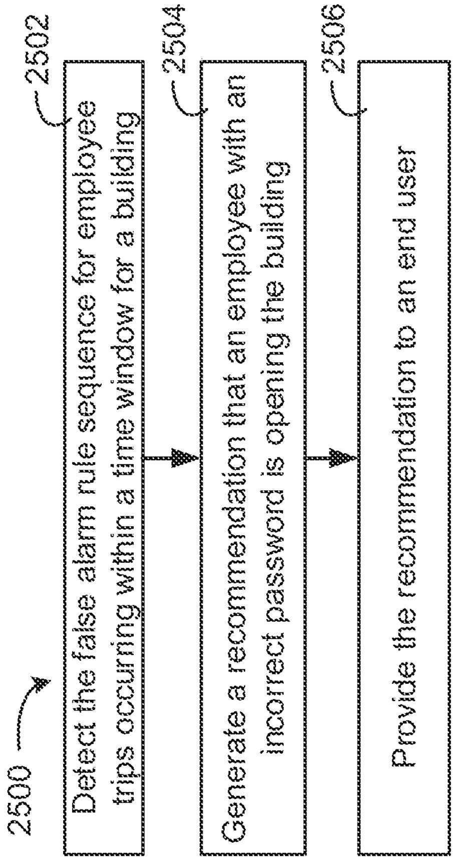
FIG. 25 is a flow diagram of a process for detecting the false alarm rule sequence for the employee alarm trip of FIG. 24 and generating a recommendation to reduce employee caused false alarms, according to an exemplary embodiment.

Referring now to FIG. 25, a process 2500 is shown for detecting the false alarm rule sequence for employee alarm trips sequence 2400, according to an exemplary embodiment. The process 2500 can be performed by the alarm analysis system 222 of FIG. 5A. Furthermore, any computing device described herein can be configured to perform the process 2500. In step 2502, the alarm analysis system 222 can determine whether the false alarm rule sequence 2400 has occurred. In some embodiments, the alarm analysis system 222 determines whether the alarm rule sequence 2400 occurs within a particular time, e.g., an opening time of the building 10*a*. If the sequence 2400 occurs during the opening time (e.g., a time window between 8:50 A.M. and 9:10 A.M. on a weekday), this may be indicative of a sequence of events that can cause a false alarm. However, if the sequence of events occurs outside the opening time, the alarm analysis system 222 may determine that the sequence relates to a true alarm.

In step 2504, the alarm analysis system 222 can generate a recommendation that an employee with an incorrect password is opening the building 10*a* and that better employee training or scheduling needs to be implemented. In step 2506, the alarm analysis system 222 can provide the recommendation to an end user. In some embodiments, the recommendation is provided to a shift manager or other supervisor who can better inform employees or adjust employee opening schedules so that an employee with a correct password is opening the building 10*a*. In some embodiments, the employee schedule may be automatically generated by a computing device, therefore, the alarm analysis system can cause the employee schedule to be generated such that the employee with the incorrect password is not scheduled to open the building. Furthermore, the alarm analysis system 222 can generate a correct password for the employee and provide the new correct password to the employee.

Figure 26:
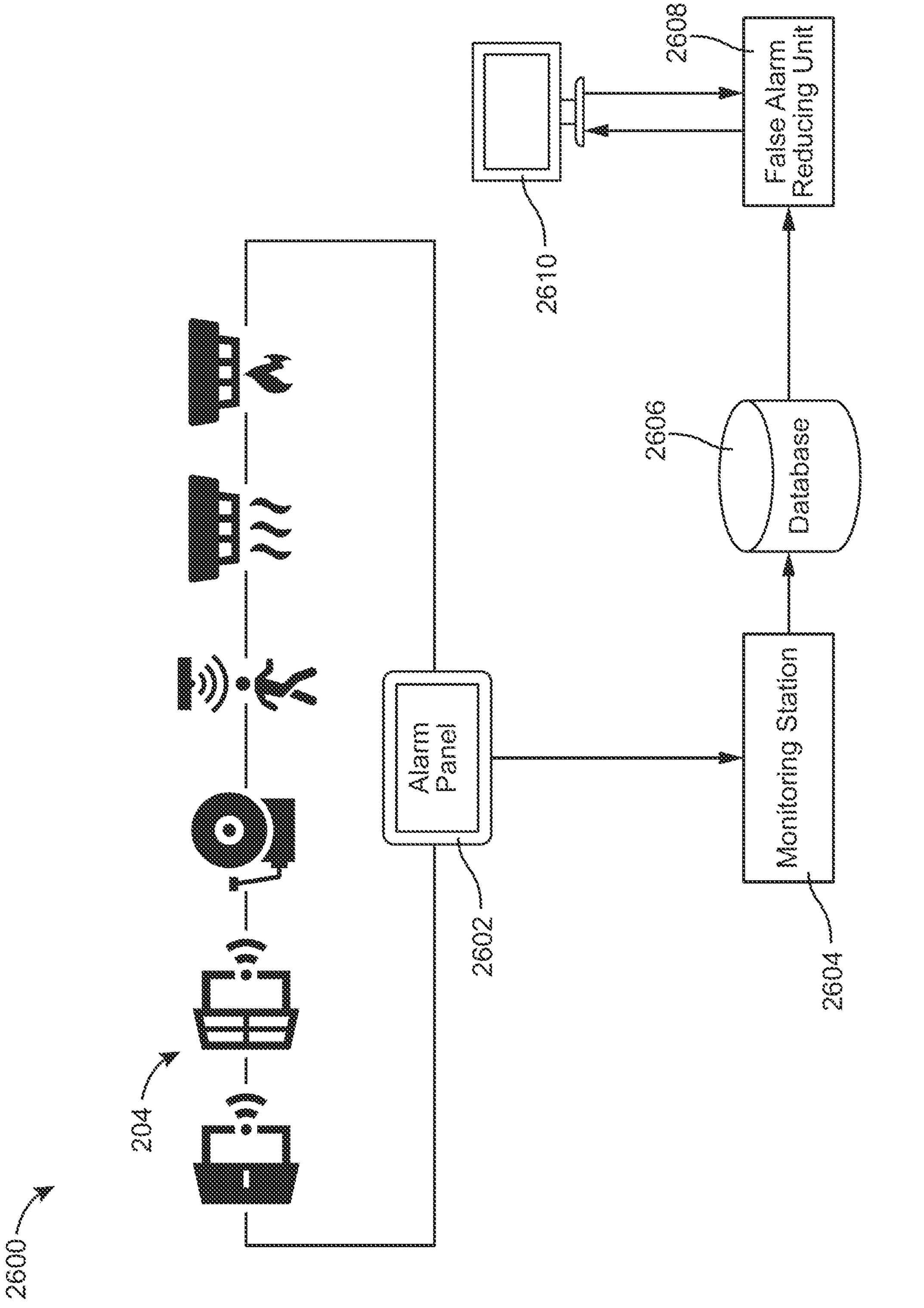
FIG. 26 is a block diagram of a building security system having a false alarm reducing unit, according to some embodiments.

Referring now to FIG. 26, a schematic representation of a building security system 2600 having a false alarm reducing unit 2608 is shown, according to some embodiments. The building security system 2600 shows an alarm panel 2602. In some embodiments, the alarm panel 2602 may be a security alarm panel of a building and connected to building equipment, building subsystems, security equipment security devices, devices, apparatus, or sensors 204. For example, the alarm panel 2602 is shown to be in communication with one or more building subsystems 204 to receive building data. The alarm panel 2602 may be configured to raise an alarm when the building data falls outside a valid range, or indicates an abnormal condition. For an example, an alarm can be triggered when there is a presence of outliers in the building data or when building data deviates from normal operating state. In some embodiments, the building data may comprise one or more events associated with the alarm. Further, a monitoring station 2604 may be in communication with the alarm panel 2602 to continuously monitor the alarm panel 2602 for detecting presence of alarms in the building subsystems 204. The monitoring station 2604 may further store information associated with the alarm such as event data for the one or more events in a database 2606. For example, the alarm panel 2602 can generate an alarm if motion is detected by a motor sensor when the building is locked and no people are supposed to be within the building. The alarm panel 2602 can generate an alarm if a door or window sensor generates data indicating that the door or window was broken or tampered with. The alarm panel 2602 can generate an alarm responsive to a security code not being implemented within a predefined length of time after a user entering the building.

A false alarm reducing unit 2608 may be configured to analyze the information associated with the alarm to identify if the alarm is a false alarm. Further, the false alarm reducing unit 2608 may provide a corrective action to reduce the false alarm to a user interface provided on an electronic device 2610 or the alarm panel 2602, or both. In addition, the false alarm reducing unit 2608 may be configured to receive a user input pertaining to the corrective action from the user interface. The user input may include feedback for the corrective action. The user input may be stored in the database 2606. In addition, the corrective action provided to the user may be also stored in the database 2606 as a historical corrective action. Further, the false alarm reducing unit 2608 may analyze the user input to determine requirement of providing one or more subsequent corrective actions.

Figure 27:
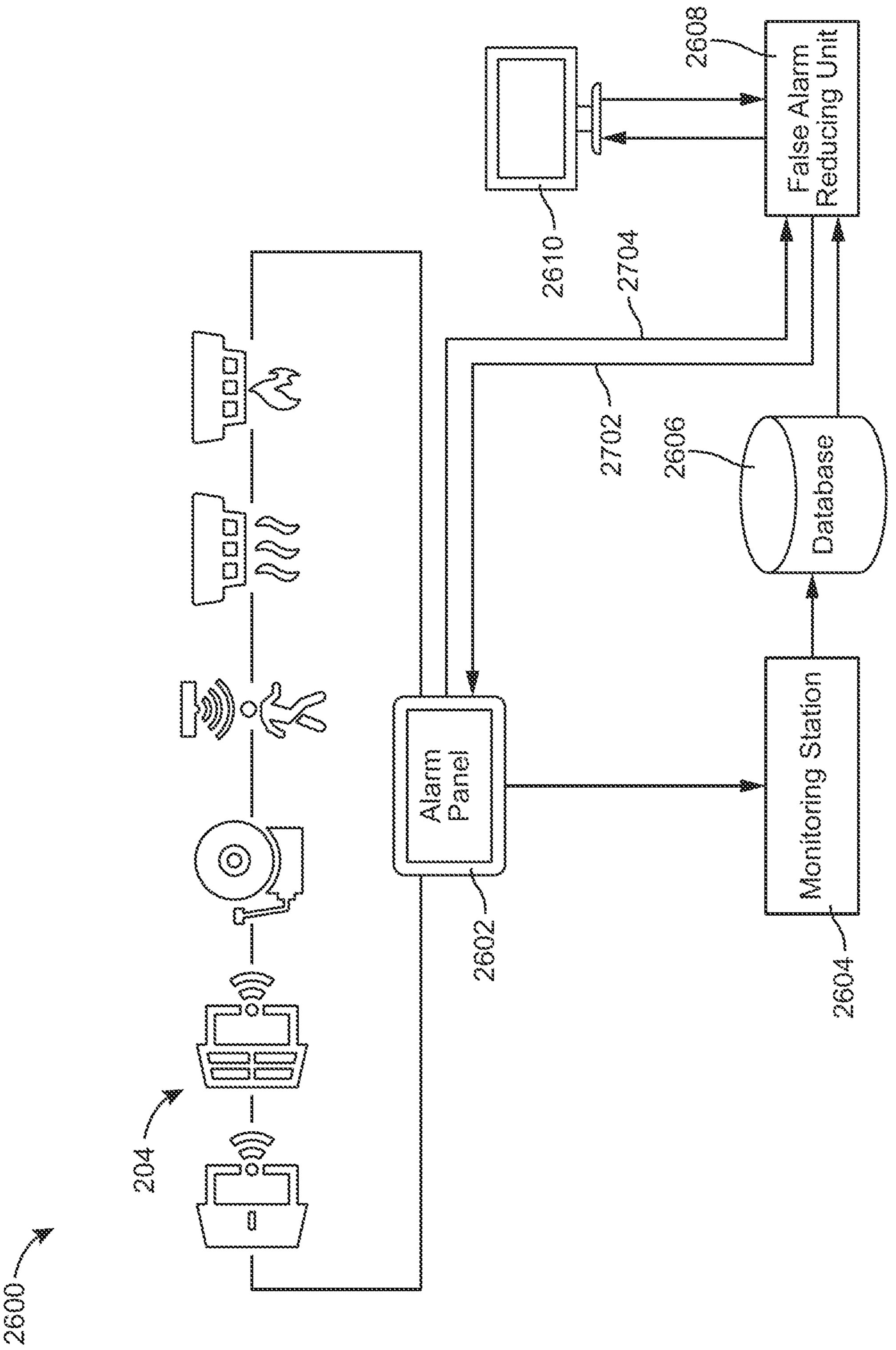
FIG. 27 is another block diagram of a building security system having a false alarm reducing unit, according to some embodiments.

Referring now to FIG. 27, another schematic representation of the building security system 2600 is shown, according to some embodiments. The building security system 2600 shows the alarm panel 2602 in communication with one or more building subsystems to receive building data. As referred above, the alarm panel 2602 may be configured to raise an alarm when the building data falls outside a valid range, i.e., when there is a presence of outliers in the building data. In some embodiments, the false alarm reducing unit 2608 may directly communicate with the alarm panel 2602 to detect occurrence of an alarm. Further, the false alarm reducing unit 2608 may determine if the alarm is a false alarm and provide a corrective action 2702 over the user interface of the alarm panel 2602 for reducing occurrence of the false alarm. The false alarm reducing unit 2608 may further receive a user input 2704 pertaining to the corrective action 2702 from the user interface of the alarm panel 2602 and further analyze the user input 2704 to determine requirement of providing one or more subsequent corrective actions.

Figure 28:
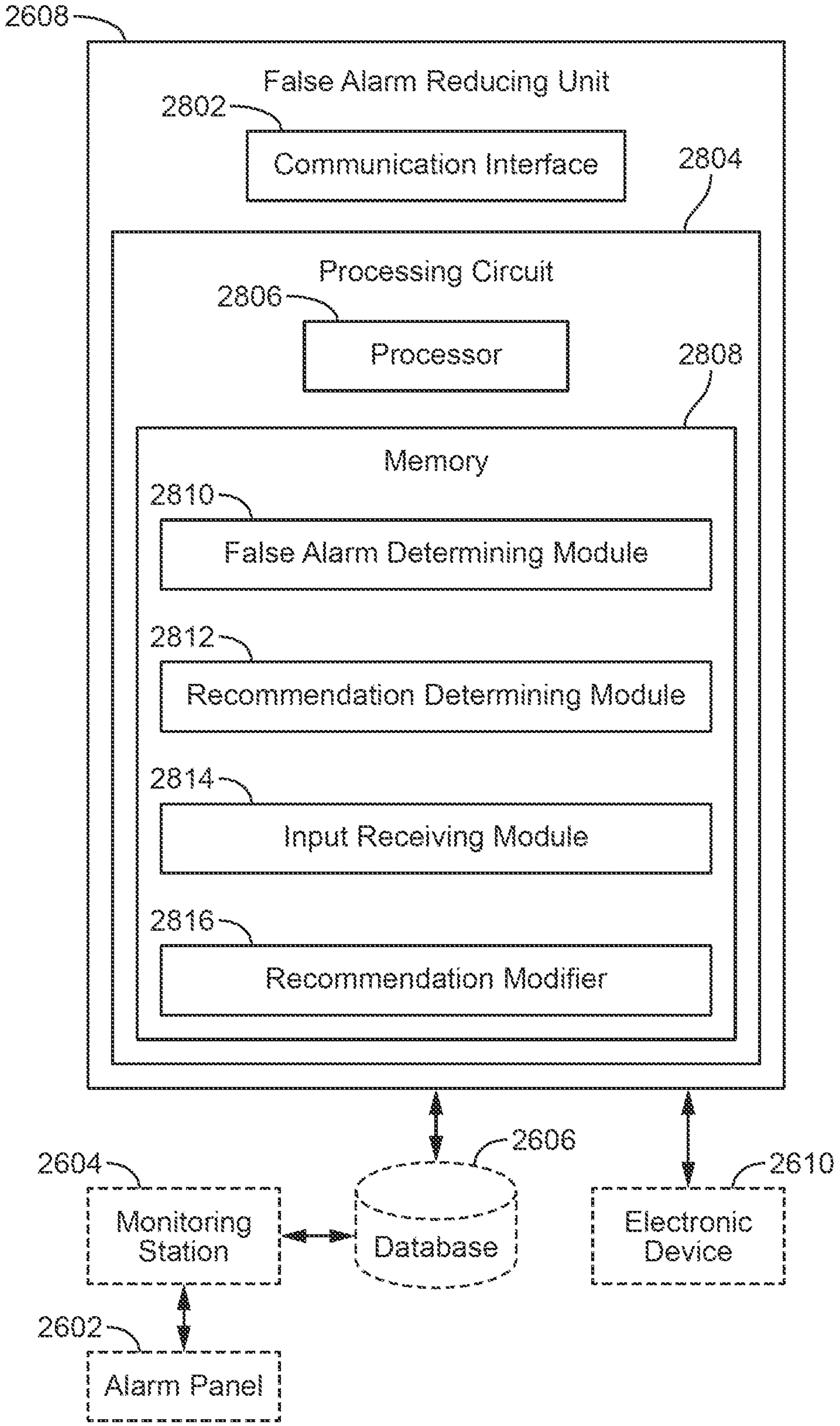
FIG. 28 is a block diagram of the false alarm reducing unit of the building security system, according to some embodiments.

Referring now to FIG. 28, a block diagram illustrating the false alarm reducing unit 2608 of the building security system is shown, according to some embodiments. The false alarm reducing unit 2608 can be a controller, module, processing circuit, device, or software component of the building security systems described above with respect to FIGS. 1-3. For example, the false alarm reducing unit 2608 can be a component of the alarm analysis system 222. For example, the false alarm reducing unit 2608 can be implemented on the cloud server 216 of FIG. 2. In some embodiments, the false alarm reducing unit 2608 may be one or more controllers, servers, and/or computers located in a security panel or part of a central computing system for a building. The false alarm reducing unit 2608 is shown to include a communication interface 2802, and a processing circuit 2804. Communication interface 2802 may include wired or wireless interfaces (e.g., jacks, antennas, transmitters, receivers, transceivers, wire terminals, etc.) for conducting data communications with various systems, devices, or networks. For example, communication interface 2802 may include an Ethernet card and port for sending and receiving data via an Ethernet-based communications network and/or a Wi-Fi transceiver for communicating via a wireless communications network. Communication interface 2802 may be configured to communicate via local area networks or wide area networks (e.g., the Internet, a building WAN, etc.) and may use a variety of communication protocols (e.g., BACnet, IP, LON, etc.).

Communication interface 2802 may be a network interface configured to facilitate electronic data communications between the false alarm reducing unit 2608 and various external systems or devices (e.g., one or more user interfaces). In some embodiments, the communication interface 2802 can be the communication interface of the building security system described above with respect to FIGS. 1-3. In some embodiments, the user interface may be associated with an electronic device of a user (e.g., electronic device 2610). In some embodiments, the user interface may be associated with the alarm panel 2602.

In some embodiments, the false alarm reducing unit 2608 may communicate with various building subsystems 204 referred above in FIG. 2 using the communication interface 2802. For example, fire safety subsystems 206 (e.g., various smoke sensors and alarm devices, carbon monoxide sensors etc.), surveillance system 210 (e.g., video cameras, still image cameras, image and video processing systems for monitoring various rooms, hallways, parking lots, exterior of a building, roof of the building, etc.), entry system 212 configured to allow users to enter and exit the building (e.g., door sensors, turnstiles, gated entries, badge systems, etc.), intrusion system 214 (e.g. to identify whether a window or door has been forced open).

The processing circuit 2804 is shown to include a processor 2806 and a memory 2808. In some embodiments, the processing circuit 2804 can be the processing circuit of the building security system described above with respect to FIGS. 1-3. The processor 2806 may be a general purpose or specific purpose processor, an application specific integrated circuit (ASIC), one or more field programmable gate arrays (FPGAs), a group of processing components, or other suitable processing components. The processor 2806 may be configured to execute computer code or instructions stored in memory 2808 or received from other computer readable media (e.g., CDROM, network storage, a remote server, etc.).

The memory 2808 may include one or more devices (e.g., memory units, memory devices, storage devices, etc.) for storing data and/or computer code for completing and/or facilitating the various processes described in the present disclosure. The memory 2808 may include random access memory (RAM), read-only memory (ROM), hard drive storage, temporary storage, non-volatile memory, flash memory, optical memory, or any other suitable memory for storing software objects and/or computer instructions. The memory 2808 may include database components, object code components, script components, or any other type of information structure for supporting various activities and information structures described in the present disclosure. The memory 2808 may be communicably connected to the processor 2806 via the processing circuit 2804 and may include computer code for executing (e.g., by processor 2806) one or more processes described herein.

Still referring to FIG. 28, the false alarm reducing unit 2608 is shown to be in communication with the electronic device 2610, typically, via the communication interface 2802. The electronic device 2610 can be associated with a user. The electronic device 2610 can be one of, but not limited to, desktop, laptop, computer, mobile, smartphone, personal digital assistant (PDA), or any other electronic device having communication capabilities.

In some embodiments, the false alarm reducing unit 2608 is shown to be in communication with the alarm panel 2602 via the monitoring station 2604. In some other embodiments, the false alarm reducing unit 2608 may be configured to directly communicate with the alarm panel 2602. In some embodiments, the alarm panel 2602 may be a security alarm panel of a building and connected to building equipment, building subsystems etc. For example, the alarm panel 2602 may be associated with one or more sensors (such as door sensors, window sensors, motion sensors, smoke sensors, heat sensors, carbon monoxide sensors etc.) actuators, building equipment, building subsystems etc. The alarm panel 2602 may receive building data from the one or more sensors associated with the building equipment and raise an alarm when the building data falls outside of a valid range or indicates an abnormal condition. For example, the alarm panel 2602 may raise an alarm when the building data shows presence of one or more outliers or when building data deviates from normal operating state. In some embodiments, the building data may comprise one or more events associated with the alarm. For example, the one or more events may be doors opening or closing, a window being forced open, movement detected in a particular zone, etc.

In some embodiments, the monitoring station 2604 may be configured to monitor the alarm panel 2602 to detect occurrence of one or more alarms. For example, if an access control system detects that a door is being forced open, that information can be transmitted to the monitoring station 2604. The monitoring station 2604 may further store the information associated with the alarm such as event data for the one or more events in the database 2606.

In some embodiments, the alarm raised by the alarm panel 2602 may be a false alarm. In some embodiments, the false alarm may be caused due to faulty equipment, misconfigured systems, an improperly installed or operated piece of building equipment, behavior of building users, such as using an emergency exit as a general exit etc. In some embodiments, if a sensor is malfunctioned or requires maintenance, it may produce invalid data for a period of time falsely indicating that there has been a security breach. In another example, a motion sensor may detect motion when it is simply a sale banner hanging in close proximity to the motion sensor. Such false alarm situations can be challenging and can cause a financial burden to building owners.

In some embodiments, the false alarm reducing unit 2608 is shown to include a false alarm determining module 2810. As referred above, the event data for one or more events associated with the alarm is stored in the database 2606. In some embodiments, one or more false alarm rules may be stored in the database 2606 based on the one or more events. The one or more false alarm rules may be rules identifying that a particular pattern of the one or more events lead to false alarms. For example, the one or more false alarm rules may indicate that particular patterns of events (e.g., detected motion, etc.) are indicative of a situation at the building that causes the false alarm. In some embodiments, the one or more false alarm rules stored in the database 2606 may be updated based on new events detected in the building data. The module 2810 can implement false alarm detection techniques similar to, or the same as, the techniques described in FIGS. 4-25.

The false alarm determining module 2810 detect, based on data of security equipment of the building, that a security alarm of the building is a false alarm. For example, the false alarm determining module 2810 may be configured to determine whether a false alarm rule has triggered based on the event data and the one or more false alarm rules stored in the database 2606. More particularly, the false alarm determining module 2810 may be configured to analyze the event data and the one or more false alarm rules to detect occurrence of a false alarm. In addition, the false alarm determining module 2810 may be configured to identify a root cause of the false alarm based on the event data and the one or more false alarm rules.

The false alarm reducing unit 2608 is further shown to include a recommendation determining module 2812 that is configured to determine a corrective action to reduce the false alarm. For example, if an identified root cause of a false alarm is due to a faulty equipment, a corrective action may be generated to service or replace the faulty equipment. The recommendation determining module 2812 may further provide the corrective action over the user interface of the alarm panel 2602 or the electronic device 2610, or both, to instruct the user to implement the corrective action for reducing the occurrence of the false alarm. The corrective action may include, for example, informing a user about a current status of building equipment, suggested maintenance of the building equipment, suggested parameter changes for the building equipment that may be necessary to reduce the one or more false alarms, etc. For example, the corrective action may be to adjust or update a door delay, to train employees for accessing building subsystems, etc. In some embodiments, the corrective action may include one or more solutions to reduce the false alarm.

The false alarm reducing unit 2608 can perform a search of the database 2606. For example, the false alarm reducing unit 2608 an perform a search of the database 2606 to identify a past corrective action accepted for implementation by a user and at least one false alarm occurring after the past corrective action was accepted and before detection of a current false alarm. For example, responsive to detecting a false alarm, the false alarm reducing unit 2608 can search the database 2606 for data to use in generating a new corrective action. The false alarm reducing unit 2608 can generate a corrective action for reducing the false alarm based on a result of the search.

For example, the false alarm reducing unit 2608 can store past data for an indication of a type of each corrective action generated, an indication of a type of each false alarm generated, whether a user implemented the corrective action, and/or whether a user declined each generated corrective action accepted. The false alarm reducing unit 2608 can further store an indication of each false alarm that occurs and a timestamp of each false alarm. The false alarm reducing unit 2608 can store an indication of a timestamp when each false alarm was accepted, implemented, or declined.

Responsive to a false alarm occurring, the false alarm reducing unit 2608 can determine, by searching the database 2606, that a corrective action was implemented in the past to reduce false alarms of the type of false alarm that occurred. The false alarm reducing unit 2608 can further search the database 2606 to determine a number of false alarms that have occurred after a past corrective action was implemented and a current time (or a time at which the false alarm occurred). The false alarm reducing unit 2608 can compare the number of false alarms to a threshold or predefined value. The false alarm reducing unit 2608 can use a result of the comparison to determine a new corrective action for addressing the false alarm. For example, if the number of false alarms is less than a threshold, the false alarm reducing unit 2608 can determine that the past corrective action was successful in reducing false alarms. The false alarm reducing unit 2608 can generate a corrective action to be the same type as the past corrective action. However, if the false alarm reducing unit 2608 determines that the number of false alarms is greater than a threshold, the false alarm reducing unit 2608 generate the corrective action to be different than the past corrective action because the false alarms being greater than the threshold indicates that the past corrective action was not successful in reducing false alarms.

The false alarm reducing unit 2608 can further analyze data to determine whether the past corrective action was accepted but not implemented. For example, the search of the database 2606 can identify data that indicates that while the past corrective action was accepted, the past corrective action was never implemented. For example, the false alarm reducing unit 2608 can search the database 2606 to determine whether data was stored in the database 2606 that indicates whether the corrective action was implemented. For example, the data can be a confirmation that the user implemented the past corrective action. Furthermore, the false alarm reducing unit 2608 can communicate with the monitoring station 2604, the alarm panel 2602, or any other equipment 204 to determine whether the corrective action was implemented at all or implemented properly. Responsive to determining that the number of false alarms that have occurred after the past corrective action was accepted is greater than a threshold but the past corrective action was never implemented, the false alarm reducing unit 2608 can generate the corrective action to be the same type as the past corrective action.

The false alarm reducing unit 2608 can confirm whether a corrective action was implemented by comparing data stored in the database 2606 with data stored by the monitoring station 2604, the alarm panel 2602, or equipment 204. For example, the data can be or include a value of an operating parameter of the security system 2600. For example, the value can indicate a length of time that a user is required to enter an access code into the alarm panel 2602 after opening a door. The length of time can be stored as a value in the alarm panel 2602, the monitoring station 2604, or the equipment 204. The value can be a sensitivity level for a door or window sensor 204. A low sensitivity level can trigger an alarm with a low amount of vibration in a window or door while a high sensitivity level can trigger an alarm with a high amount of vibration in the window or door. The past corrective action can implement an update to the operating parameter. This update can be stored in the database 2606 by the false alarm reducing unit 2608. When the false alarm reducing unit 2608 checks to determine whether the past corrective action was implemented properly, the false alarm reducing unit 2608 can retrieve the updated value of the corrective action from the database 2606. Furthermore, the false alarm reducing unit 2608 can retrieve a value of the operating parameter that the system 2600 is actually operating on from the equipment 204, the alarm panel 2602, or the monitoring station 2604 by communicating with the equipment 204, the alarm panel 2602, or the monitoring station 2604 via one or more networks. The false alarm reducing unit 2608 can compare the value retrieved from the database 2606 against the value retrieved from the equipment of the security system 2600 to determine if the values match. If the values match, the false alarm reducing unit 2608 can determine that the past corrective action was properly implemented. If the values do not match, the false alarm reducing unit 2608 can determine that the past corrective action was never implemented or was not implemented.

In some embodiments, the corrective action may be displayed to the user, allowing the user to scroll through the corrective action and follow one or more instructions to implement the corrective action. In some embodiments, the one or more instructions may be in form of text, graphics, audio, video, etc., or any combination thereof.

In some embodiments, for example, when a false alarm is triggered for an intrusion alarm due to a user failing to enter a disarm code within a time limit, the recommendation determining module 2812 may gather data from the alarm panel 2602 recording a time between a sensor detecting a door open and a time at which the disarm code is entered. The recommendation determining module 2812 may determine a pattern of user behavior indicating that the door sensor timer should be reset to allow a longer period for the user to enter the disarm code.

As another example, the false alarm reducing unit 2608 may detect misuse of emergency exits by staff based on the event data and the one or more false alarm rules stored in the database 2606. Further, a corrective action to train staff about use of emergency doors may be generated by the recommendation determining module 2812. One or more notifications containing the corrective action may be sent to the user interface with instruction(s) to implement the corrective action. In some embodiments, the one or more notifications may be in form of text, graphics, audio, video etc., or any combination thereof. In some embodiments, the corrective action recommended to the user may be stored in the database 2606 as a historical corrective action.

The recommendation determining module 2812 can generate data that causes a graphical user interface to be displayed on a device. The graphical user interface can include an indication of a corrective action or actions identified or selected by the recommendation determining module 2812. The data can be transmitted by the recommendation determining module 2812 to a user device, such as the alarm panel 2602 or the electronic device 2610, to cause the user device to display graphical user interface. The recommendation determining module 2812 can receive data from the user device indicating an acceptance of the corrective action, a rejection of the corrective action, or implementation of the corrective action. The recommendation determining module 2812 can update the database 2606 with an indication of whether the corrective action was accepted, rejected, or implemented.

For example, the recommendation determining module 2812 can transmit data to the alarm panel 2602 to cause the alarm panel 2602 to display a graphical user interface indicating the corrective action. A user, via the alarm panel 2602, can provide an input accepting or rejecting the corrective action. If the user accepts the corrective action, the user can provide an input via the alarm panel 2602 confirming that the corrective action was implemented. The alarm panel 2602 can transmit data to the recommendation determining module 2812 indicating whether the user accepted or rejected the corrective action and further whether the user confirmed implementation of the corrective action. The recommendation determining module 2812 can update the database 2606 to store an indication of the corrective action, an indication of whether the user accepted or rejected the corrective action, and an indication of whether the corrective action was implemented or not.

Subsequent to recommending the corrective action, input receiving module 2814 may be configured to receive a user input pertaining to the corrective action. In some embodiments, the user is provided with one or more pre-determined input options on the user interface of the alarm panel 2602 or the electronic device 2610, or both, where the input options pertain to the recommended corrective action. Further, the user is allowed to provide the user input via the one or more input options provided on the user interface. In some embodiments, the one or more input options may allow the user to reject the recommended corrective action. For example, a corrective action may be recommended to the user, suggesting replacement of a building equipment, however, the user may not have the budget to replace the building equipment. In such cases, the user may reject this recommended corrective action, if the user is not satisfied with the recommended corrective action.

In some embodiments, the one or more input options may allow the user to accept the corrective action. The acceptance of the corrective action can be in form of self-implementation of the corrective action, via a technician implementing the corrective action, and/or automatic implementation by the false alarm reducing unit 2608. Additionally, the one or more input options may allow a user to “snooze” or delay the recommended corrective action indicating the false alarm reducing unit 2608 for delayed implementation of the corrective action.

In some embodiments, the one or more input options may allow the user to confirm implementation of the corrective action. In some embodiments, the implementation of the corrective action can be performed by at least one of a user and a technician. In some other embodiments, the implementation of the corrective action is performed automatically by the false alarm reducing unit 2608.

In some embodiments, the one or more input options may vary depending on the corrective action. Further, Table 5 below shows an example of one or more input options that can be provided to the user:

TABLE 5

| Input Options | |
|---|---|
| Input options | Example |
| Accept and allow automatic update | Increase delay between intrusion sensor activation and raising an alarm - allowing more time for user to enter deactivation code |
| Book service appointment | Request call back to arrange for door sensor wiring to be fixed |

TABLE 5-continued

| Input Options | |
|---|---|
| Input options | Example |
| Confirm that the corrective action was implemented | Provide training for staff about which door to use as point of entry in the morning |
| Reject the corrective action | Cannot change which door staff enter/exit because only one door has keypad entry |
| Snooze | Delay implementing corrective action until after a scheduled sales event |

Further, in some embodiments, the user input for the recommended corrective action can be in form of a textual review. The textual review may be analyzed using Natural Language Processing (NLP). For example, one or more key words or concepts may be extracted from the textual review to understand content of the user input. In some other embodiments, the user input may be in form of a rating or score provided to the recommended corrective action.

As referred above, the corrective actions provided to the user may be stored as historical corrective actions. Further, the user input pertaining to the historical corrective actions may be stored in the database 2606. Further, a recommendation modifier 2816 of the false alarm reducing unit 2608, may be configured to analyze the user input to determine requirement of providing one or more subsequent corrective actions.

In some embodiments, when a false alarm of same type, as a previously stored false alarm, is detected (alternatively referred as a reoccurred false alarm), the recommendation modifier 2816 may identify a historical corrective action provided to the user corresponding to the previously stored false alarm and further analyze a user input provided for the historical corrective action by looking into the database 2606.

In one example, the recommendation modifier 2816 may analyze the user input to determine that the user accepted and confirmed implementation of the historical corrective action. The recommendation modifier 2816 may further determine reoccurrence of the false alarm post implementation of the historical corrective action. The recommendation modifier 2816 may determine if a number of false alarms of the same type have reduced post implementation of the historical corrective action. In one embodiment of the example, when the number of false alarms have been reduced post implementation of the historical corrective action, then the historical corrective action is considered as a successful corrective action. Such successful corrective action may be highly effective and recommended to the user again for reducing the reoccurred false alarm. In some embodiments, the recommendation modifier 2816 may identify similar users based on user data stored in the database 2606 to promote use of successful corrective actions.

Further, in some other embodiments of the example, if the number of false alarms are increased or same post implementation of the historical corrective action, then the recommendation modifier 2816 may determine an evidence for implementation of the historical corrective action. For example, the recommendation modifier 2816 may search a database of technician callouts for collecting evidence to determine if the historical corrective action was actually implemented. In one embodiment, if the evidence for implementation of the historical corrective action is found, then the historical corrective action is considered as a failed corrective action. This indicates that the historical corrective action, when implemented by the user, failed to reduce the number of false alarms. In some embodiments, the failed corrective action may no longer be recommended to users, or may not be recommended for a configurable period of time. This may include reducing a probability of recommending the corrective action to users that are identified as having similar characteristics such as business type, premises type, age of building, number of employees, regional location, type of equipment installed etc. The failed corrective action indicates that the historical corrective action is less effective. In such case, the recommendation modifier 2816 may provide one or more subsequent corrective actions to the user for reducing the reoccurred false alarm. In some embodiments, the one or more subsequent corrective actions is one of a new corrective action or a modified version of the historical corrective action.

However, in some embodiments, if there is no evidence found for implementation of the historical corrective action, then the historical corrective action may be recommended to the user again for reducing the reoccurred false alarm. Further, in some embodiments, the recommendation modifier 2816 may determine that the user rejected the historical corrective action. Such historical corrective action may be classified as a failed corrective action. In such case, the recommendation modifier 2816 may provide one or more subsequent corrective actions to the user for reducing the reoccurred false alarm.

In some embodiments, the recommendation modifier 2816 may determine that the user has not previously implemented the historical corrective action, then such historical corrective action may be recommended again to the user for reducing the reoccurred false alarm. In some embodiments, the recommendation modifier 2816 may utilize one or more machine learning techniques to continuously learn from user input pertaining to historical corrective actions. In addition, the recommendation modifier 2816 may utilize one or more machine learning techniques to continuously learn from outcomes such as success or failure of historical corrective actions to predict corrective actions when a false alarm of same type is triggered in future. A machine learning model may be utilized that trains on outcomes of historical corrective actions to make predictions for future corrective actions. In some embodiments, the machine learning model may be stored on a cloud server such as the cloud server 216 (referred above in FIG. 2). Additionally, in some embodiments, the historical corrective actions may be stored as historical security data 224 (referred above in FIG. 2) in the cloud server 216. In some embodiments, the machine learning model may be updated based on historical security data 224. Further, in some embodiments, the recommendation modifier 2816 may continuously learn from success or failure of historical corrective actions of a security system and further utilize this information to improve false alarm reduction recommendations for other similar security systems. For example, the recommendation modifier 2816 may continuously learn from the successful or failed historical corrective actions for the security system 202*a* to improve corrective actions for other security systems such as security systems 202*b*-202*d* (referred above in FIG. 2). Additionally, the machine learning model stored in the cloud server 216 may be referred by the security systems 202*a*-202*d* in order to predict corrective actions to reduce occurrence of false alarms using the machine learning model.

In some embodiments, the recommendation modifier 2816 may create an artificial neural network that continuously learns from the successful or failed historical corrective actions to refine future corrective actions. For example, an enterprise with a large number of store locations may have a continuously learning neural network of security systems working together to reduce occurrence of false alarms across the enterprise. Thus, the false alarm reducing unit 2608 improves with scale. In addition, the false alarm reducing unit 2608 is a self-learning and constantly evolving unit, thus overall performance of the false alarm reducing unit 2608 is persistently enhanced as compared to conventional systems. The false alarm reducing unit 2608 generates improved false alarm reduction recommendations, thereby leading to reduction in occurrence of false alarms.

Figure 29:
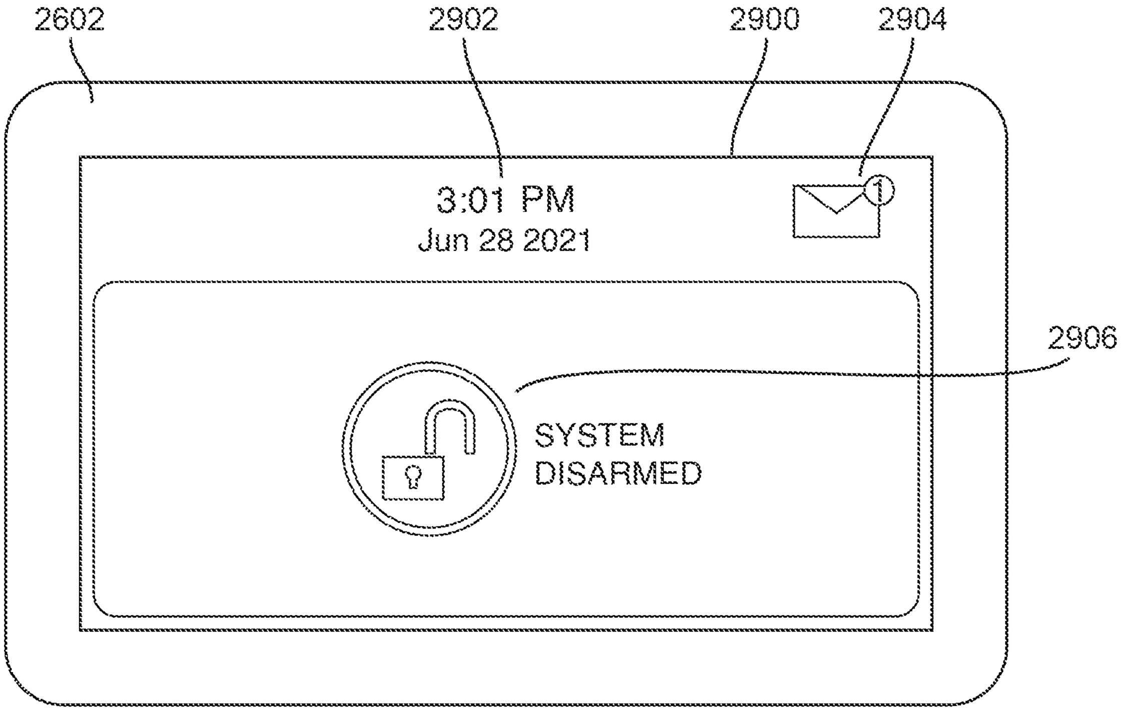
FIG. 29 is a user interface provided on the alarm panel of FIG. 4, according to some embodiments.

Referring now to FIG. 29, a user interface 2900 provided on the alarm panel 2602 is shown, according to some embodiments. In some embodiments, the alarm panel 2602 may have a visual display and a touch screen similar to a portable tablet device. In some embodiments, the alarm panel 2602 may be another form of terminal device with a display screen and a keypad for user input. Additionally, the alarm panel 2602 may include other communication features not shown here, such as microphones, speakers, cameras etc. The alarm panel 2602 is illustrated here for example as a touch screen device. FIG. 29 shows an initial view of user interface 2900 of the alarm panel 2602 displaying general information to a user, such as time and date 2902 and a graphical and/or textual indication of a status of the building security system 2600, e.g., a status indicating that the building security system 2600 is disarmed, such as indication 2906. Other initial information types are possible. Further, the user interface 2900 shows a message indication, such as a notification icon 2904, indicating a number of unread or unacknowledged messages from the false alarm reducing unit 2608. In some embodiments, the notification icon 2904 may be accompanied or replaced by audible alerts or indicators, flashing lights, or any other suitable means of notification.

Figure 30:
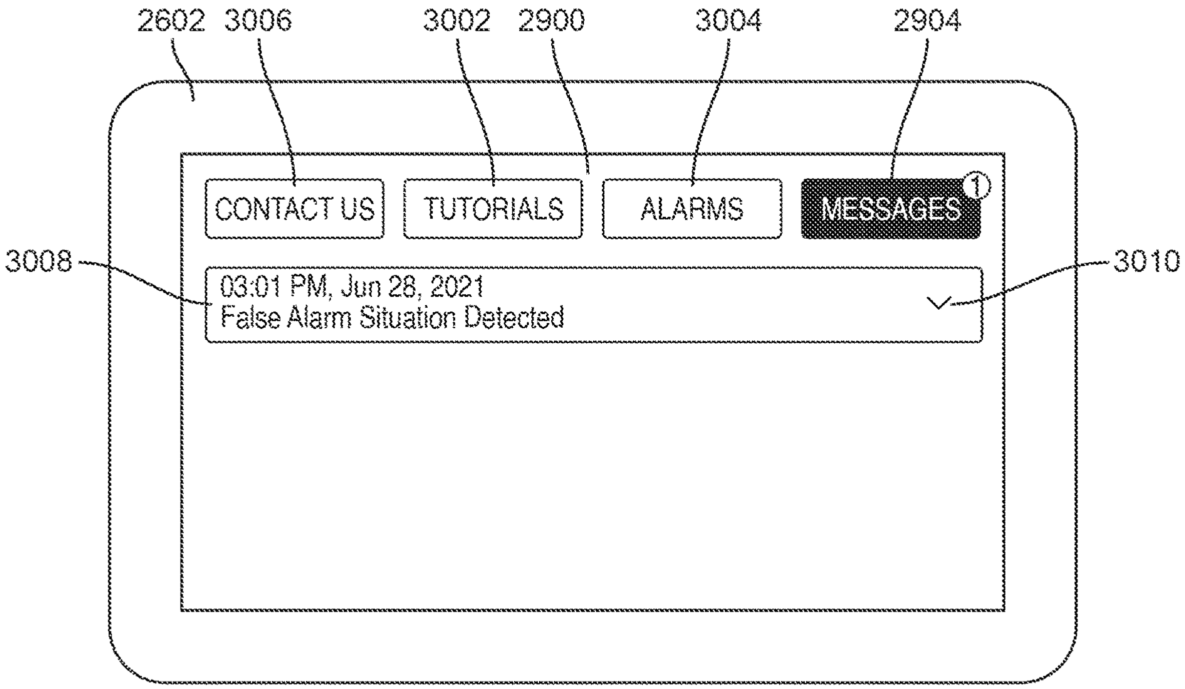
FIG. 30 is another user interface provided on the alarm panel of FIG. 4, according to some embodiments.

Referring now to FIG. 30, additional details of the user interface 2900 of FIG. 29 are shown, according to some embodiments. In some embodiments, one or more icons or selectable elements are displayed, allowing a user to interact with the false alarm reducing unit 2608. In the example, the notification icon 2904 (referred above in FIG. 29) is selected and shows unread message count indicator. Upon selecting the notification icon 2904, a message preview window 3008 is shown that displays a time and date and a preview of the message such as a "False Alarm Situation Detected." Further, the message preview window 3008 may include an expansion icon 3010 that allows a user to view further details of the message. The user interface 2900 may also display one or more additional icons or selectable elements enabling other interactions with the false alarm reducing unit 2608 in respect of a notification. For example, a user may select a contact us icon 3006 to contact an expert (e.g., a service technician) for seeking assistance to implement a corrective action for reducing the false alarm. Additionally, the user interface 2900 may display a tutorials icon 3002 for allowing a user to get direct access to instructional information to implement a corrective action for reducing the false alarm. Further details of the tutorials icon 3002 are not shown, however they may include visual and/or audible instructions or training, including video tutorials and/or interactive training applications to implement corrective actions. In some embodiments, the user interface 2900 may provide an alarms icon 3004 to select corrective actions to implement in respect of a particular alarm type.

Figure 31:
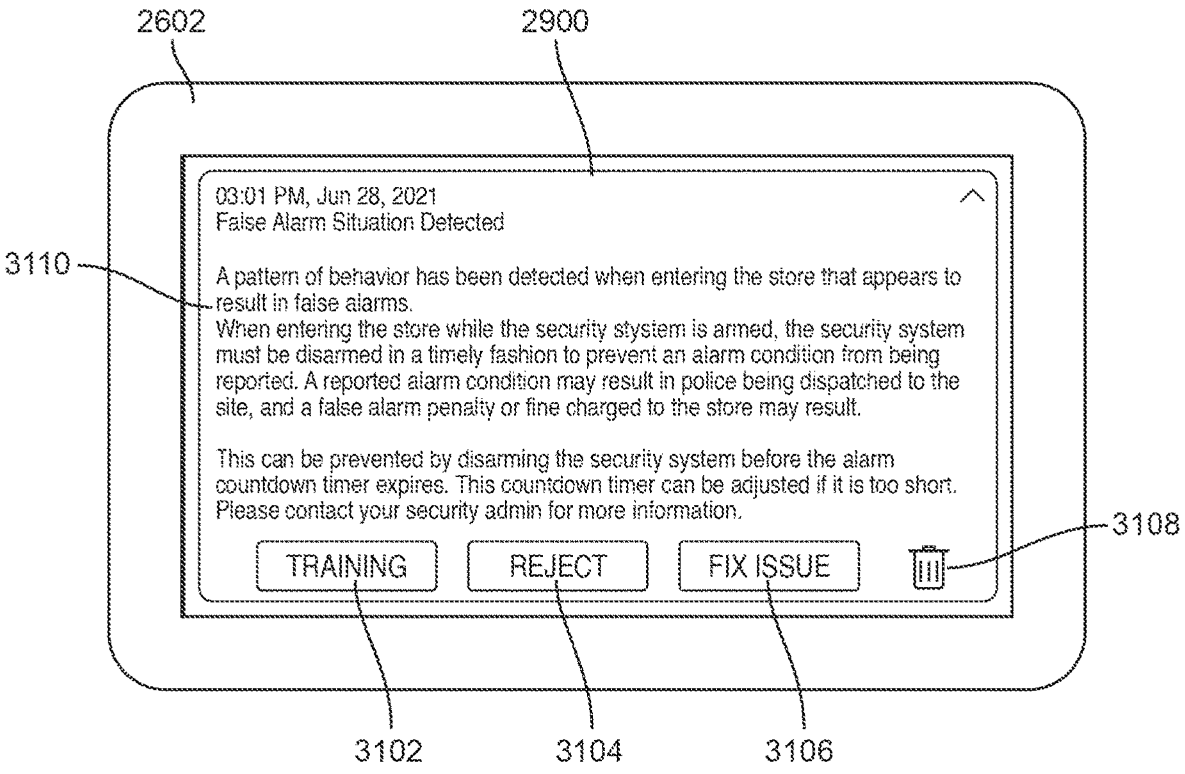
FIG. 31 is another user interface provided on the alarm panel of FIG. 4, according to some embodiments.

Referring now to FIG. 31, additional details of the user interface 2900 are shown, according to some embodiments. FIG. 31 shows a detailed view window 3110 of the message preview window 3008 upon selecting the expansion icon 3010 of FIG. 30. The detailed view window 3110 may include a time and date, and a more detailed explanation of the false alarm with a corrective action for eliminating the false alarm. For example, in the detailed view window 3110, the user is informed of a pattern of behavior leading to false alarms and a corrective action is provided to reduce occurrence of such false alarms. In some embodiments, depending on a nature of the corrective action, the detailed view window 3110 may further include one or more input options for the user. For example, the user may select an accept icon (not shown) to accept the corrective action, a training icon 3102 to access instructional information in respect of the corrective action, a reject icon 3104 to reject the corrective action, a fix issue icon 3106 to allow the false alarm reducing unit 2608 to automatically implement the corrective action. Additionally, the detailed view window 3110 may include a delete icon 3108 allowing a user to delete the message from the user interface 2900.

Figure 32:
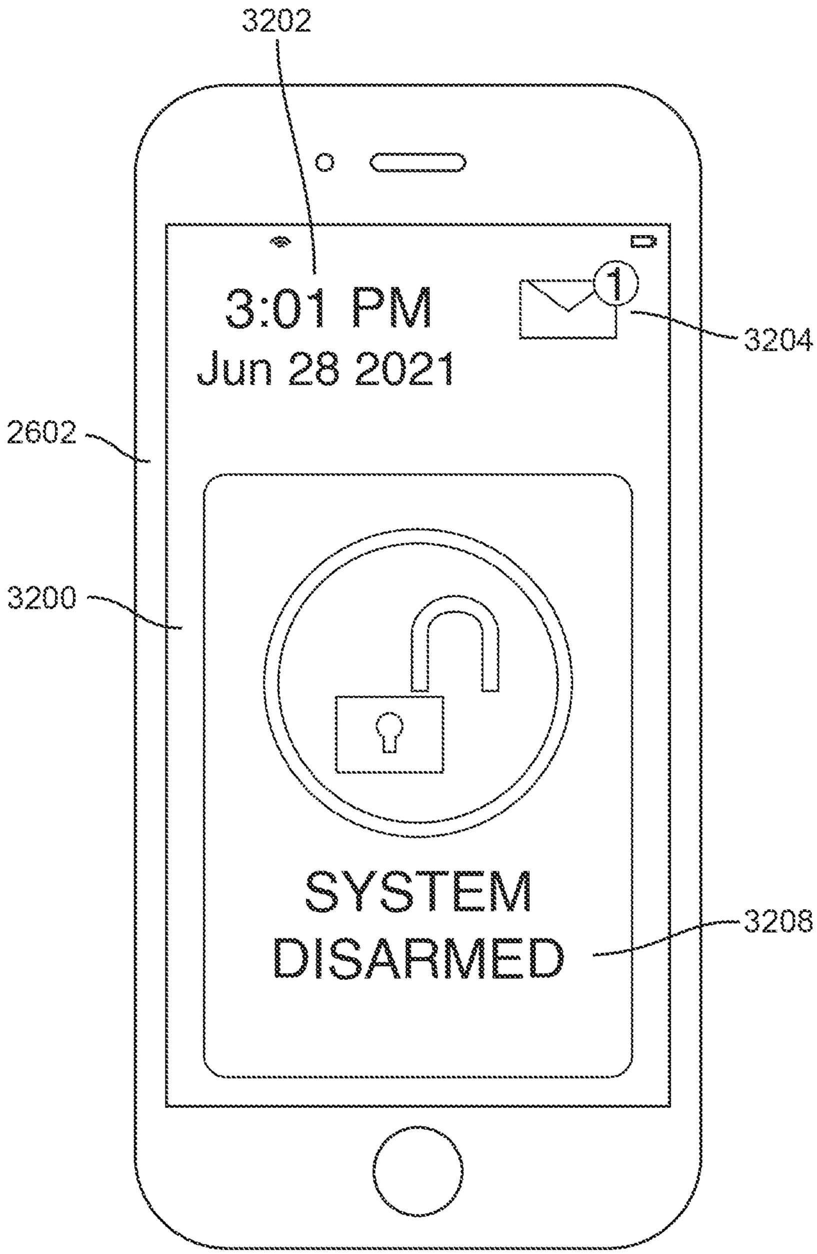
FIG. 32 is a user interface provided on the electronic device of FIG. 4, according to some embodiments.

Referring now to FIG. 32, a user interface 3200 provided on the electronic device 2610 is shown, according to some embodiments. FIG. 32 is a drawing of an initial view of a user interface 3200 provided on the electronic device 2610 (such as a mobile phone of the user). As referred above, the electronic device 2610 may have a mobile application of the false alarm reducing unit 2608 for enabling communication with the false alarm reducing unit 2608. In some embodiments, the user interface 3200 may substantially mirror aspects and functionality of the user interface 2900 of FIGS. 29-31. For example, the user interface 3200 may display information, such as time and date 3202 and a graphical and/or textual indication of a status indicating that the building security system 2600 is disarmed, such as indication 3208. Further, the user interface 3200 may display a notification icon 3204, indicating a number of unread or unacknowledged messages from the false alarm reducing unit 2608. In other embodiments, the notification icon 3204 may be accompanied or replaced by one or more audible alerts or indicators, flashing lights, or any other suitable means of notification.

Figure 33:
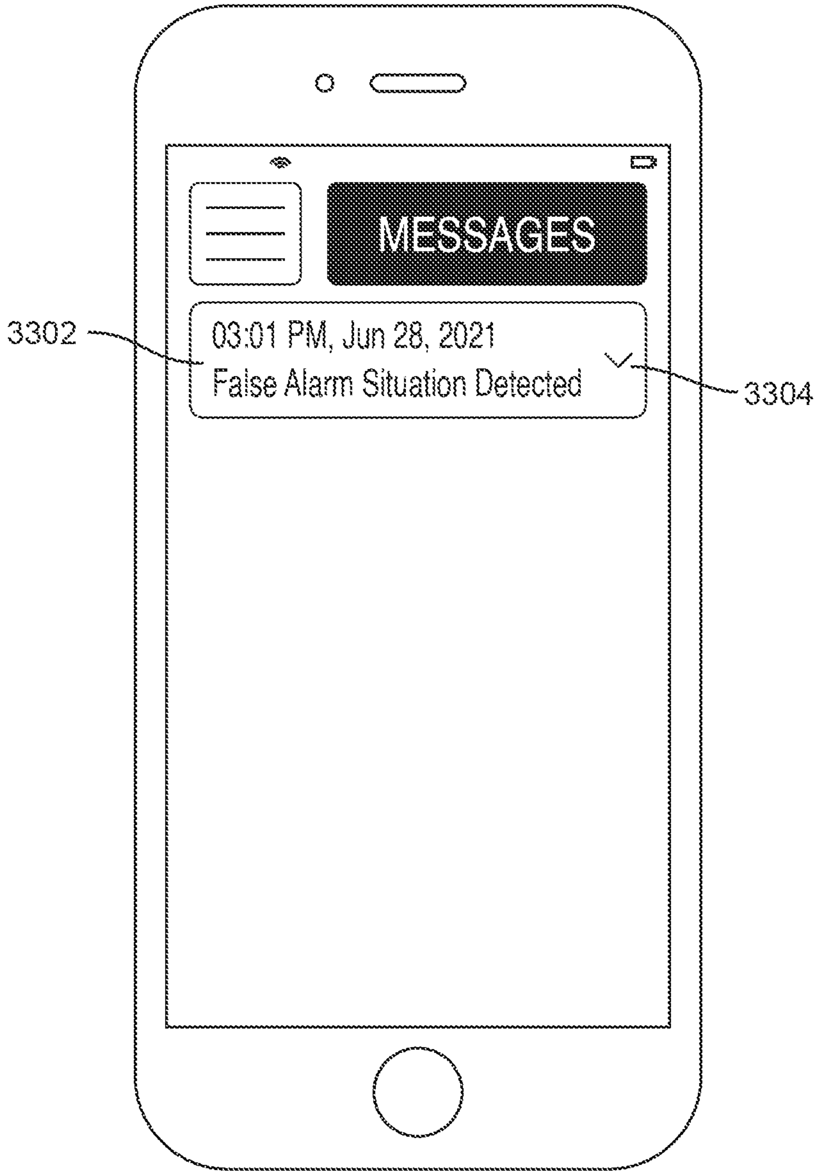
FIG. 33 is another user interface provided on the electronic device of FIG. 4, according to some embodiments.

Referring now to FIG. 33, additional details of the user interface 3200 of FIG. 32 is shown, according to some embodiments. The user interface 3200 may further display a message preview window 3302 to a user upon selecting the notification icon 3204 of FIG. 32. The message preview window 3302 may display a time and date and a preview of the message such as a "False Alarm Situation Detected." In some embodiments, the message preview window 3302 may include an expansion icon 3304 that allows the user to view further details of the message. Although not shown, it should be understood that the user interface 3200 may also display one or more additional icons or selectable elements enabling other interactions with the false alarm reducing unit 2608 in respect of a notification. For example, the user interface 3200 may include a contact us icon, an accept icon, a tutorials icon, an alarms icon, a training icon, a reject icon, a fix issue icon, a delete icon etc., as referred above in FIGS. 29-32 etc.

Figure 34:
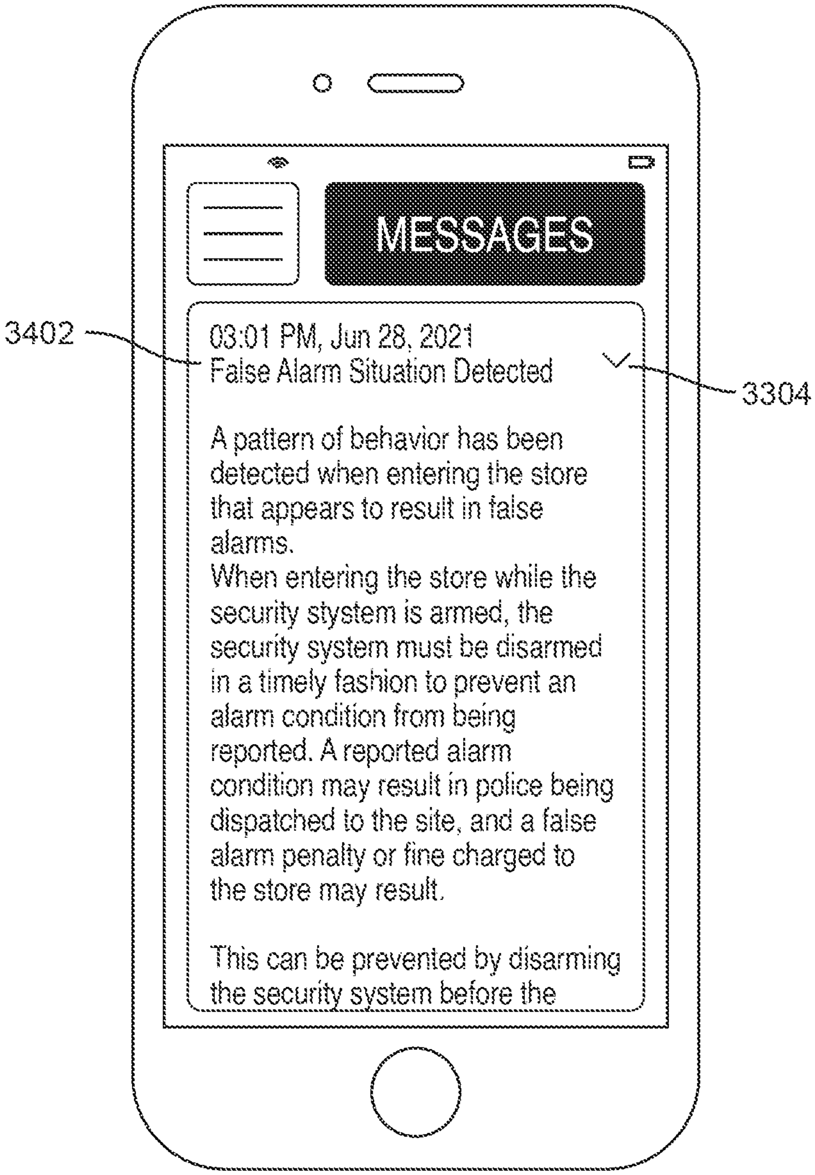
FIG. 34 is another user interface provided on the electronic device of FIG. 4, according to some embodiments.

Referring now to FIG. 34, additional details of the user interface 3200 of FIG. 32 are shown, according to some embodiments. The FIG. 34 shows a detailed view window 3402 for the message preview window 3302 upon selecting the expansion icon 3304 of FIG. 33. The detailed view window 3402 includes a time and date, and a more detailed explanation of the false alarm along with a corrective action for reducing the false alarm. For example, the user is informed of a pattern of behavior leading to false alarms and a corrective action is provided to reduce such false alarms.

In some embodiments, the user interface 3200 may further include one or more additional input options for the user (not shown).

Figure 35:
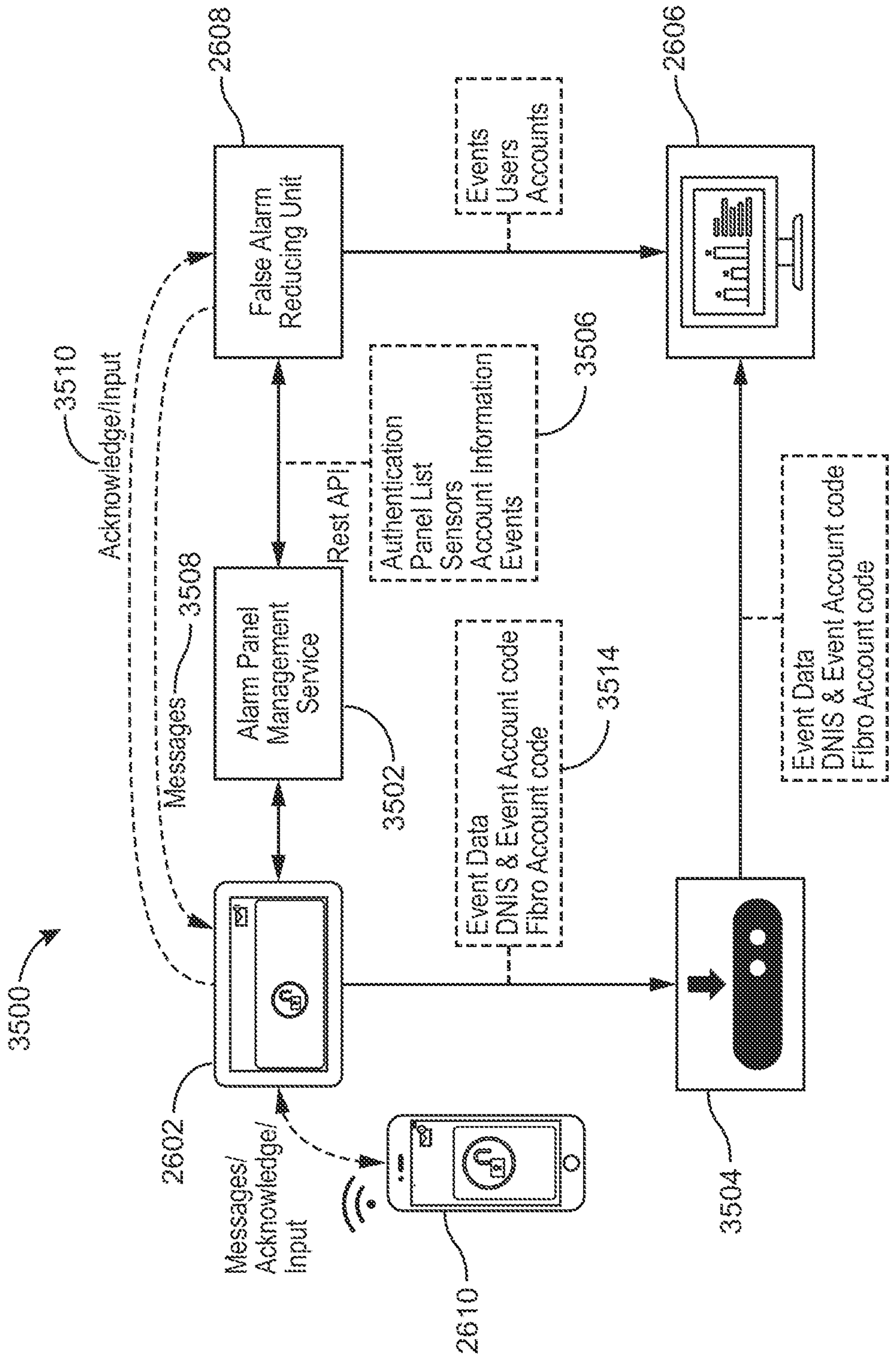
FIG. 35 is a flowchart of communication between components of a building security system, according to some embodiments.

Referring now to FIG. 35, a flowchart 3500 depicting communication in the building security system of FIG. 26 is shown, according to some embodiments. The flowchart 3500 shows the false alarm reducing unit 2608 in communication with the one or more alarm panels such as the alarm panel 2602 through an intermediary service such as an alarm panel management service 3502. In some embodiments, using one or more application interfaces, such as REST API, the false alarm reducing unit 2608 may retrieve various data 3506 from the alarm panel management service 3502, for example, an authentication for secure access to the false alarm reducing unit 2608, a panel list to determine one or more alarm panels that support communication with the false alarm reducing unit 2608, events, sensors, account information etc.

In some embodiments, the alarm panel 2602 may send data 3514 such as event data, Dialed Number Identification Service (DNIS) codes, event account codes, fiberoptic account codes, etc. to the database 2606 via a data receiver 3504. Further, the false alarm reducing unit 2608 may retrieve the data 3514 from the database 2606 in the form of events, users, and accounts data. The false alarm reducing unit 2608 may further analyze the data 3514 to detect if the alarm is a false alarm and identify a root cause of the false alarm. For example, the false alarm may be caused due to human behavior. Based on the identified root cause of the false alarm, the false alarm reducing unit 2608 may determine a corrective action that can be recommended to reduce the false alarm. The false alarm reducing unit 2608 may further transmit one or more messages 3508 to the alarm panel 2602. For example, the one or more messages 3508 may indicate the corrective action provided to the user associated with the alarm panel 2602 for reducing the false alarm. In some embodiments, the user may provide an acknowledgement/user input 3510 for the one or more messages 3508 to the false alarm reducing unit 2608.

In some embodiments, the alarm panel 2602 may be communicably connected with one or more user devices, such as the electronic device 2610 referred above in FIG. 26. The electronic device 2610 may run one or more software applications enabling notifications to be received from the alarm panel 2602.

Figure 36:
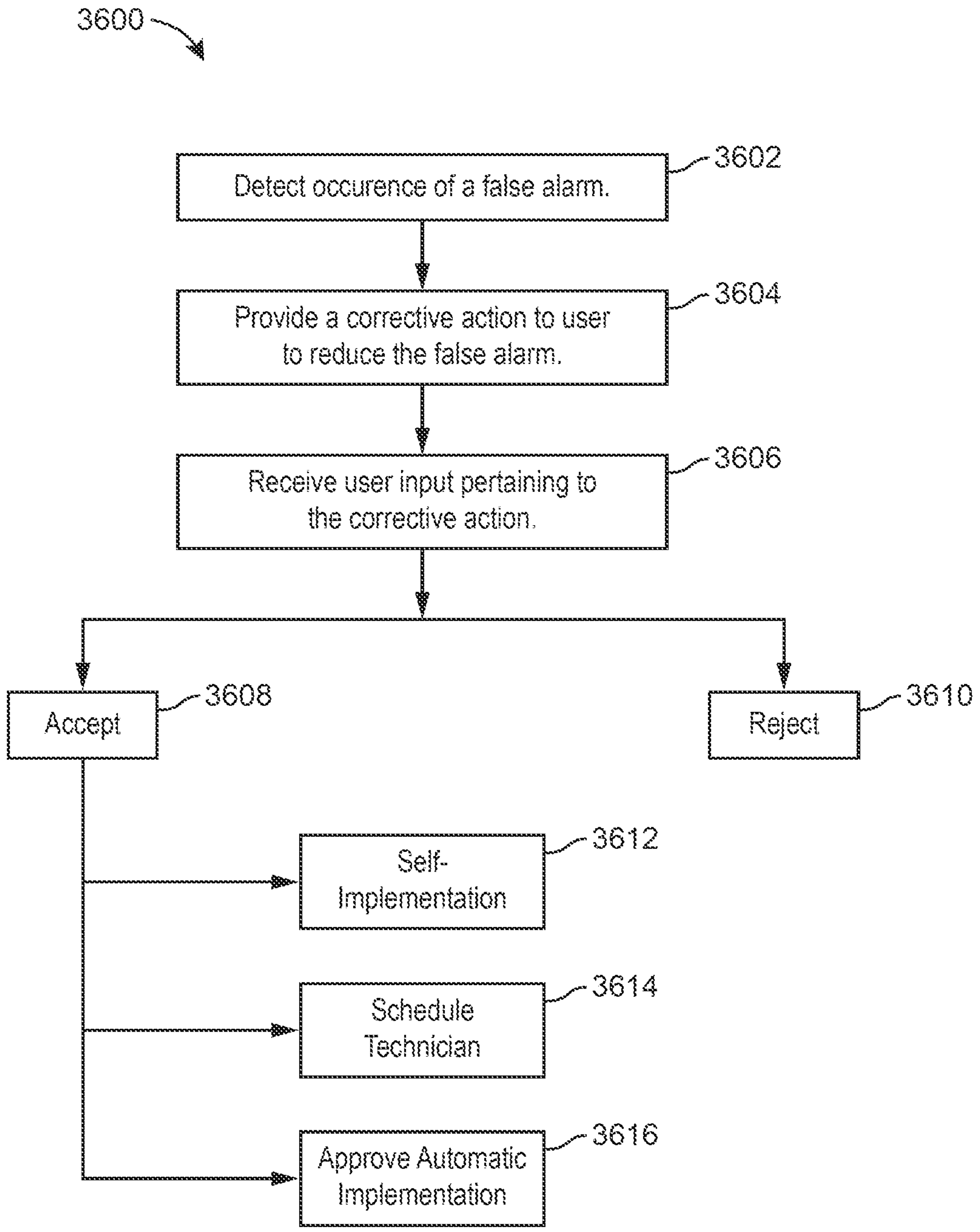
FIG. 36 is a flowchart of a method for providing false alarm reduction recommendations, according to some embodiments.

Referring now to FIG. 36, a flowchart of a method 3600 for providing false alarm reduction recommendations is shown, according to some embodiments. In some embodiments, the method 3600 is performed by the building security system 400 referred above in FIG. 26. Alternatively, the method 3600 may be partially or completely performed by another computing system or controller of the security system of FIGS. 1-3. The method 3600 is shown to include detecting occurrence of false alarms (step 3602). In some embodiments, one or more alarms may be raised by the alarm panel 2602 of FIG. 26 on detecting presence of outliers in building data comprising one or more events received from building equipment. In some embodiments, the one or more alarms may be false alarms. Further, the occurrence of false alarm may be determined by the false alarm determining module 2810 of FIG. 28 based on the event data and one or more false alarm rules stored in the database 2606. In addition, a root cause of the false alarm may also be determined by false alarm determining module 2810 based on the event data and the one or more false alarm rules stored in the database 2606.

The method 3600 is further shown to include providing a corrective action to a user to reduce occurrence of the false alarm (step 3604). In some embodiments, the corrective action may be determined by the recommendation determining module 2812 of FIG. 28. In some embodiments, the corrective action may be displayed to the user, allowing the user to scroll through the corrective action and follow one or more instructions to implement the corrective action. In some embodiments, the one or more instructions may be in form of text, graphics, audio, video, etc., or any combination thereof.

The corrective action may include, for example, informing a user about a current status of building equipment, suggested maintenance of the building equipment, suggested parameter changes for the building equipment that may be necessary to reduce the one or more false alarms, etc. For example, the corrective action may be to adjust or update a door delay, to train employees for accessing building subsystems, etc. In some embodiments, the corrective action may include one or more solutions to reduce the false alarm.

One or more notifications containing the corrective action may be sent to the user interface of the alarm panel 2602 or the electronic device 2610, or both, with instruction(s) to implement the corrective action. In some embodiments, the one or more notifications may be in form of text, graphics, audio, video etc., or any combination thereof. In some embodiments, the corrective action may be stored in the database 2606 as a historical corrective action.

The method 3600 is further shown to include receiving a user input pertaining to the corrective action (step 3606). In some embodiments, the user input may be received by the input receiving module 2814 referred above in FIG. 28. In some embodiments, the user is provided with one or more pre-determined input options on the user interface of the alarm panel 2602 or the electronic device 2610, or both, where the input options pertain to the recommended corrective action. Further, the user is allowed to provide user input via the one or more input options provided on the user interface. In some embodiments, the one or more input options may allow the user to accept the corrective action (step 3608). Responsive to a user accepting the corrective action, the false alarm reducing unit 2608 can implement the corrective action to update operation of security equipment (e.g., the monitoring station 2604, the alarm panel 2602, the equipment 204) to reduce the false alarm from occurring. The acceptance of the recommended corrective action can be in form of self-implementation of the corrective action (step 3612). For example, the user may be provided with training instructions to self-implement the corrective action by making parameter changes to building equipment. For example, the false alarm reducing unit 2608 can generate data to cause a graphical user interface to be displayed on the alarm panel 2602 or the user device 2610. The false alarm reducing unit 2608 can generate data to cause the graphical user interface to display instructions to a user to implement the corrective action.

In some other embodiments, the acceptance of the recommended corrective action can be in form of technician assistance for implementing the corrective action (step 3614). For example, the user may book a service appointment to schedule a technician for implementation of the corrective action. The false alarm reducing unit 2608 can generate data to schedule a technician visit to the building to implement the corrective action. For example, the false alarm reducing unit 2608 can transmit data to a scheduling system or service that schedules technician visits to cause the schedule system or service to schedule a technician visit to the building to implement the corrective action.

In some other embodiments, the acceptance of the recommended corrective action can be in form of automatic implementation of the corrective action by the false alarm reducing unit 2608 (step 3616). The user may provide an approval for allowing the false alarm reducing unit 2608 to automatically implement the corrective action. For example, the false alarm reducing unit 2608 may update one or more parameters of the building equipment to reduce occurrence of the false alarm. In some other embodiments, the one or more input options may allow the user to reject the recommended corrective action (step 3610). Additionally, the one or more input options may allow a user to snooze the recommended corrective action indicating the false alarm reducing unit 2608 for delayed implementation of the corrective action.

In some embodiments, the one or more input options may allow the user to confirm implementation of the corrective action. In some embodiments, the implementation of the corrective action can be performed by at least one of the user and a technician. In some other embodiments, the implementation of the corrective action is performed automatically by the false alarm reducing unit 2608.

In some embodiments, the user input for the recommended corrective action can be in form of a textual review. The textual review may be analyzed using Natural Language Processing (NLP). For example, one or more key words or concepts may be extracted from the textual review to understand content of the user input. In some other embodiments, the user input can be in form of a rating or score provided to the recommended corrective action. In some embodiments, the user input pertaining to the recommended corrective action may be collected and stored in the database 2606.

Figure 37:
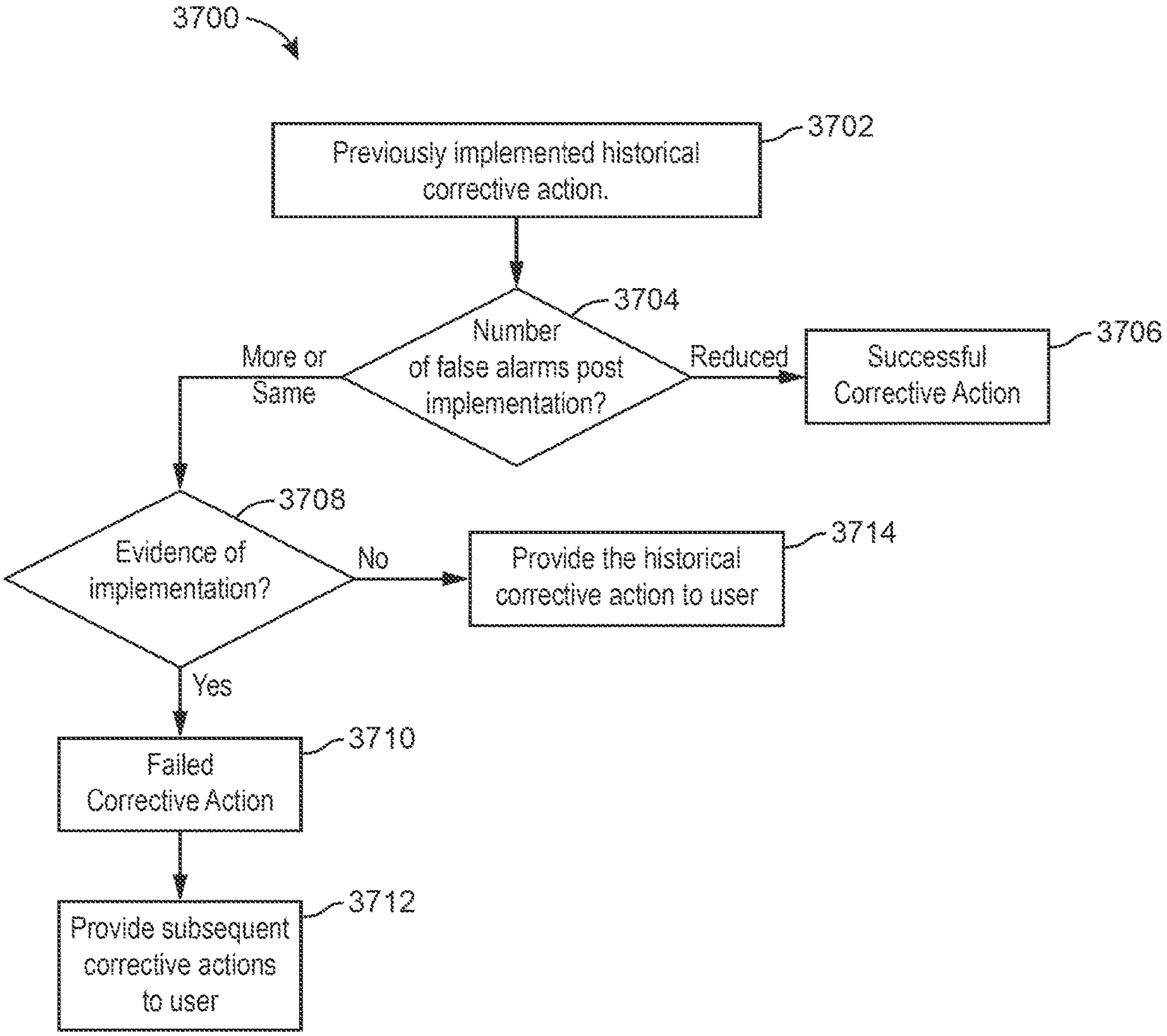
FIG. 37 is a flowchart of a method for providing a false alarm reduction recommendation based on prior interactions of a user with a past false alarm reduction recommendation, according to some embodiments.

Referring now to FIG. 37, a flowchart showing additional details of the method 3700 is shown, according to some embodiments. In some embodiments, the method 3700 is performed by the building security system 2600 referred above in FIG. 26. Alternatively, the method 3700 may be partially or completely performed by another computing system or controller of the security system of FIGS. 1-3. As referred above in the method 3600 of FIG. 36, the corrective actions recommended to the user are stored in the database 2606 as historical corrective actions. In addition, the user input pertaining to the recommended corrective actions are also stored in the database 2606. In some embodiments, when a false alarm of same type as a previously stored false alarm is detected (alternatively referred as a reoccurred false alarm), the recommendation modifier 2816 may identify a historical corrective action provided to the user corresponding to the previously stored false alarm and further analyze a user input provided for the historical corrective action by looking into the database 2606.

In some embodiments, the recommendation modifier 2816 may analyze the user input to determine that the user accepted and confirmed implementation of the historical corrective action (step 3702). Further, the method 3700 is shown to include determining a number of false alarms of the same type post implementation of the historical corrective action (step 3704). In some embodiments, when the number of false alarms have been reduced, post implementation of the historical corrective action, then the historical corrective action is considered as a successful corrective action (step 3706). In such case, the historical corrective action identified as successful may be considered as highly effective. Such historical corrective action may be recommended again for reducing the reoccurred false alarm.

Further, in some other embodiments, when the number of false alarms are increased or same, post implementation of the historical corrective action, then an evidence for implementation of the historical corrective action may be determined (step 3708). For example, the recommendation modifier 2816 may search a database of technician callouts for collecting an evidence to determine if the historical corrective action was actually implemented. In one case, if the evidence that the historical corrective action was implemented is found i.e. result of the step 3708 is yes, then the historical corrective action is considered as a failed corrective action (step 3710). This indicates that the historical corrective action, when implemented by the user, failed to reduce the number of false alarms. In some embodiments, the failed corrective action may no longer be recommended to users, or may not be recommended for a configurable period of time. This indicates that the historical corrective action is less effective. In such case, one or more subsequent corrective actions may be provided to the user for reducing the reoccurred false alarm (step 3712). In some embodiments, the one or more subsequent corrective actions may be one of a new corrective action or a modified version of the historical corrective action. However, in some other embodiments, if there is no evidence found for implementation of the corrective action, i.e., the result of step 3708 is no, then the historical corrective action may be recommended to the user again for reducing the reoccurred false alarm (step 3714).

Figure 38:
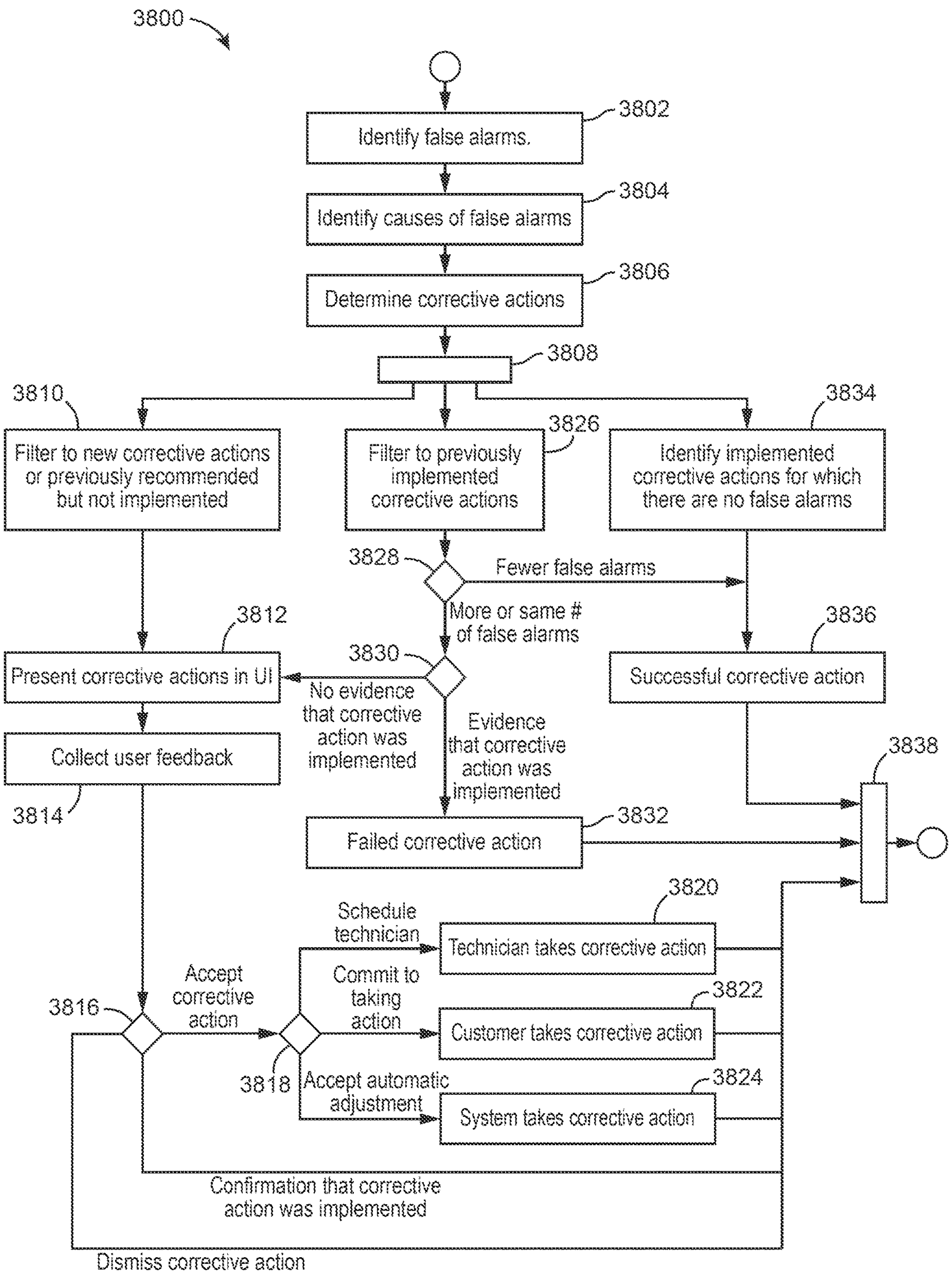
FIG. 38 is another flowchart of a method for providing a false alarm reduction recommendation based on prior interactions of a user with a past false alarm reduction recommendation, according to some embodiments.

Referring now to FIG. 38, an overview of the method 3800 for providing false alarm reduction recommendations is shown, according to some embodiments. In some embodiments, the method 3800 is performed by the building security system 2600 referred above in FIG. 26. Alternatively, the method 3800 may be partially or completely performed by another computing system or controller of the security system of FIGS. 1-3.

The method 3800 can include identifying false alarms (step 3802). The method 3800 is shown to include detecting occurrence of false alarms by the false alarm determining module 2810 of FIG. 28. For example, the false alarm determining module 2810 can identify events, operating settings, or other pieces of data collected from the monitoring station 2604, the alarm panel 2602, door sensors, window sensors, motion sensors, etc. The data can be received and stored in the database 2606. The false alarm determining module 2810 can operate against the event data to detect whether an alarm of a particular alarm type is a false alarm. For example, the data can indicate a series of events that led up to an alarm. The false alarm determining module 2810 can compare the sequence of events against various false alarm rules. Responsive to the sequence of events satisfying a predefine sequence of events in a false alarm rule, the false alarm determining module 2810 can determine that the alarm is a false alarm.

The method 3800 can include identifying causes of false alarms (step 3804). A root cause of the false alarm may be determined by the false alarm determining module 2810 based on the event data and the one or more false alarm rules stored in the database 2606. For example, the false alarm rules can be linked to data indicating or describing a particular underlying cause. The method 3800 can include determining a corrective action (step 3806). For example, the corrective action can be data indicating an action or actions that the user can perform to resolve or reduce false alarms as the same type as the identified false alarm. The false alarm rules can be linked to data describing the corrective actions. The corrective action can be determined by the recommendation determining module 2812. In some embodiments, the corrective action may include one or more solutions to reduce the false alarm.

As referred above, the corrective actions recommended to the user are stored in the database 2606 as historical corrective actions. In addition, the user input pertaining to the historical corrective actions is also stored in the database 2606. In some embodiments, when a false alarm of a same type as a previously stored false alarm is detected (alternatively referred as a reoccurred false alarm), the recommendation modifier 2816 may identify a historical corrective action provided to the user corresponding to the previously stored false alarm and further analyze a user input provided for the historical corrective action by looking into the database 2606. If the historical corrective action was accepted and confirmed by the user, then a number of false alarms of the same type, post implementation of the historical corrective action is determined. In some embodiments, when the number of false alarms have been reduced post implementation of the historical corrective action, then the historical corrective action is considered as a successful and highly effective corrective action. Such historical corrective action may be recommended again for the reducing the reoccurred false alarm.

The method 3800 can include determining whether the corrective action has been implemented in the past (step 3808). The step 3808 can include determining if false alarms of a particular type has occurred after the corrective action was implemented, where the particular type of false alarm is a type for which the corrective action is a solution. If the corrective action is a new corrective action that has not been recommended before or is a previously recommended corrective action that a user declined to implement, the method 3800 can proceed to step 3810. If the corrective action was previously implemented and, after implementation, false alarms occurred, where the false alarms are of a type that the corrective action was implemented to resolve, the method 3800 can proceed to step 3826. If the corrective action was previously implemented and no further false alarms occurred after implementation of the false alarm (or no further false alarms of a type that the corrective action was intended to resolve), the method 3800 can proceed to step 3834.

In step 3812, the method 3800 can include presenting a corrective action in a user interface. The corrective action may be recommended to the user over the user interface of the alarm panel 2602 or the electronic device 2610, or both. In step 3814, the method 3800 can include collecting user feedback. For example, a user input pertaining to the recommended corrective action is received by the input receiving module 2814. In some embodiments, the user may be provided with one or more predetermined input options on the user interface of the alarm panel 2602 or the electronic device 2610, or both, where the input options pertain to the recommended corrective action. The user can provide user input via the one or more input options provided on the user interface. The user can provide input accepting the corrective action. The user can provide input confirming that the accepted corrective action was implemented. The acceptance of the corrective action can be in form of self-implementation of the corrective action, via technician implementing the corrective action, and/or automatic implementation by the false alarm reducing unit 2608. In some embodiments, the one or more input options may allow the user to confirm implementation of the corrective action.

In step 3816, the method 3800 can include determining whether the user dismissed or accepted the corrective action. In some embodiments, the user interface presented in step 3812 can include one or more input options may allow the user to reject the recommended corrective action or accept the corrective action. Furthermore, in step 3816, the method 3800 can determine whether the user provided confirmation that the corrective action was successfully implemented. If the user dismisses the corrective action, the method 3800 can proceed to step 3838. If the user accepts the corrective action, the method 3800 can proceed to step 3818. If the user confirms that the corrective action was implemented, the method 1660 can proceed to step 3838.

In step 3818, the method 3800 can include determining the corrective action should be performed by a technician, a customer, or automatically by the false alarm reducing unit 2608. The false alarm reducing unit 2608 can store a mapping, linking, or relational data that indicates whether each type of corrective action can be performed by a technician, customer, or automatically by the false alarm reducing unit 2608. If the false alarm reducing unit 2608 determines that a technician is required to implement the corrective action, the method 3800 can proceed to step 3820. In step 3820, the false alarm reducing unit 2608 can schedule a technician visit to a site to implement the corrective action. The false reducing alarm unit 2608 can generate an event on a calendar for the technician to visit the site and implement the corrective action. The event can cause the technician to travel to the site and implement the corrective action.

If the false alarm reducing unit 2608 determines that the customer can implement the corrective action, the method 3800 can proceed to step 3822. In some embodiments, a user can provide input via the user interface committing or agreeing to implement the corrective action themselves. In some embodiments, a user can provide input via the user interface requesting that a technician be dispatched or assigned to implement the corrective action. Responsive to an indication that the user selects a technician top perform the corrective action, the method 3800 can proceed to step 3820. In step 3822, the method 3800 can include providing instructions or steps for the user to follow to implement the corrective action.

In step 3818, the method 3800 can proceed to step 3824 responsive to determining that the corrective action can be performed by the false alarm reducing unit 2608. The false alarm reducing unit 2608 can implement a corrective action automatically. If the corrective action is an update to a length of time that a user is required to enter a security code into the alarm panel 2602 after entering through a door, the false alarm reducing unit 2608 can cause the security system of the building to implement the updated length of time. For example, the false alarm reducing unit 2608 can transmit the updated length of time to the alarm panel 2602. Furthermore, if the false alarm is caused by door or window sensor that is overly sensitive and causing a false alarm, the false alarm reducing unit 2608 can cause the sensor to increase a sensitivity level. The false alarm reducing unit 2608 can transmit a command to increase a sensitivity level, a command to increase a sensitivity level by a particular amount, or a command to change a stored sensitivity level to a new sensitivity level.

In step 3828, the method 3800 can include comparing a number of false alarms to at least one threshold. For example, the false alarm reducing unit 2608 determine a number of false alarms of a particular type that the previously implemented corrective action was intended to reduce or eliminate. For example, the false alarm reducing unit 2608 can search the database 2606 (or the record of false alarms in the database 2606) and identify the number of false alarms occurring after implementation of the corrective action that are associated, linked to, or related to a type that the corrective action was intended to reduce. The false alarm reducing unit 2608 can compare the number of false alarms to a threshold. The threshold can indicate the number of false alarms that have occurred before the implementation of the corrective action. In some embodiments, the threshold is the number of false alarms that have occurred within a window of time prior to the corrective action being implemented. The window of time may be equal or substantially equal to the length of time that has passed since the corrective action was implemented. Responsive to determining that the number of false alarms being greater than or equal to the threshold, the method 3800 can proceed to step 3830. Responsive to determining that the number of false alarms is less than the threshold, the method 3800 can proceed to step 3836.

In step 3830, the method 3800 can determine whether or not the corrective action was actually implemented. For example, the false alarm reducing unit 2608 can determine whether data stored or collected by the false alarm reducing unit 2608 indicates that the corrective action was implemented. For example, the data can be evidence indicating whether the corrective action was implemented or not. Furthermore, the false alarm reducing unit 2608 can search the database 2606 to determine whether the false alarm reducing unit 2608 previous stored a confirmation record that the user provided an input indicating that they had completed or performed the corrective action.

The false alarm reducing unit 2608 can perform an internal audit to determine whether or not the corrective action was implemented. For example, the false alarm reducing unit 2608 can store a record in the database 2606 indicating one or more updated operating parameters for the implemented corrective action. The false alarm reducing unit 2608 can query the alarm panel 2602 or sensors of the security system 2600 to return parameter values stored by the systems. The false alarm reducing unit 2608 can compare the returned parameter values against the parameter value for the corrective actions stored in the database 2606. For example, the false alarm reducing unit 2608 can confirm that a sensor sensitivity that a sensor is operating on matches a sensor sensitivity of the corrective action. For example, the false alarm reducing unit 2608 can compare a security time of the alarm panel 2602 against a security time for the corrected action. The security time can be a length of time for a user to enter or input a security or access code into the alarm panel 2602 after a door open event for a building in a locked state.

If the false alarm reducing unit 2608 determines that the corrective action was implemented, the method 3800 can proceed to step 3832. If the false alarm reducing unit 2608 determines that the corrective action was not implemented or was improperly implemented, the method 3800 can proceed to step 1612. The method 3800 can classify the corrective action as a failed corrective action in step 3832. The false alarm reducing unit 2608 can store an indication, a tag, a label, or other data that identifies the corrective action as failing or not reducing false alarms properly in the database 2606.

In some embodiments, when the number of false alarms are increased or same, post implementation of the historical corrective action, then an evidence for implementation of the historical corrective action may be determined. In one case, if the evidence is found, then the historical corrective action is considered as a failed or less effective corrective action and may no longer be recommended to users, or may not be recommended for a configurable period of time. In such case, one or more subsequent corrective actions may be provided to the user for reducing the reoccurred false alarm.

However, in some other embodiments, if there is no evidence found for implementation of the corrective action, then the historical corrective action may be recommended to the user again for reducing the reoccurred false alarm.

In some embodiments, upon determining that the historical corrective action was not previously implemented by the user, the historical corrective action may be recommended again to the user to reduce the reoccurred false alarm.

In some embodiments, upon determining that the historical corrective action was previously implemented by the user and further no false alarms are detected, then such historical corrective action may be considered as successful or highly effective and recommended again to the user.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A security system of a building, comprising:
a processing circuit configured to:
detect, based on data of security equipment of the building, that a security alarm of the building is a false alarm that incorrectly indicates that a security event has occurred in the building;
search, responsive to the detection of the false alarm, a database to identify a past corrective action accepted for implementation and a number of false alarms occurring after the past corrective action was accepted and before detection of the false alarm, the past corrective action and the number of false alarms stored within the database;
select the past corrective action to reduce an occurrence of the false alarm based on the search identifying that the number of false alarms is less than a threshold; and
implement the past corrective action to update operation of the security equipment to reduce the occurrence of the false alarm.

2. The security system of claim 1, comprising:
the processing circuit to compare the number of false alarms to the threshold.

3. The security system of claim 1, comprising:
the processing circuit to:
detect a second false alarm;
compare a second number of false alarms for a second past corrective action to the threshold; and
generate a second corrective action to reduce the occurrence of the second false alarm to be a type different than the second past corrective action responsive to a determination that the second number of false alarms is greater than the threshold.

4. The security system of claim 1, comprising:
the processing circuit to:
generate data to cause a graphical user interface to be displayed on a user device, the graphical user interface comprising an indication of the past corrective action to reduce the occurrence of the false alarm;
receive a user interaction to approve or reject the past corrective action; and
update the database to store an indication of the past corrective action and the user interaction to approve or reject the past corrective action.

5. The security system of claim 1, comprising:
the processing circuit to:
detect a second false alarm;
compare a second number of false alarms for a second past corrective action to the threshold;
analyze data to determine that the second past corrective action was accepted but not implemented; and
generate a second corrective action to reduce the occurrence of the second false alarm to be a same type as the second past corrective action responsive to a determination that the second number of false alarms is greater than the threshold and a determination that the second past corrective action was not implemented.

6. The security system of claim 1, comprising:
the processing circuit to:
identify, in the database, a confirmation provided by a user verifying that the past corrective action was implemented;
compare the number of false alarms occurring after the past corrective action was accepted and before detection of the false alarm to the threshold responsive to an identification of the confirmation; and
select the past corrective action to reduce the occurrence of the false alarm to be a same type as the past corrective action responsive to the number of false alarms being less than the threshold.

7. The security system of claim 1, comprising:
the processing circuit to:
transmit data to an alarm panel located within the building to cause the alarm panel to display an indication of the past corrective action;
receive, from the alarm panel, data indicating whether a user accepted or rejected the past corrective action via the alarm panel; and
update the database with an indication that the past corrective action was accepted or rejected by the user.

8. The security system of claim 1, comprising:
the processing circuit to:
search the database to identify an update to a value of an operating parameter of the security equipment implemented by the past corrective action;
retrieve the value of the operating parameter from the security equipment;
determine, based on the value of the operating parameter, whether the update to the value of the operating parameter was implemented; and
select the past corrective action based on whether the update to the value of the operating parameter was implemented.

9. The security system of claim 1, comprising:
the processing circuit to:
implement the past corrective action by:
generating scheduling data to cause a technician to implement the past corrective action;
generating data to cause a graphical user interface to display instructions to a user to implement the past corrective action; or
transmitting data to the security equipment updating at least one parameter value of the security equipment causing the security equipment to implement the past corrective action.

10. A method, comprising:
detecting, by one or more processing circuits, based on data of security equipment of a building, that a security alarm of the building is a false alarm that incorrectly indicates that a security event has occurred in the building;
searching, by the one or more processing circuits, responsive to the detection of the false alarm, a database to identify a past corrective action accepted for implementation and a number of false alarms occurring after the past corrective action was accepted and before detection of the false alarm, the past corrective action and the number of false alarms stored within the database;
generating, by the one or more processing circuits, a corrective action to reduce an occurrence of the false alarm based on the search identifying that the number of false alarms is greater than a threshold, wherein the corrective action is a type different than the past corrective action; and implementing, by the one or more processing circuits, the corrective action to update operation of the security equipment to reduce the occurrence of the false alarm.

11. The method of claim 10, comprising:

comparing, by the one or more processing circuits, the number of false alarms to the threshold.

12. The method of claim 10, comprising:

detecting, by the one or more processing circuits, a second false alarm;

comparing, by the one or more processing circuits, a second number of false alarms for a second past corrective action to the threshold; and generating, by the one or more processing circuits, a second corrective action to reduce the occurrence of the second false alarm to be a type different than the second past corrective action responsive to a determination that the second number of false alarms is greater than the threshold.

13. The method of claim 10, comprising:

generating, by the one or more processing circuits, data to cause a graphical user interface to be displayed on a user device, the graphical user interface comprising an indication of the corrective action to reduce the occurrence of the false alarm;

receiving, by the one or more processing circuits, a user interaction to approve or reject the corrective action; and updating, by the one or more processing circuits, the database to store an indication of the corrective action and the user interaction to approve or reject the corrective action.

14. The method of claim 10, comprising:

detecting, by the one or more processing circuits, a second false alarm;

comparing, by the one or more processing circuits, a second number of false alarms for a second past corrective action to the threshold;

analyzing, by the one or more processing circuits, data to determine that the second past corrective action was accepted but not implemented; and generating, by the one or more processing circuits, a second corrective action to reduce the occurrence of the second false alarm to be a same type as the second past corrective action responsive to a determination that the second number of false alarms is greater than the threshold and a determination that the second past corrective action was not implemented.

15. The method of claim 10, comprising:

identifying, by the one or more processing circuits, in the database, a confirmation provided by a user verifying that the past corrective action was implemented;

comparing, by the one or more processing circuits, the number of false alarms occurring after the past corrective action was accepted and before detection of the false alarm to the threshold responsive to an identification of the confirmation; and generating, by the one or more processing circuits, the corrective action to reduce the occurrence of the false alarm to be a same type as the past corrective action responsive to the number of false alarms being less than the threshold.

16. The method of claim 10, comprising:

transmitting, by the one or more processing circuits, data to an alarm panel located within the building to cause the alarm panel to display an indication of the corrective action;

receiving, by the one or more processing circuits, from the alarm panel, data indicating whether a user accepted or rejected the corrective action via the alarm panel; and updating, by the one or more processing circuits, the database with an indication that the corrective action was accepted or rejected by the user.

17. The method of claim 10, comprising:

searching, by the one or more processing circuits, the database to identify an update to a value of an operating parameter of the security equipment implemented by the corrective action;

retrieving, by the one or more processing circuits, the value of the operating parameter from the security equipment;

determining, by the one or more processing circuits, based on the value of the operating parameter, whether the update to the value of the operating parameter was implemented; and generating, by the one or more processing circuits, the corrective action based on whether the update to the value of the operating parameter was implemented.

18. The method of claim 10, comprising:

implementing, by the one or more processing circuits, the corrective action by:

- generating scheduling data to cause a technician to implement the corrective action;
- generating data to cause a graphical user interface to display instructions to a user to implement the corrective action; or
- transmitting data to the security equipment updating at least one parameter value of the security equipment causing the security equipment to implement the corrective action.

19. One or more non-transitory storage media storing instructions thereon, that, when executed by one or more processors, cause the one or more processors to:

detect, based on data of security equipment of a building, that a security alarm of the building is a false alarm that incorrectly indicates that a security event has occurred in the building;

search, responsive to the detection of the false alarm, a database to identify information stored in the database, comprising:

- a past corrective action accepted for implementation;
- a number of false alarms occurring after the past corrective action was accepted and before detection of the false alarm; and
- an indication of whether the past corrective action was implemented;

select the past corrective action to reduce an occurrence of the false alarm based on the search identifying that the number of false alarms is less than a threshold; and implement the past corrective action to update operation of the security equipment to reduce the occurrence of the false alarm.

20. The one or more non-transitory storage media of claim 19, wherein the instructions, when executed by the one or more processors, cause the one or more processors to:

detect a second false alarm;

compare a second number of false alarms for a second past corrective action to the threshold;

analyze data to determine that the second past corrective action was accepted but not implemented; and generate a second corrective action to reduce the occurrence of the false alarm to be a same type as the second past corrective action responsive to a determination that the second number of false alarms is greater than the threshold and a determination that the second past corrective action was not implemented.

* * * * *